United States Patent [19]

Lampson et al.

[11] 4,203,154

[45] May 13, 1980

[54] ELECTRONIC IMAGE PROCESSING SYSTEM

[75] Inventors: Butler W. Lampson, Portola Valley, Calif.; Robert F. Sproull, Pittsburgh, Pa.; Severo M. Ornstein, Portola Valley; James Y. Leung, Torrance, both of Calif.

[73] Assignee: Xerox Corporation, Stamford, Conn.

[21] Appl. No.: 899,751

[22] Filed: Apr. 24, 1978

[51] Int. Cl.² .................... G06F 3/14; G06F 13/00
[52] U.S. Cl. .................... 364/200; 364/900
[58] Field of Search .................. 364/200 MS File

[56] References Cited

U.S. PATENT DOCUMENTS

| | | | |
|---|---|---|---|
| 3,390,379 | 6/1968 | Carlson et al. | 364/200 |
| 3,634,828 | 1/1972 | Myers et al. | 364/200 |
| 4,000,486 | 12/1976 | Schomburg | 364/200 |

*Primary Examiner*—Harvey E. Springborn
*Attorney, Agent, or Firm*—Barry Paul Smith

[57] ABSTRACT

An electronic image processing system includes a controller for receiving character font data from a main memory and for converting it to image data utilizable by a raster output device capable of formatting the image data in a plurality of scan lines onto an imaging medium. The controller includes an input memory coupled to the main memory for receiving character font data therefrom, a data pattern memory for providing a predetermined pattern of data in response to a predetermined address signal, and a plurality of band buffer memories each capable of storing image data representing a predetermined number of scan lines constituting an image band, each band buffer memory having enable input lines and associated data input lines. The input memory is addressed to access character font data therefrom, such accessed character font data being then applied to respective enable input lines of a selected one of the band buffer memories. The predetermined address signal is applied to the data pattern memory in order to access the predetermined pattern of data and apply same to respective data input lines of the selected band buffer memory. Additionally, the selected band buffer memory is addressed to load into an addressed memory location the predetermined pattern of data only with respect to those data lines whose associated enable input lines are enabled by the character font data.

9 Claims, 48 Drawing Figures

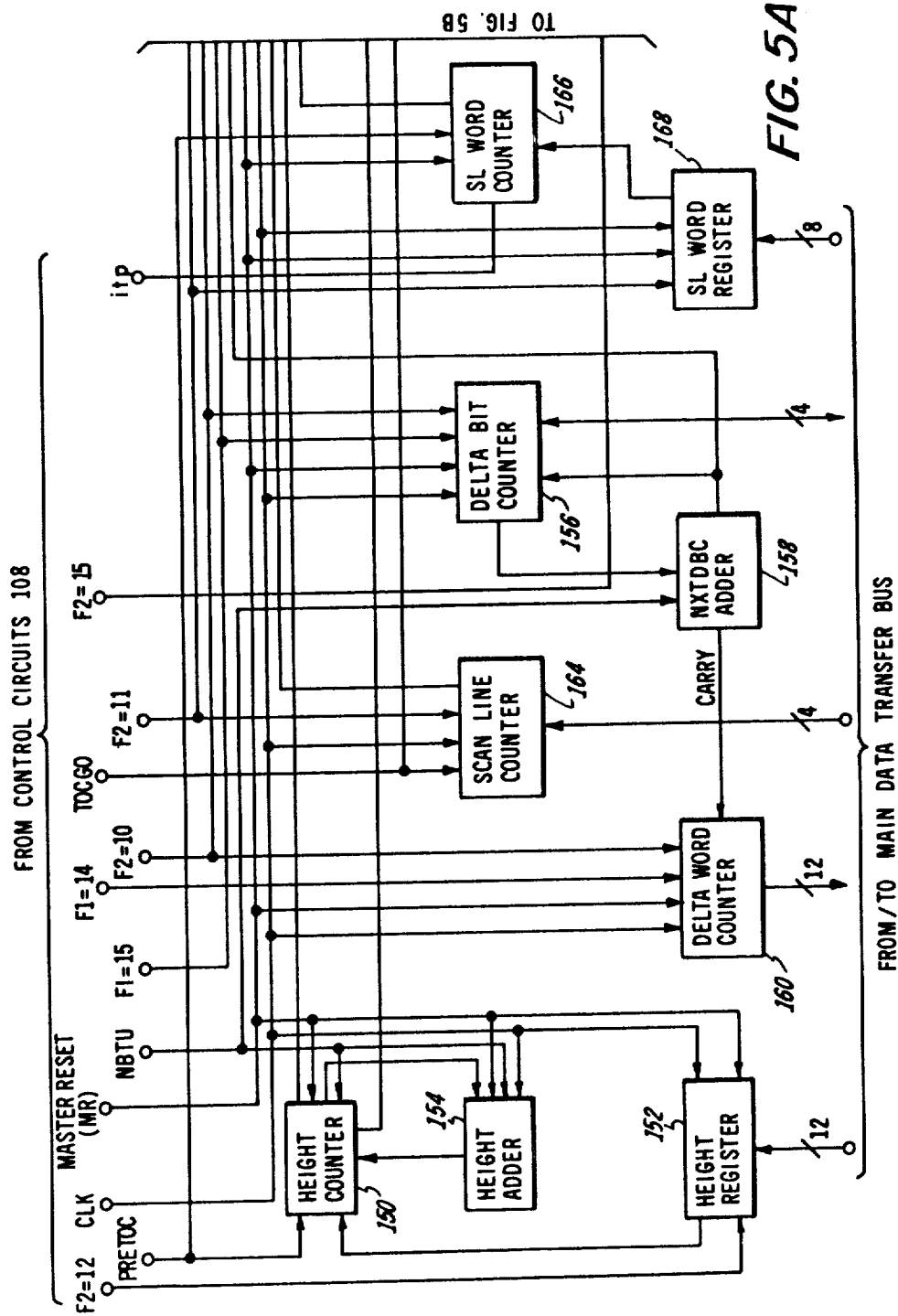

RELATIONSHIP BETWEEN BUFFER ADDRESSES AND X/Y COORDINATES

ROWS AND COLUMNS IN MEMORY CHIP ADDRESSING

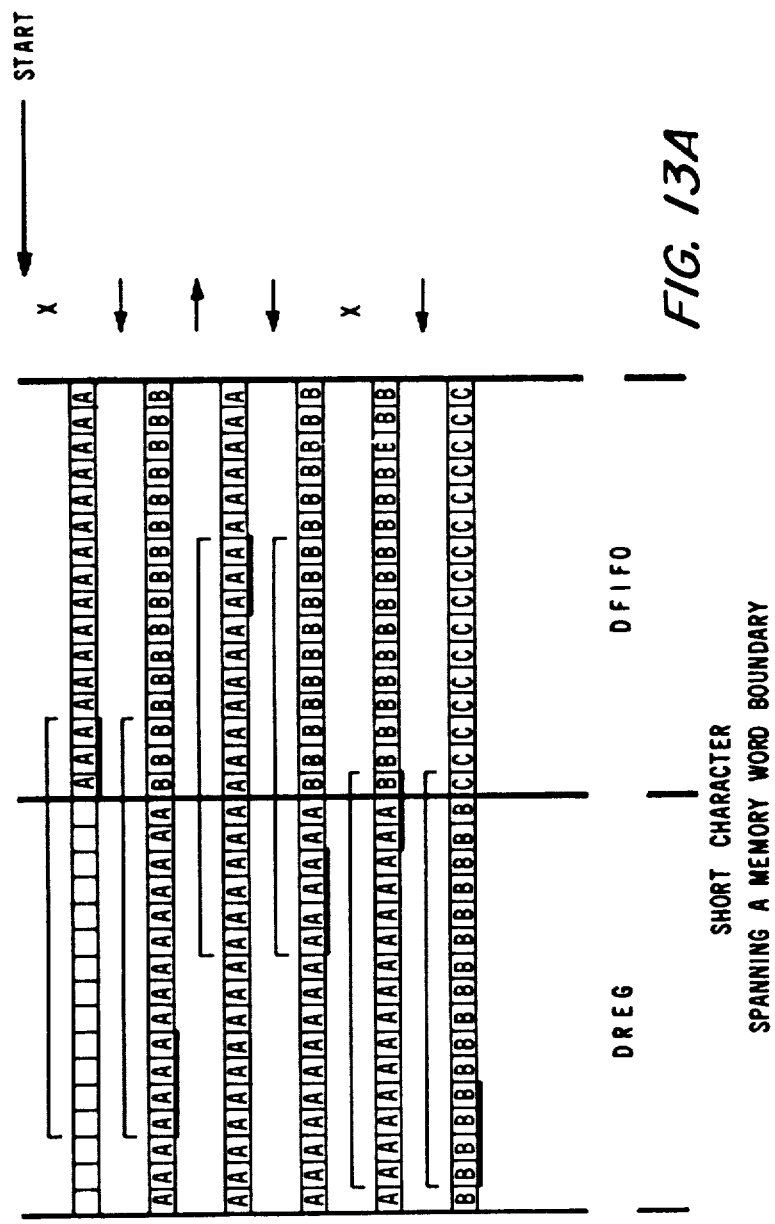

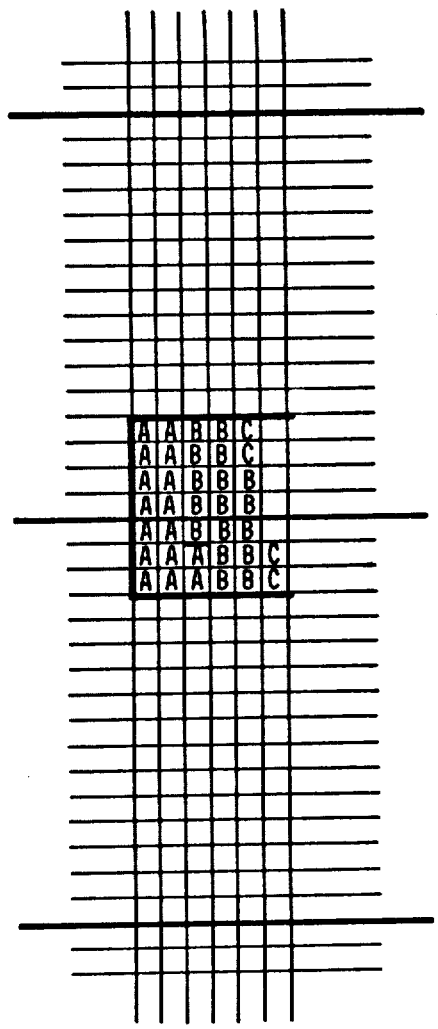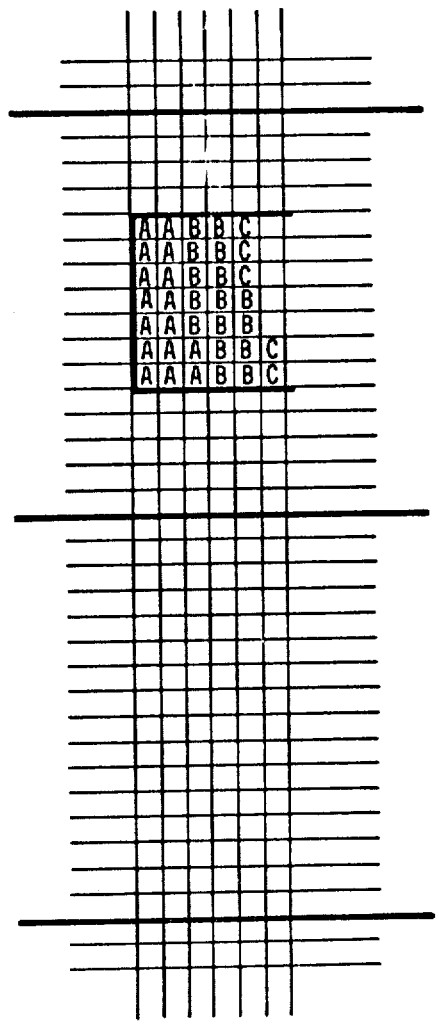
SHORT CHARACTER SPANNING A MEMORY WORD BOUNDARY
FIG. 13B
SHORT CHARACTER WITHIN A SINGLE MEMORY WORD (BOC AND TOC TOGETHER)
FIG. 14B

FIG. 15B

TWO RATHER LONG SHORT CHARACTERS ALL WITHIN ONE MEMORY WORD

TWO RATHER LONG SHORT CHARACTERS ALL WITH ONE MEMORY WORD

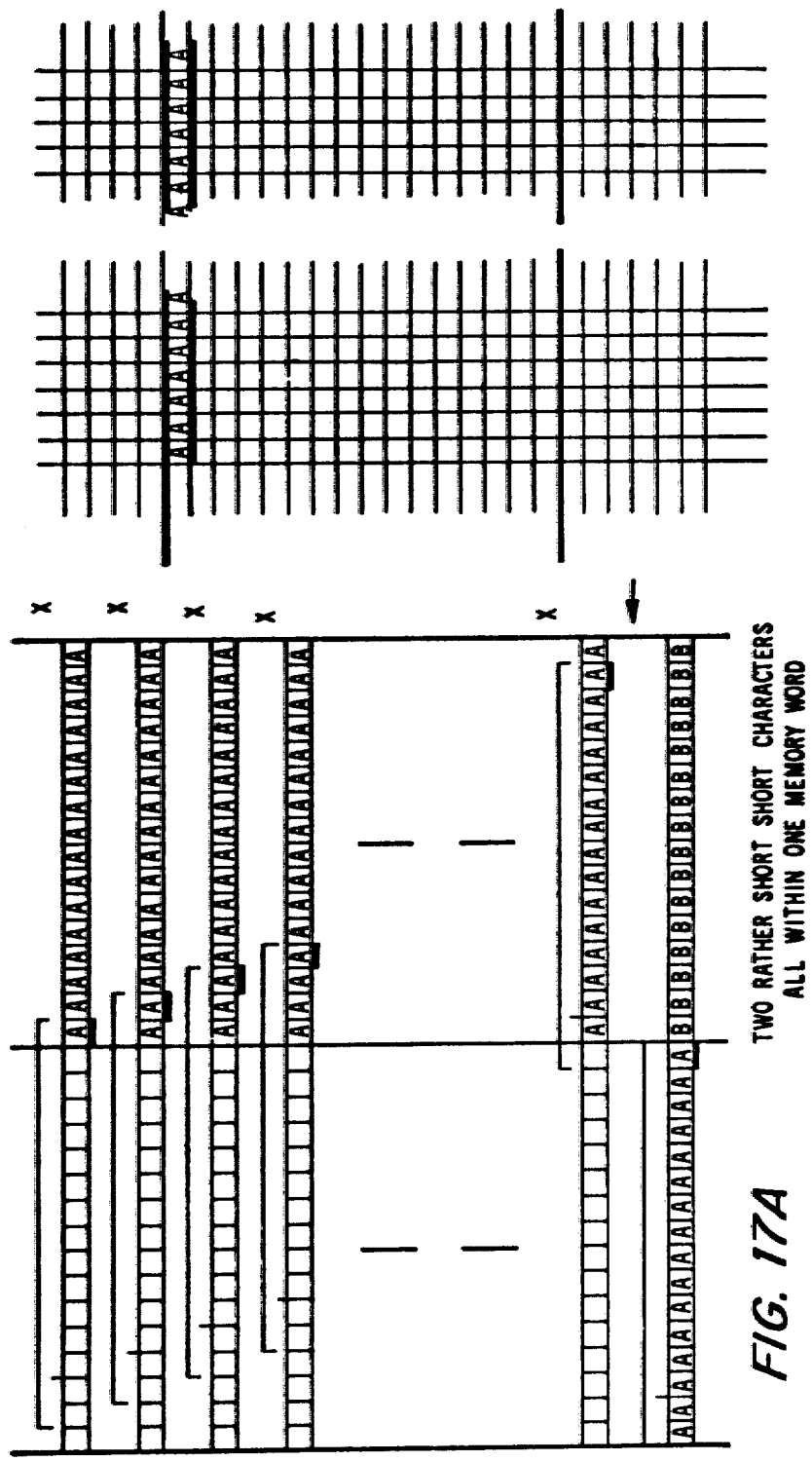
FIG. 17A — TWO RATHER SHORT SHORT CHARACTERS ALL WITHIN ONE MEMORY WORD

TWO RATHER SHORT SHORT CHARACTERS ALL WITHIN ONE MEMORY WORD

A CHARACTER WHOSE BASE SITS ON A WORD BOUNDARY

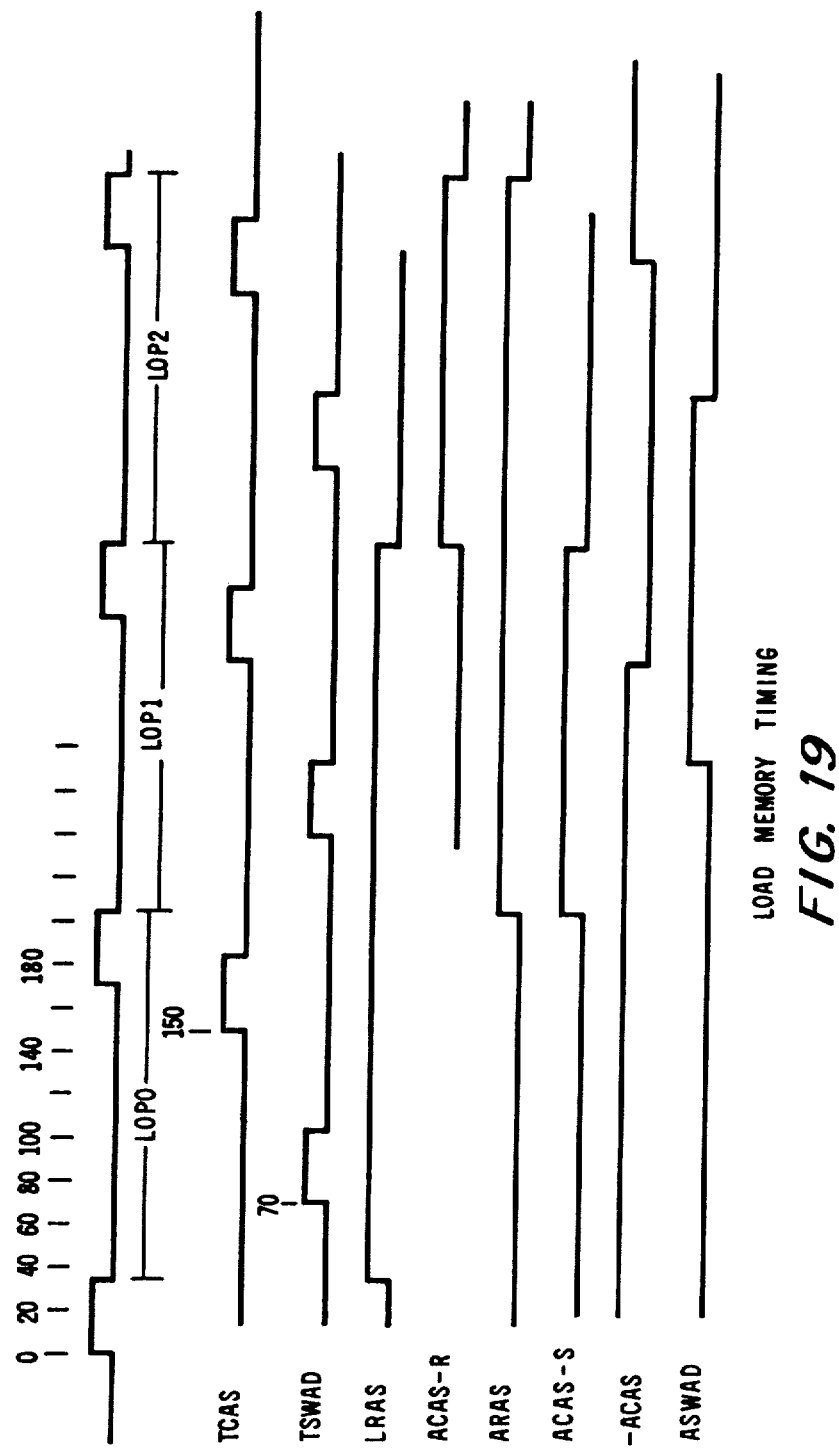

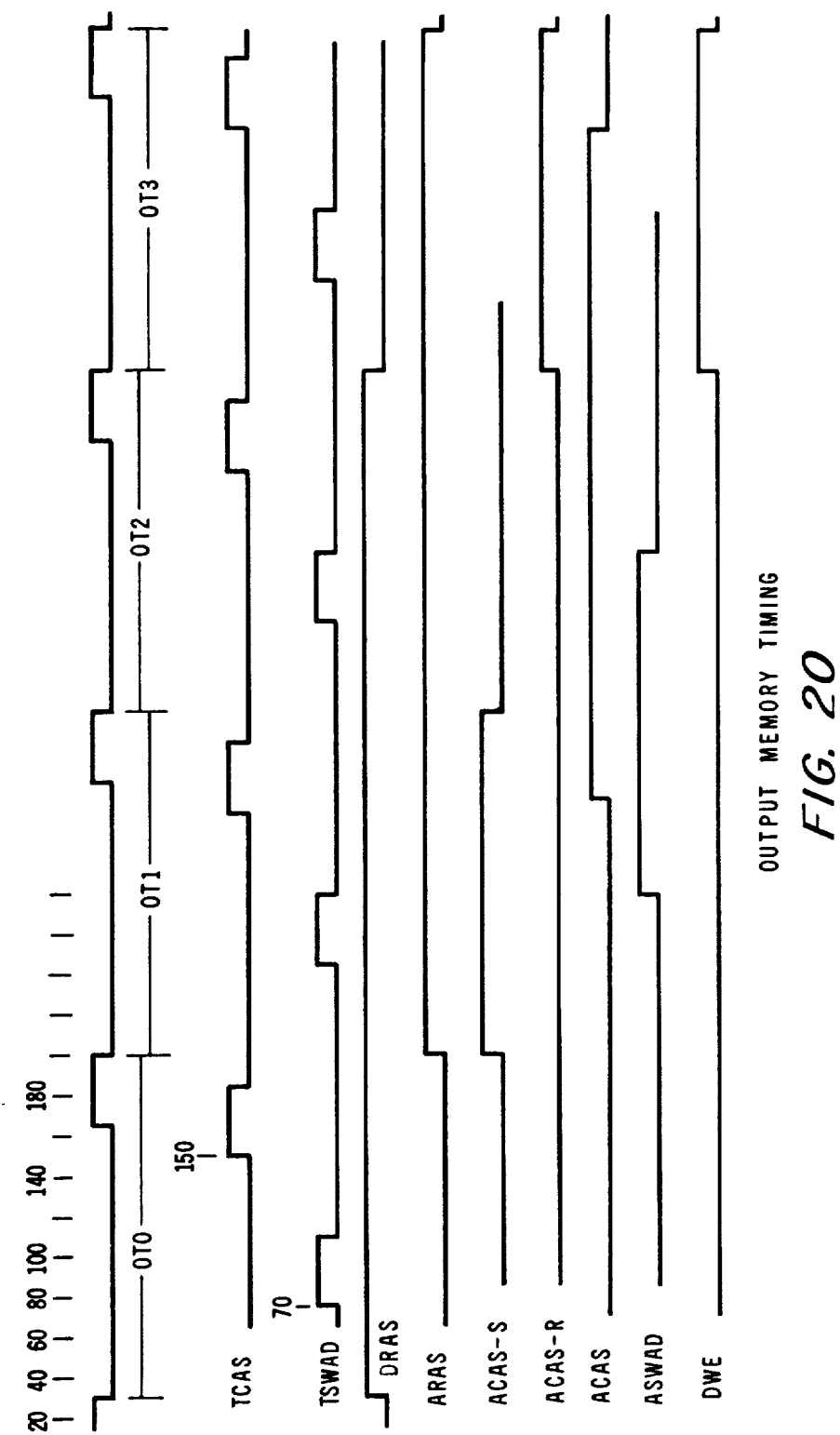
FIG. 20 OUTPUT MEMORY TIMING

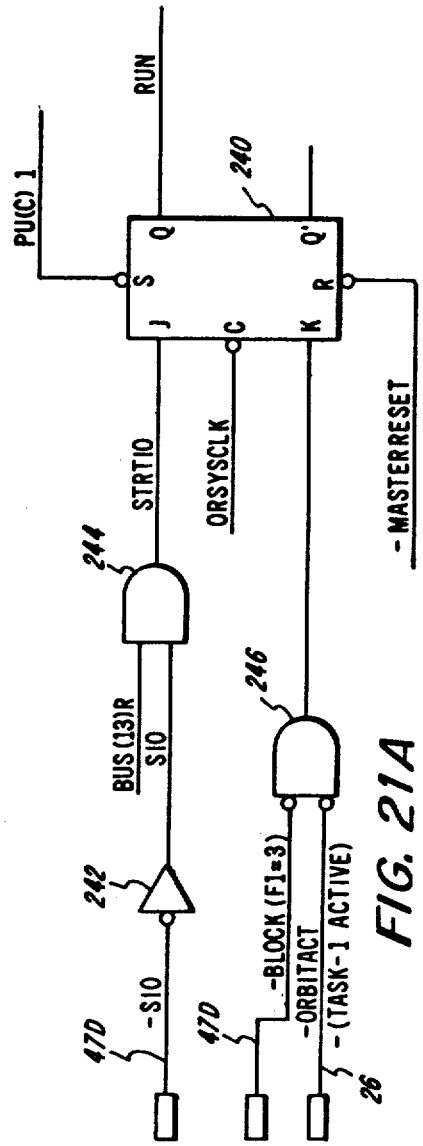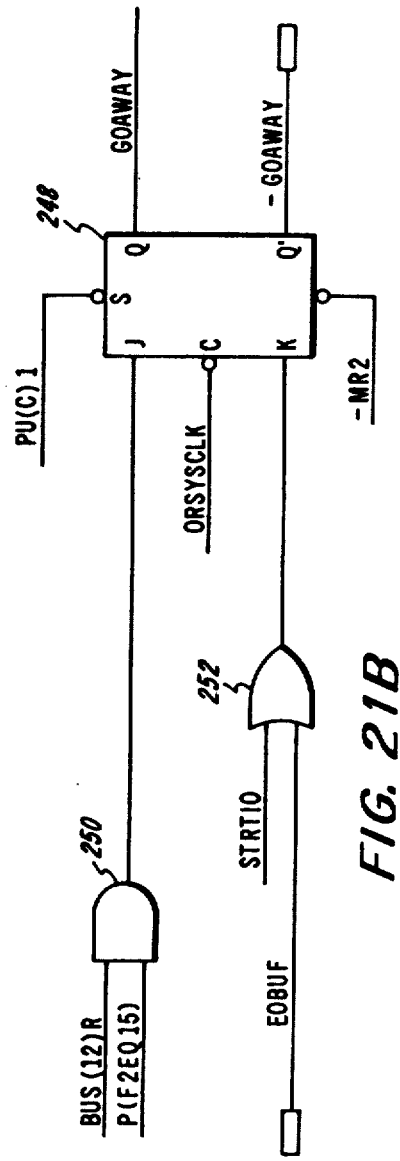
FIG. 21A
FIG. 21B

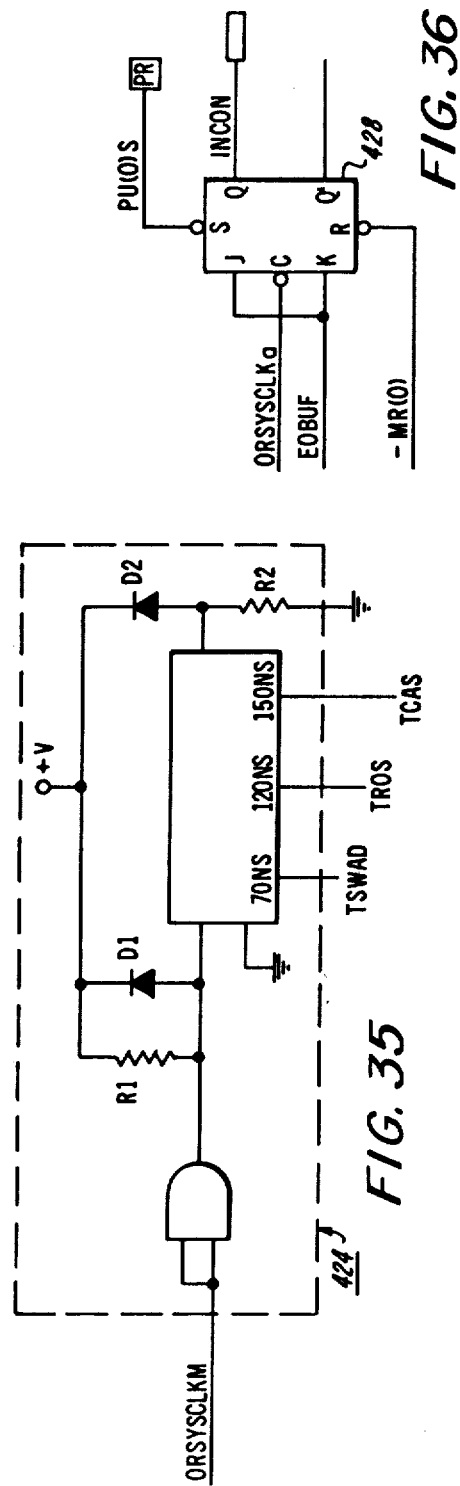
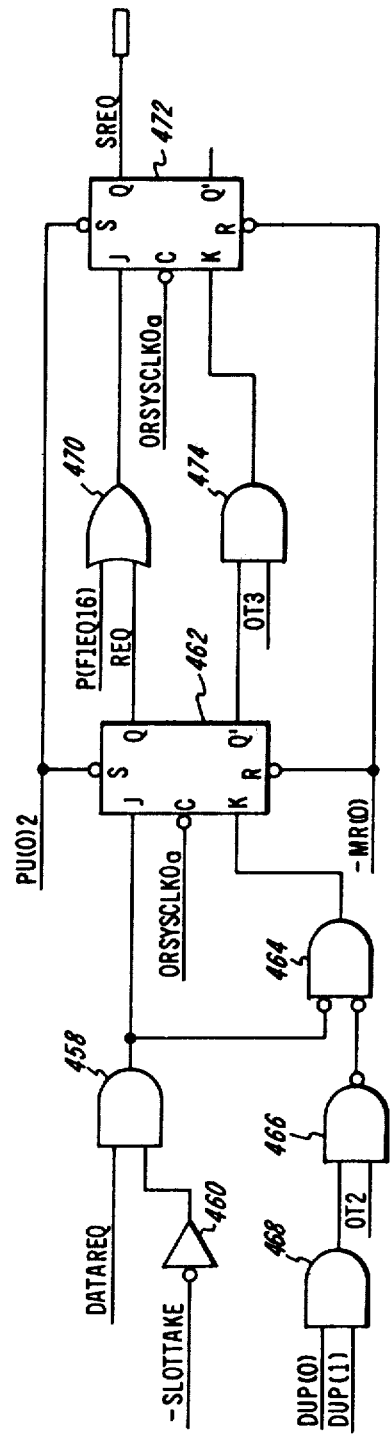
FIG. 35
FIG. 36
FIG. 38

ELECTRONIC IMAGE PROCESSING SYSTEM

BACKGROUND OF THE INVENTION

This invention relates to electronic image processing and, more particularly, to an electronic image processing system for converting character font data into image data utilizable by a raster output device capable of formatting the image data in a plurality of scan lines onto an imaging medium.

Raster output devices, such as raster output scanning devices (ROS) e.g. ROS printers, are conventionally employed to act upon a stream of video image data by traversing a predetermined raster scan pattern to create a composite image from the video image data. A ROS printer traces a raster scan similar to that of a television raster. One form of ROS printer employs a laser scanning head in a xerographic copy reproduction system. Examples of such a printer are disclosed in U.S. Pat. Nos. 3,898,627; 4,000,486; and 4,079,458.

The provision of video image data has heretofore been derived from instructions from a digital processor by arranging character representations in sequential order in the path of the raster output scanner beam and in effect taking a section through the linear character array to determine the precise bit print positions at which the raster output scanner should either print or refrain from printing. The computations necessary are performed in such a way that sequential parallel sections through the linear character arrangement are calculated scan line by scan line with the bit print instructions transmitted to the raster output scanner as soon as the determination has been made as to whether or not the scanner should print at sequentially located bit positions.

The foregoing technique places constraints on the type of printing which may be effectuated. Unless excessively large memories and computation capabilities are provided, character fonts must be specified in uniform dimensions of width and height. Only a limited repertoire of character sizes and styles are feasible for selection using conventional printing systems, and these characters must be printed at predetermined spaced intervals. In addition, conventional printing systems are relatively inflexible in that they are generally incapable of reproducing character over-strikes, truncated characters, characters of different shading, magnified and minified images, reverse field printing and other features which frequently appear in source documents or which are otherwise desirable to produce.

It would be desirable, therefore, to provide an electronic image processing system which removes the constraint of reproducing characters from uniform character fonts at predetermined spaced intervals along a scan line. It would further be desirable if characters could be printed in different shades or in reverse field without the requirement for a separate character font for each shade. It would still further be desirable to lessen the burden on the electronic image processing system relative to the acceptance and handling of "leftover" information for characters being processed. It would also be desirable to be able to write and print rectangles or "rules" without the necessity of defining and storing a character font relative thereto.

SUMMARY OF THE INVENTION

In accordance with one aspect of the invention, a controller is provided for receiving character font data from a main memory and for converting said font data into image data utilizable by a raster output device capable of formatting said image data in a plurality of scan lines onto an imaging medium. The controller comprises an input memory coupled to said main memory for receiving character font data therefrom; a data pattern memory for providing a predetermined pattern of data in response to a predetermined address signal; and at least one band buffer memory capable of storing image data representing a predetermined number of scan lines constituting an image band, said band buffer memory having enable input lines and associated data input lines. The input memory is addressed to access character font data therefrom for application to respective enable input lines of said band buffer memory. Additionally, the predetermined address signal is applied to said data pattern memory, with the accessed predetermined pattern of data being applied to respective input lines of said band buffer memory. Further, the band buffer memory is addressed to load into an addressed memory location said predetermined pattern of data only with respect to those data lines whose associated enable input lines are enabled by said character font data.

In accordance with other aspects of the invention, the controller comprises a plurality of band buffer memories which can be successively selected for receipt of character font data from said input memory and said predetermined pattern of data pattern from said ink data memory.

In accordance with still other aspects of the invention, the controller is capable of unloading a band buffer memory one scan line at a time, and changing the selection of band buffer memories as far as which one is to receive character font data and said predetermined pattern of data, upon completion of unloading a band buffer memory.

These and other aspects and advantages of the present invention will be described below with respect to the accompanying drawings.

BRIEF DESCRIPTION OF THE DRAWINGS

FIGS. 5A and 5B, represent a block diagram representation of the counting circuits depicted in FIGS. 4A and 4B;

Figure 15B:
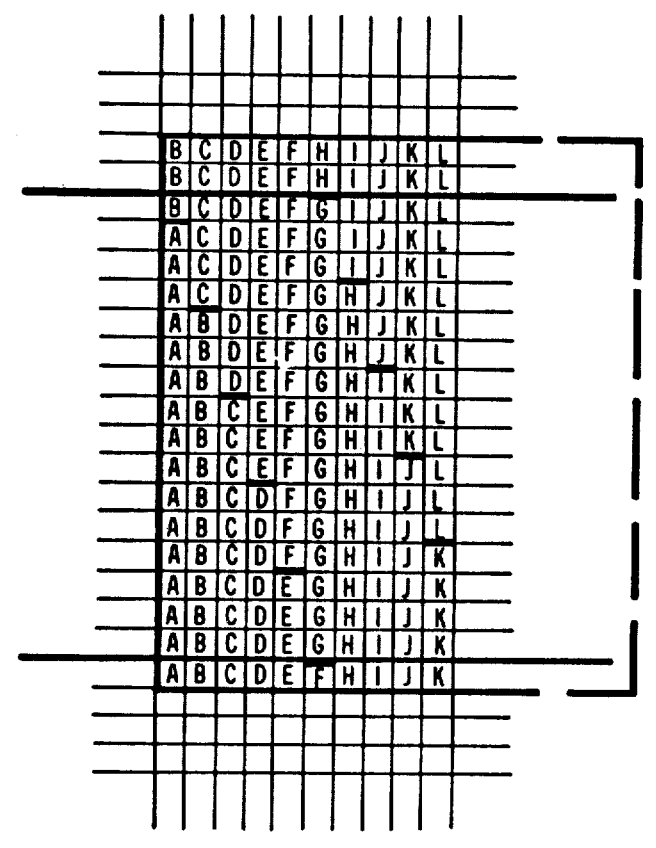

FIGS. 12A–B, 13A–B, 14A–B, 15A–B, 16A–B, 17A–B and 18A–B demonstrate the operation of the ROS printer controller depicted in FIG. 1;

FIGS. 19-20 are memory timing diagrams;

FIGS. 21A-B, 22-24, 25A-B, 26A-B, 27-32, 33A-B, 34A-B, 35 and 36 and 41 depict various circuits included within the control circuits block depicted in FIGS. 3A and 3B; and FIGS. 37-40 show the detailed circuits of the packetizer depicted in FIGS. 3A and 3B.

DESCRIPTION OF THE PREFERRED EMBODIMENT

Figure 1:
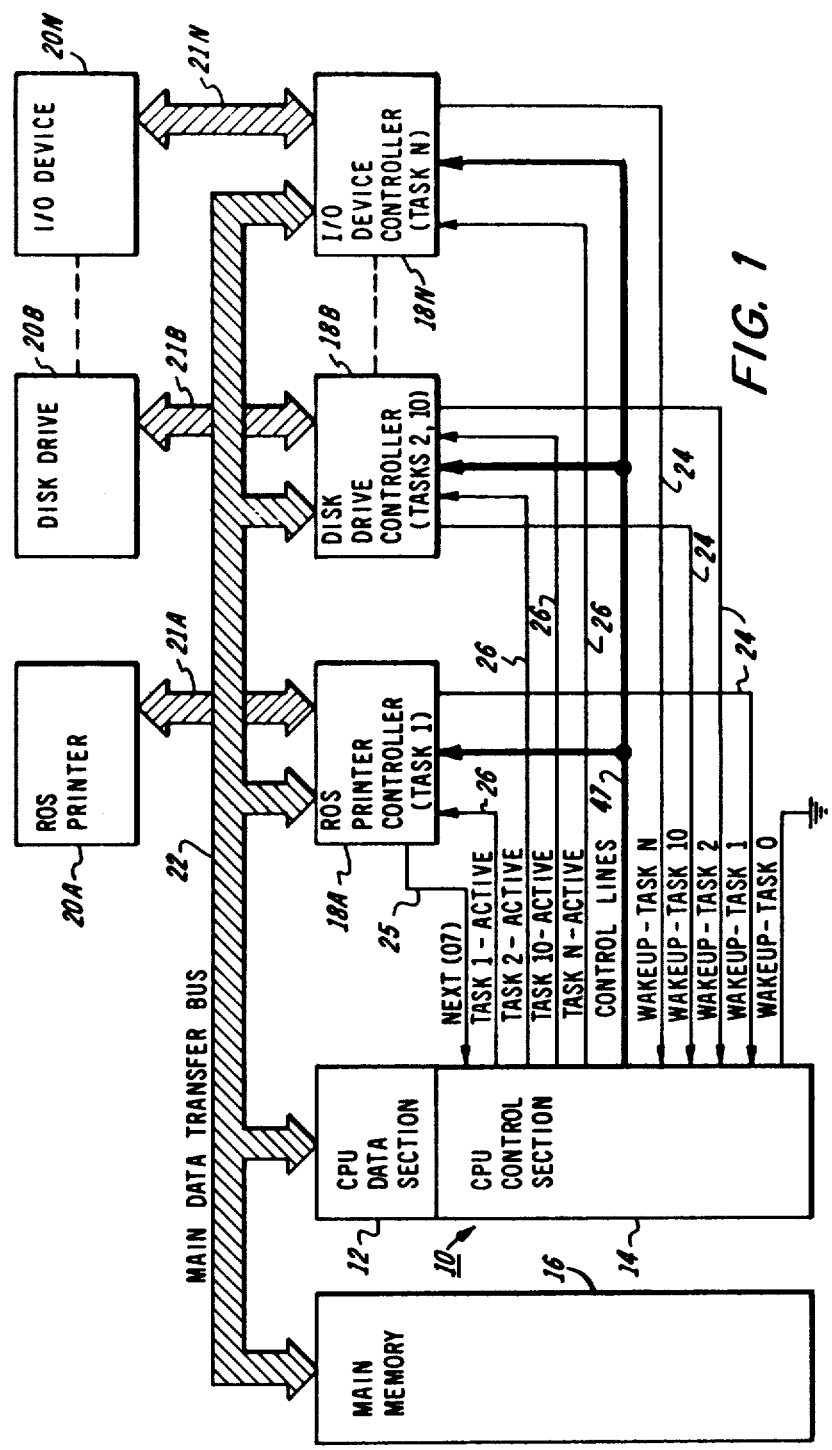
FIG. 1 is a block diagram representation of an electronic image processing system of the invention supplying image data to a ROS printer.

Referring to FIG. 1, an electronic image processing system of the invention is shown. The system includes a central processing unit (CPU) 10 that is comprised of a data section 12 and a control section 14. The system also includes a main memory 16 and a plurality of input-output (I/O) controllers 18A-18N (referred to collectively as "controllers 18"). Each of the controllers 18 is connected to a respective one or more of a plurality of I/O devices 20A-20N (referred to collectively as "I/O devices 20").

In accordance with the invention, the I/O controller 18A is a raster-output-scanned (ROS) printer controller which communicates along an interface 21A with the I/O device 20A which is preferably a ROS printer. Other ROS devices could be employed as well, such as CRT displays, etc. The I/O controller 18B is preferably a disc drive controller which communicates along an interface 21B with the I/O device 20B, in this case a disc drive. Similarly, all other I/O controllers 18 communicate with one or more respective I/O devices 20 along respective interface lines or busses 21. Samples of other typical I/O devices that may be employed as I/O devices 20 in the system of FIG. 1 are display devices, keyboards, cursor control devices, and multipoint data communication systems of the type disclosed in U.S. Pat. No. 4,063,220.

Information is transferred to and from the data section 12 of the CPU 10 by means of a main data transfer bus 22. The information is transferred in bit-parallel format. The CPU 10 is preferably designed to operate in 16-bit format, i.e., 16-bit quantities are transferred to and from the data section 12 along the bus 22, which would then be comprised of at least sixteen parallel lines. Information may be transferred on the data bus 22 between the main memory 16 (preferably adapted to store 16-bit words) and the data section 12, between the I/O controllers 18 and the data section 12, as well as between each of the I/O controllers 18 and the main memory 16.

Each of the I/O controllers 18, including the ROS printer controller 18A and the disc drive controller 18B, is capable of generating at least one "wake-up" signal whenever the particular I/O controller 18 requires one or more services to be performed by the CPU 10. In accordance with the preferred embodiment, the ROS printer controller 18A generates one wake-up command (WAKEUP-TASK 1) and the disc drive controller 18B generates two wake-up commands (WAKEUP-TASK 2, WAKEUP-TASK 10). The significance of the task numbers will be described below. The WAKEUP-TASK request signals from the controllers 18 are applied on respective lines 24 to the control section 14 of the CPU 10. In order for each I/O controller 18 to be informed when the CPU 10 is executing instructions relating to the requested service, the control section 14 includes means to be described below for applying TASK ACTIVE status signals on lines 26 from the control section 14 to the I/O controllers 18, as shown in FIG. 1. There is one task-active line (TASK 1-ACTIVE) associated with the ROS printer controller 18A and two task-active lines (TASK 2-ACTIVE, TASK 10-ACTIVE) associated with the disk drive controller 18B.

Figure 2:
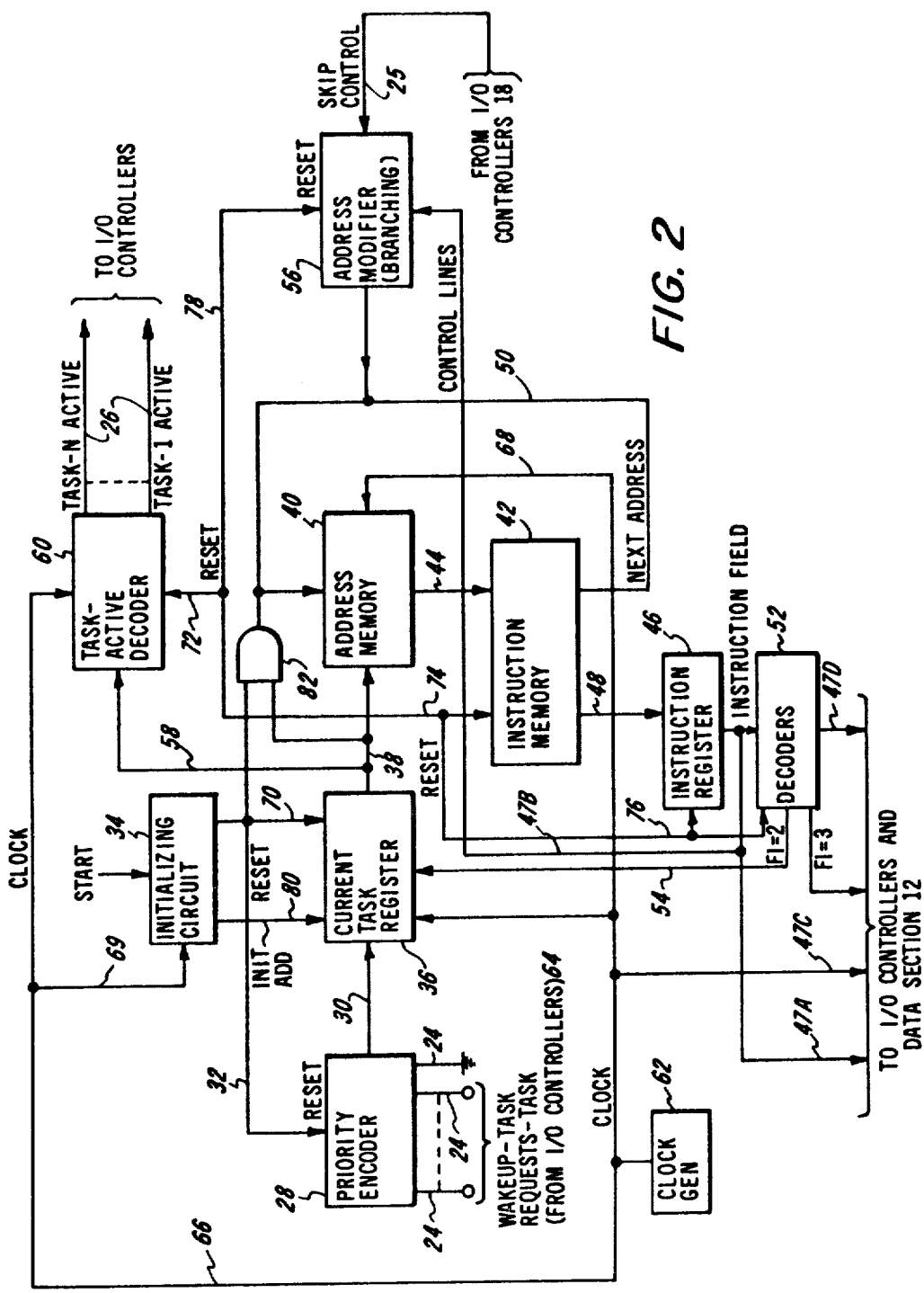
FIG. 2 is a block diagram representation of the control section of the CPU depicted in FIG. 1.

Reference is now had to FIG. 2, where a preferred control section 14 of the CPU 10 will be described. At the outset, it must be stated generally that the control section 14 applies instructions to the data section 12 for execution thereby. Additionally, instructions are applied to the various I/O controllers 18 for execution thereby. The instructions are forwarded in accordance with a particular sequence or routine to be carried out and identified with a particular task to be serviced. The control section 14 includes means to be described below for determining which of a plurality of WAKEUP-TASK request signals that may have been applied to the control section 14 has the highest current priority value. More specifically, each of the plurality of tasks to be serviced is preassigned a unique priority number or value. Thus, performing a request service for the disk drive controller 18B may be of higher priority than performing a requested service for ROS printer controller 18A. In The preferred embodiment of the invention, such is indeed the case. The control section 14 then forwards instructions associated with the highest current task to be serviced to the data section 12 and respective I/O controller 18 for execution.

Referring now in more detail to FIG. 2, the control section 14 includes a priority encoder 28 which has WAKEUP-TASK request inputs connected to the task request lines 24. As explained above, WAKEUP-TASK request signals for task 1-N are provided from the I/O controllers 18. Additionally, a WAKEUP-TASK request signal for task 0, which requests servicing the main program, is always present. The priority encoder 28 includes circuitry (not shown) for generating a multi-bit control signal on a respective plurality of lines 30 related to the highest priority WAKEUP-TASK request signal currently applied as an input to the encoder 28. The priority encoder 28 includes a further input for receiving a RESET signal on a line 32 from an initialize circuit 34 to be described in more detail below.

Now then, the control signal developed on lines 30 is applied to respective inputs of a current task register 36 which responds to such control signal for generating a multi-bit address signal that is applied in bit-parallel format on a respective plurality of lines 38 from the register 36 to respective inputs of an address memory 40. The address memory 40 includes a plurality of storage locations, preferably defined by a respective plurality of multi-bit registers (not shown). There are preferably N such registers included in the address memory 40, each one being addressed by a unique multi-bit code defined by the address signal applied thereto from the current-task register 36 on lines 38.

Each one of the N registers in the address memory 40 is associated with a respective one of the N tasks to be performed, as defined above. In actuality, each of the address memory registers is capable of storing the next address of an executable microinstruction stored in a microinstruction memory 42. In this respect, each of the N address memory registers may be thought of as a program counter for its respective task to be serviced relative to the corresponding microinstruction routine stored in the instruction memory 42.

Each instruction stored in the memory 42 is accessed in response to a corresponding address signal applied on address lines 44 from the address memory 40. Each instruction includes an instruction field preferably comprised of twenty-two bits, and a NEXT ADDRESS field preferably comprised of ten bits. The specific constitution of the 22-bit instruction field will be described in more detail below in connection with FIG. 3. The instruction field is loaded into an instruction register 46 on lines 48 and is then applied through appropriate decoders 52 (also to be described in more detail below in connection with FIG. 3) to the data section 12 of the CPU. Certain of these decoded instructions are also forwarded to one or more of the controllers 18. The NEXT ADDRESS field is fed back on lines 50 to the currently addressed register in the address memory 40. In this manner, each of the N registers in the memory 40 will always contain the address of the next microinstruction stored in the instruction memory 42 to be executed in accordance with the particular task to be serviced.

A portion of the twenty-two bit instruction field of each microinstruction may be dedicated to various special functions, some of which are applied to control lines 47A to respective ones of the I/O controllers 18 for controlling same, and some of which are applied on control lines 47B to address modifier circuits 56 for branching. In accordance with the preferred embodiment, there are two, four-bit special function "subfields" in the instruction field of each microinstruction (hereinafter referred to as the "F1" and "F2" subfields). Two of the sixteen four-bit codes capable of being defined in the F1 sub-field (e.g. F1=2, F1=3) are respectively representative of "TASK" and "BLOCK" functions. A TASK signal component of an accessed instruction, upon being decoded by an appropriate one of the decoders 52, is applied on a line 54 to the current task register 36 for enabling same to load an address signal, representing the current highest priority task requesting service. This address signal is then applied to the address memory 40. A decoded BLOCK signal is applied to the ROS printer controller for reasons to be described below.

Continuing with a description of FIG. 2, the control section 14 of the CPU 10 further includes conventional address modifier circuits 56, which, in a known manner, are responsive to instructions on control lines 47B or SKIP CONTROL signals on lines 25 from the I/O controllers 18 for modifying the NEXT ADDRESS signal being fed back on lines 50 from the instruction memory 42 to the address memory 40. As is conventional, such address modifiers are used for controlling branching. Specific details of a preferred address modifier 56 may be had by reference to U.S. Pat. No. 4,103,330.

The multi-bit address signal developed at the output of the current task register 36, in addition to being applied to the address memory 40 on lines 38, is also applied on lines 58 to a task-active decoder 60. The decoder 60 responds to the address signal output of the register 36 and generates one of the N TASK-ACTIVE signals alluded to earlier on its respective line 26, dependent upon the current highest priority task to be serviced. The decoder 60 includes a delay circuit (not shown) for delaying the application of a TASK-ACTIVE signal to the respective I/O controller 18 by one clock cycle of the processor. In this manner, the appropriate TASK-ACTIVE signal will be generated at a time corresponding to the execution of instructions related to the task being serviced.

The control section 14 as shown in FIG. 2 also includes a clock generator 62 for generaing appropriate CLOCK signals for application to the current-task register 36 on a line 64, the TASK-ACTIVE decoder 60 on a line 66, the address memory 40 on a line 68, the initialization circuit 34 on a line 69, and to various I/O controllers 18 on control lines 47C.

Still referring to FIG. 2, the initialization circuit 34 is responsive to a START signal generated when the system is reset by the operator. Upon receipt of the START signal, conventional circuitry in the circuit 34 causes a RESET signal to be generated which is applied to the priority encoder 28 on line 32, to the current task register 36 on a line 70, to the task-active decoder 60 on a line 72, to the instruction memory 42 on a line 74, to the instruction register 46 and decoders 52 on a line 76, and to the address modifier 56 on a line 78. Upon receipt of a RESET signal, these various components of the control section 14 are reset. RESET is also sent out to the various I/O controllers 18.

Further details of the control section 14 of the CPU 10 may be had through a review of the aforementioned U.S. Pat. No. 4,103,330.

The data section 12 of the CPU 10 preferably includes a number of registers, such as a 32 register file, a "T" register, an "L" register, a memory address register (MAR) and an instruction register, as well as an arithmetic logic unit (ALU) and a constant memory (all not shown). The registers are connected to each other and to the ALU through the main data transfer bus 22. The constant memory is also connected to the bus 22. Specific details of the preferred data section 12 form no part of the present invention and thus will not be described herein. Such details, however, if desired, may be obtained through a review of copending U.S. Application Ser. No. 806,781 filed on June 15, 1977 in the names of Edward M. McCreight and Charles P. Thacker and assigned to the assignee of the present invention.

Figure 3:
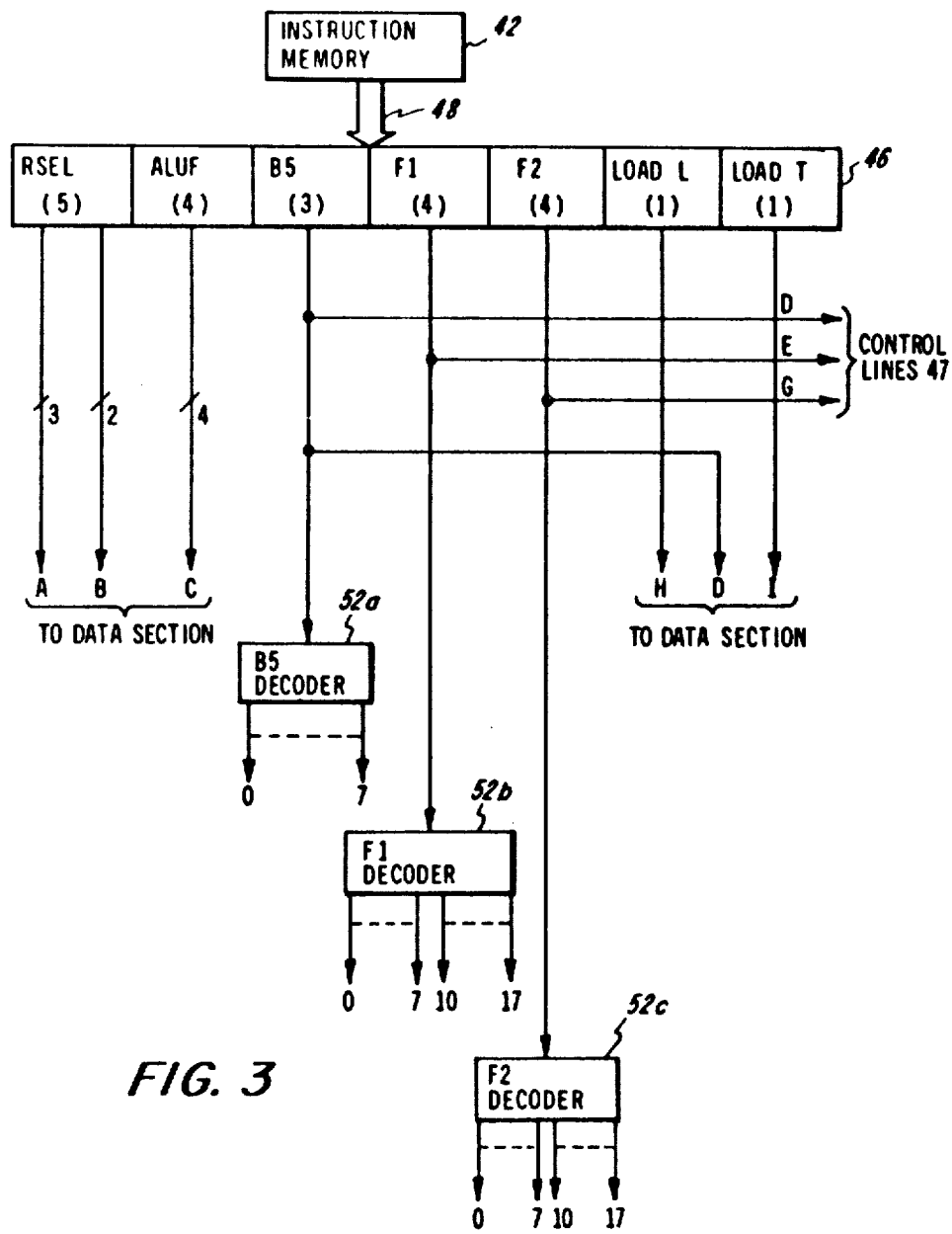
FIG. 3 is a representation of the microinstruction field from the instruction register depicted in FIG. 2.

Referring to FIG. 3, the specific nature of the 22-bit instruction field of a 32-bit microinstruction accessed from the instruction memory 42 (FIG. 2) will be described. As shown, the 22-bit instruction field loaded into the instruction register 46 includes seven "subfields" as follows:

| BITS | Hz,1/32 SIGNAL | MEANING |
| --- | --- | --- |
| 0-4 | A, B | Register File Select |
| 5-8 | C | ALU Function |
| 9-11 | D | Bus Data Source |
| 12-15 | E | Function Field 1 (F1) |
| 16-19 | G | Function Field 2 (F2) |
| 20 | H | Load L Register |
| 21 | I | Load T Register |

Thus, signals A, B together define an address for the 32 register file in the data section 12, signal C controls the functions to be performed by the ALU in the data section 12, signal D controls the source of data supplied from the data section 12 to the main data transfer bus 22, and signals H and I respectively control the loading of the L and T registers (not shown) in the data section 12. The two function fields specify the address modifiers on lines 47B (FIG. 2). Additionally, upon decoding by decoders 52b and 52c (FIG. 3), the two function fields specify various load signals for registers in the control section 14 and other special conditions required in the CUP 10. Various non-decoded function control signals are also forwarded on lines 47D to various I/O controllers 18, and these provide the main mechanism whereby the I/O controllers are, in turn, controlled by the CPU 10. A number of decoded function control signals are applied to the disk drive controller 18B, for example. As shall be seen below, the ROS printer controller 18A itself has decoders for decoding the F1 and F2 function field, such fields being supplied to the controller 18A along control lines 47A. Additionally, the ROS printer controller 18A receives the pre-decoded BLOCK signal, F1=3, from the decoder 52b (FIG. 3).

The preferred CPU 10 as just described and the ROS printer controller 18A to be described below cooperate in carrying out the two primary tasks performed by the electronic image processing system of which they are a part. The first task is that of "image generation," in which a binary representation of a video signal is prepared at high speed. The second task is that of "transmission" of the prepared video signal to a raster output scanner (ROS). As will be seen, there are really three levels of operation in performing these two tasks. The first level is accomplished by software program routines stored in the main memory 16 of the CPU 10. A second level of operation is accomplished by the microcode program routines stored in the instruction memory 42 of the CPU 10 operating in conjunction with the ROS printer controller 18A. Lastly, a third level of operation is accomplished by the hardware included in the ROS printer controller 18A. The specific nature of these three highly integrated levels of operation will be described in detail below.

Before engaging in such description, it should be noted that the ROS printer 20A (FIG. 1) preferably contains a ROS printing head and a printing engine (both not shown) that responds to the scanning light beam of the ROS head to create an image of a page of text material that is then developed onto a record medium. An exemplary printing engine is a xerographic printing engine, such as that used in the Xerox 7000 duplicator, and an exemplary ROS head is a laser-scanning head of the general type as used in the Xerox 9700 computer printer. The ROS printer 20A also preferably includes a ROS adapter (not shown) that enables the ROS printer controller 18A to communicate with the ROS head in the printer 20A via a standard set of interface lines 21A. Details of a preferred ROS adapter are disclosed in copending U.S. Application No. 899,137 filed concurrently herewith in the name of Ronald Rider and assigned to the assignee of the present invention. Details of the standard interface lines 21A will be desribed below.

We will now talk about the first primary task of the electronic image processing system, i.e., "image generation." We will start from the premise that a page of text has been created and a summary table thereof has been generated by the software and stored in the main memory 16. As used herein, the term "text" shall be deemed to refer to image data comprised of either or both normal alphanumeric characters in any of a variety of fonts and sizes, other special characters, such as symbols, shapes, icons, etc., and graphical lines. As used hereinafter, all such types of objects shall be referred to as "characters". The summary table will include a list of every character on that page of text. Specified for each character will be the type of character it is (e.g. A, a, Q, 3, 8, etc. or other special symbol code) and the size and type of font (e.g. pica, elite, italic, bold etc.), i.e. an encoded description of the symbol which completely identifies its form. Additionally, for each character is listed its "x" and "y" coordinates on the page raster. The concept of x-y coordinates is important and will be described in detail below. Suffice it to say at this point, and relative to the summary table identified above, that it defines the location on the page raster of the lower left hand corner of an imaginary minimum encompassing rectangle for each character, where the x value defines the scan line number and the y value the bit location along the scan line.

The "lower left" convention followed in this description is purely arbitrary and was selected for a "landscape" scanning mode, where the page raster would be scanned in lines parallel to its length starting in the lower left hand corner of the page. Either protrait or landscape printing may be accomplished with the invention.

The information recorded in the summary table above described forms a complete description of a page to be printed. Typically, it will be stored on a disk of the disk drive 20B and loaded via bus 22 into the main memory 16 at the time printing is to be done. The table may have been constructed originally by a program operating in conjunction with an operator using a keyboard (one of the I/O controllers 18) to create a page of text.

Figure 8:
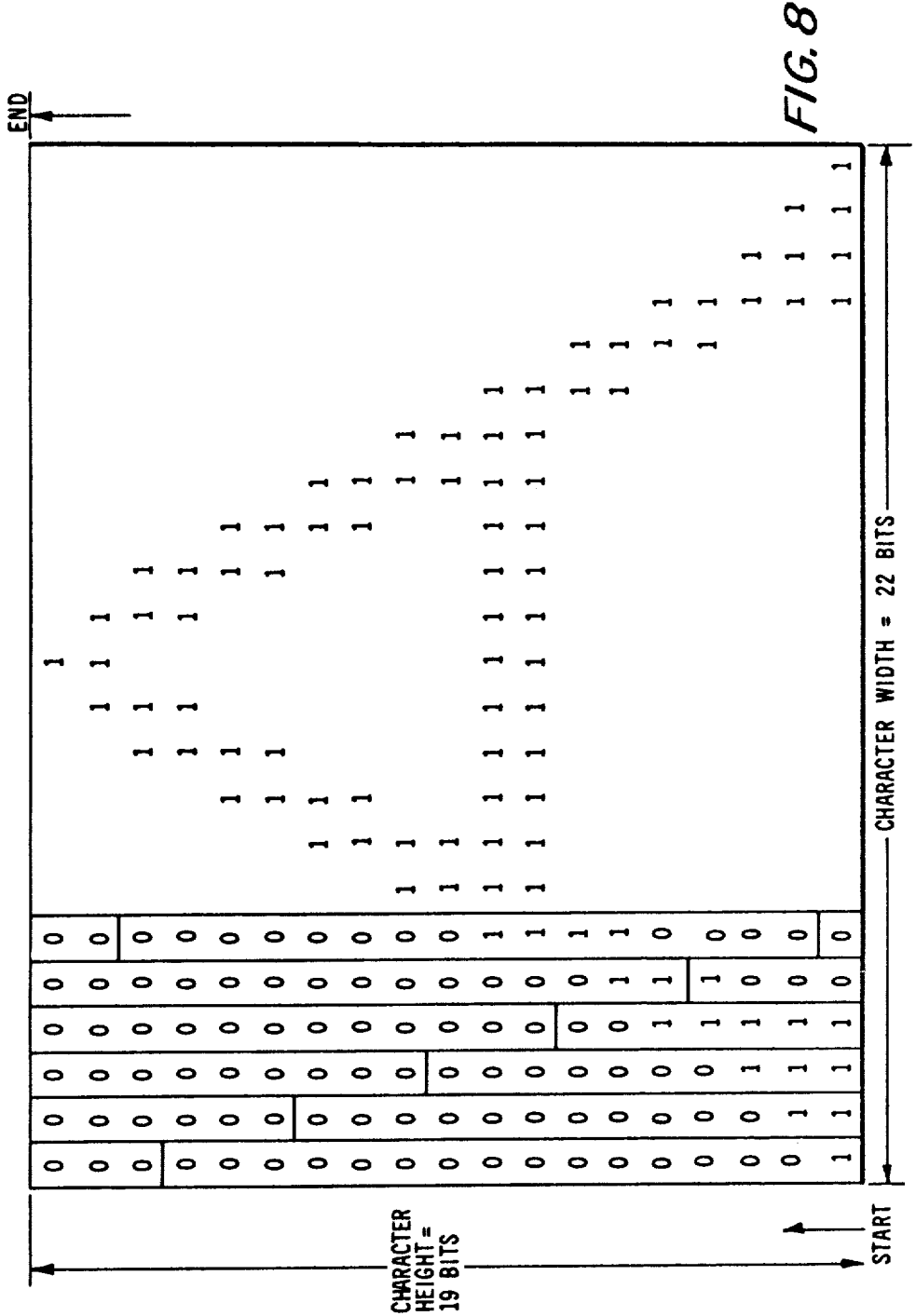
FIG. 8 shows an exemplary character font data bit map of the character letter "A"

For each entry in the summary table, the code identifying the character type, size, etc. is used to address a software font table also stored in the main memory 16. The font table has stored, for each possible type of character capable of being printed (for all font styles, sizes, etc.), a "bit map" representation of such character. There may in fact be a plurality of font tables, each containing all selectable characters in a unique font style. Initially, the character font tables are stored on a disk in the disk drive 20B, but are then loaded into the main memory 16 under program control. An exemplary bit map for some form and size of the letter "A" is shown in FIG. 8, where successive 16 bit words starting at the lower left would be stored in the font table in the main memory 16. It is noted that the shape of the character form, i.e. its "template", is what is defined in its bit map. It should be noted that horizontal and vertical lines of any thickness form special types of characters that need not be defined by a bit map in main memory since their rectangular templates consist of all binary "1's".

The reason the summary table of character identification information is prepared in lieu of a bit map representation of the entire page has to do with the amount of main memory that would be required to store the latter. For example, to store the complete image of an 8½ inch ×11 inch page scanned at 350 bits/inch would require $11.5 \times 10^6$ bits, or some 710,000 words of the main memory 16 (each word being 16 bits in length). Consequently, and in order to reduce main memory storage requirements, the page raster is generated incrementally, using smaller band buffers (see buffers A and B in FIG. 4B to be described below). The unit of buffering is called a "band" and, in accordance with the preferred embodiment, is defined by a group of 16 consecutive scan-lines.

Band images are generated in the same order that the ROS printer 20A accepts the scan lines that comprise the bands. In the case of the printer 20A, which desirably scans in landscape mode, the band corresponding to the left-most 16 scan lines on a page is created first, then the next band of 16 scan lines to the right of the first, and so on. The "image generation" task of the electronic image processing system of FIG. 1 is to prepare the raster describing each band faster than the ROS printer 20A takes the band rasters away.

The CPU 10, under software program control, scans the list of character identification information for each page of text i.e. scans through the summary table in main memory 16. While scanning, the software "sorts" the characters in order of increasing "x" coordinates. Then, when it is desired to transfer the raster image data for the "next" band from the font table in the main memory 16 to the ROS printer controller 18A, the program selects characters successively until it reaches one whose x coordinate exceeds the band's right most scan line. Assuming that there are characters whose raster scanned image starts in that band, i.e. whose coordinate lies within the band, when the memory is stepped to the location of each such character, its character identification pointer addresses the font table. The successive words in this table define the bit map for the character. These words are then loaded sequentially onto the bus 22 to the ROS printer controller 18A under control of the microcode program as will be described below.

It oftentimes happens that a character in the page raster will span more than one band, since each band, being only 16 scan lines wide, is about 1/25 inch in width (at 400 lines/inch). Accordingly, the concept of a "character segment" is hereby introduced as that portion of the total rectangular box defining each character that lies in each band. Whereas the first character segment (the one to the far left) may have a band-relative x coordinate in the middle of the band, yet all other character segments for that character will have band-relative x coordinates equal to zero, i.e. at the first (leftmost) scan line, for each succeeding band.

Now then, if only a portion of a character would be transferred to the ROS printer controller 18A for a particular band, certain "left-over" information must be stored and tabulated by the microcode program so that when computing the ensuing band it knows where in the character font bit stream (stored in the font table) to resume when sending the character font data for the next character segment to the ROS printer controller 18A. The summary table in memory described above would not suffice as it only contains the pointer to the beginning of the font table. Furthermore, left-over width information must be preserved which tells how much of the character remains to be processed. For these reasons a "left-over" table is defined by the microcode in the main memory 16. This table stores for each band the same character data as originally stored in the summary table, but with revised x coordinate and width information for the remainder of the character. In addition, the left-over table stores a binary value pointing to the particular bit location in the font memory where the last character segment left off. Certain of this left-over data is developed by the ROS printer controller 18A and is supplied to the main memory 16 under microcode control, as will be seen below.

One can now start to appreciate the integral and cooperative nature of the software program routines stored in the main memory 16, the microcode program routines stored in the instruction memory 42, and the hardware contained in the ROS printer controller 18A insofar as the "image generation" and "image transmission" tasks are concerned. Details of the ROS printer controller 18A and related control aspects of the software and microcode in relation to these two tasks will be described below with reference to FIGS. 4–41. Specific details of the software and microcode program routines related to the ROS printer controller 18A are contained in appendixes A and B attached hereto.

Figure 4A:
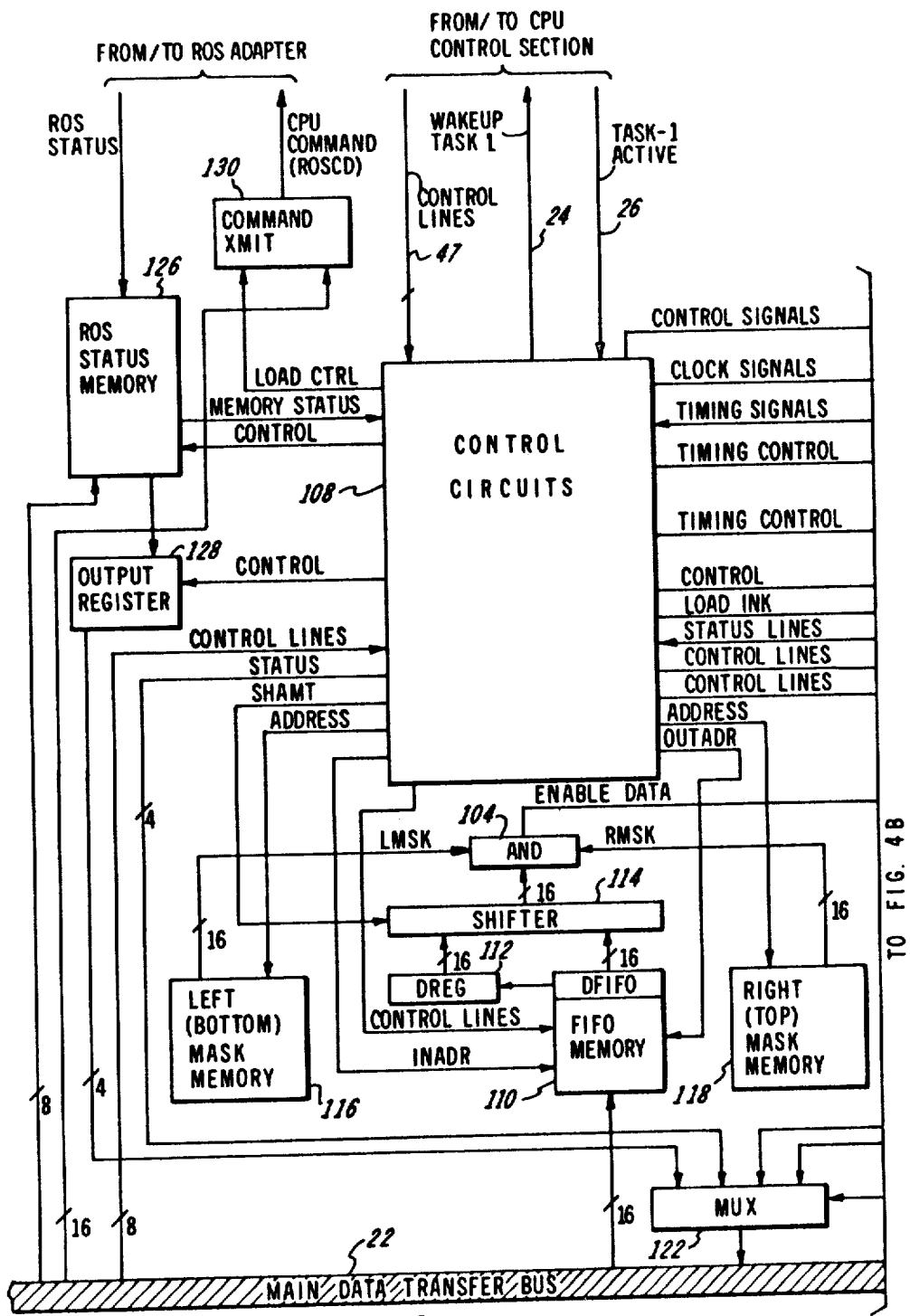
FIGS. 4A and 4B, represent a block diagram representation of the ROS printer controller depicted in FIG. 1.
Figure 4B:
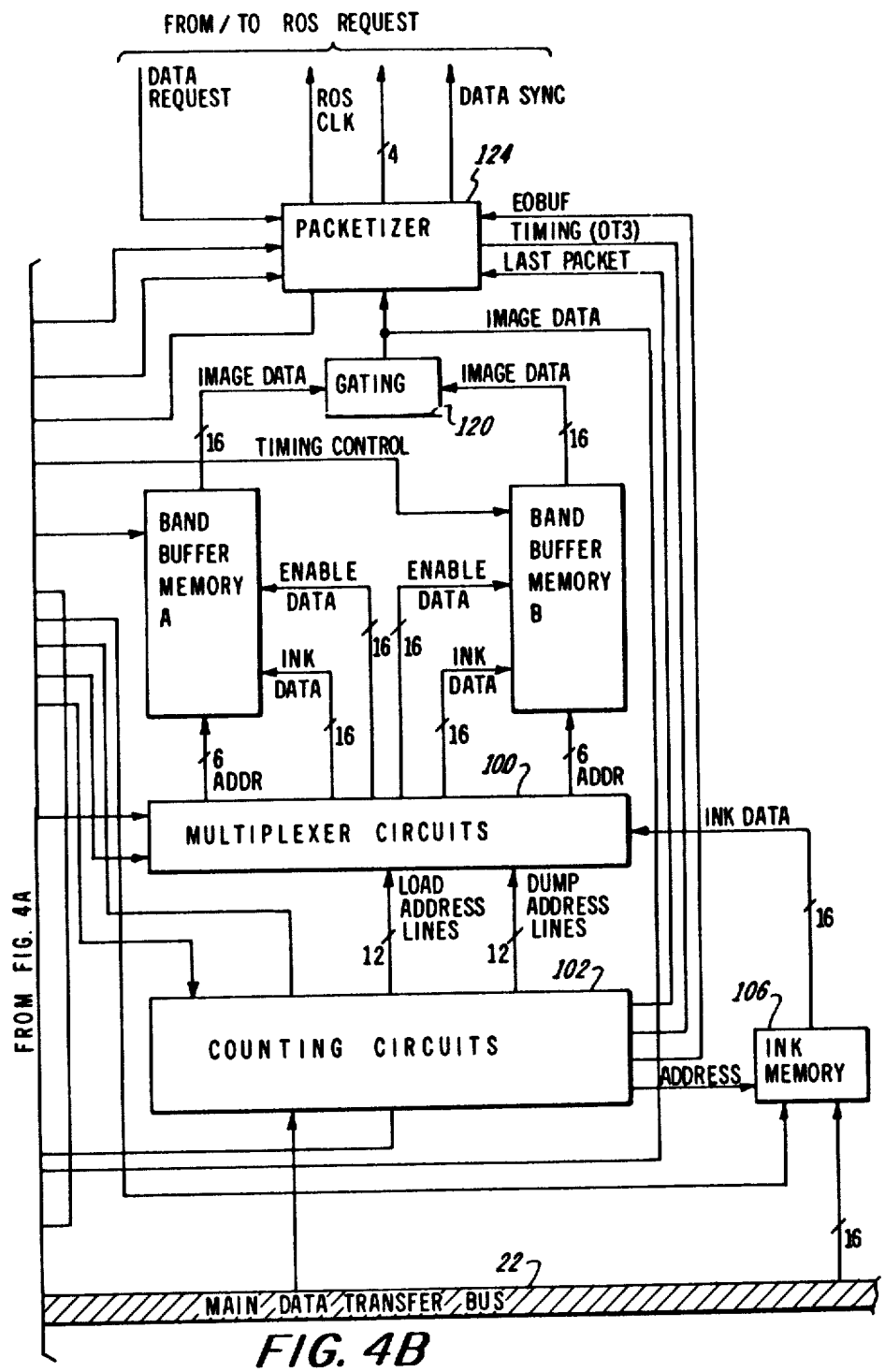

Referring now to FIGS. 4A and 4B, the ROS printer controller 18A is shown in block diagram form. The main task of the controller 18A is to merge rasters of character font data for the individual character segments of each image band into a buffer memory for that band. By relieving the CPU 10 of the calculations associated with positioning successive character font words of those character segments in each image band into the band buffer memory for that band, it is possible for most text pages to be "converted" on-the-fly while printing (the preferred ROS printer controller 18A can deliver video image data at a rate up to 23 Mbits/second).

The ROS printer controller 18A contains a plurality of, e.g. two, band buffer memories A and B. These are preferably each capable of storing 4096, 16-bit words. At 400 lines per inch, each memory A and B thus represents a vertical band of about 1/25 inch in width. As will be seen below, the memories A and B alternate in the sense that when one is being filled with the font words describing each character segment in a particular band, the other is being unloaded or "dumped" to the ROS adapter (not shown) in the ROS printer 20A. The memories A and B switch operations each time one is dumped. Accordingly, the microcode program of the CPU 10 desirably must have completed filling its band buffer memory prior to switching after the other memory has been dumped. In the unlikely event that it has not, due to the attempted conversion of an extremly complex band raster, then this condition is signaled back to the microcode, as will be discussed below.

Figure 9:
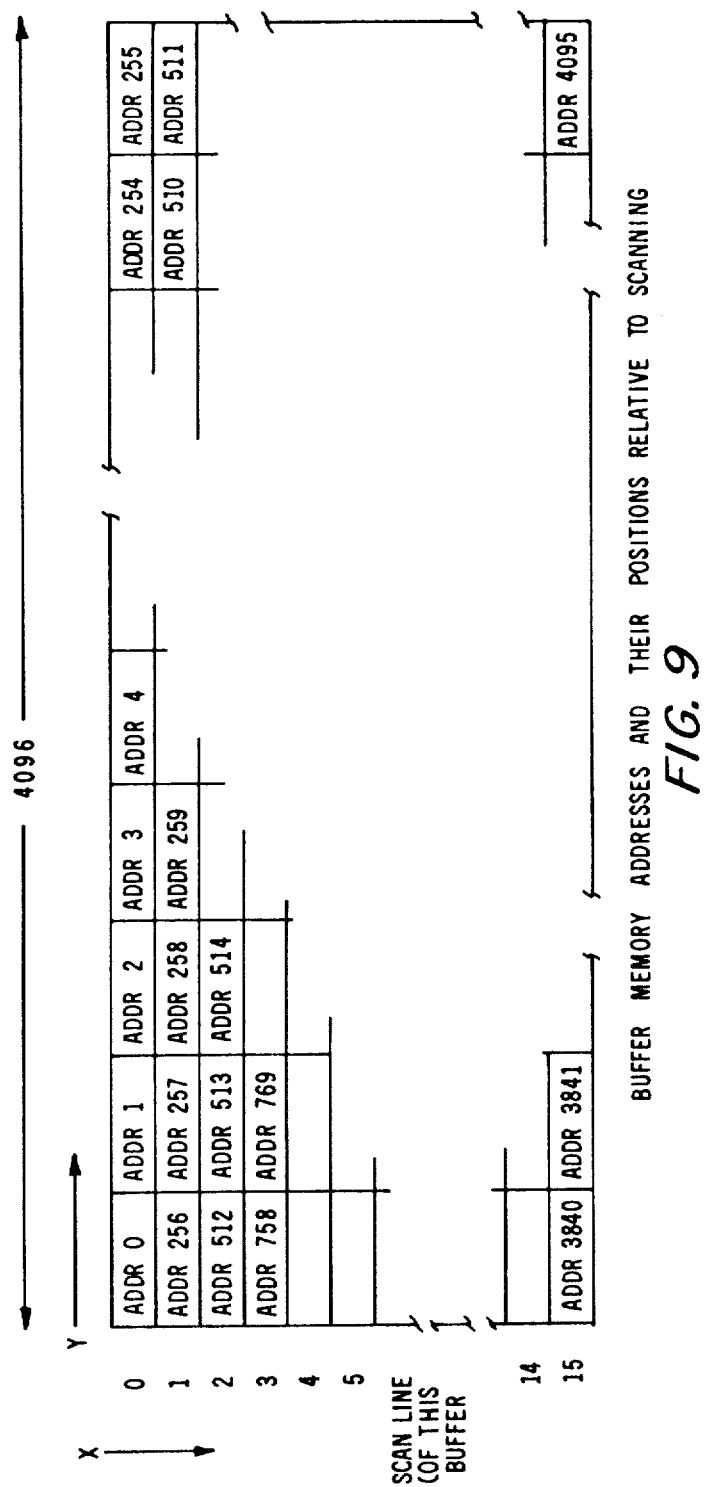
FIGS. 9–11 show various aspects of the band buffer memories depicted in FIGS. 4A and 4B.

Looking at the band buffer memories A and B in FIG. 4B, it will be noted that each has for inputs, i.e. (1) 16 lines of ENABLE DATA (2) 16 lines of INK DATA, (the concept of "ink data" to be described below) (3) 6 lines of address data and (4) various timing control signals. To describe the nature of these four inputs, reference will be made to FIGS. 9-11 which show how the band buffer memories A and B are organized. Referring first to FIG. 9, is be noted that each band buffer memory preferably consists of sixteen, 4K chips which together store one raster band of image data. The contents of address zero (0) of these chips holds the first sixteen bits of the first scan line of the raster band image (1 bit per chip). Address 255 (decimal) holds the last sixteen bits of that scan line. Address 256 starts the second scan line and address 4095 (the last address) stores the last word of the last scan line. This organization makes it possible to access (read or write) up to 16 bits of a scan line in parallel.

Figure 10:
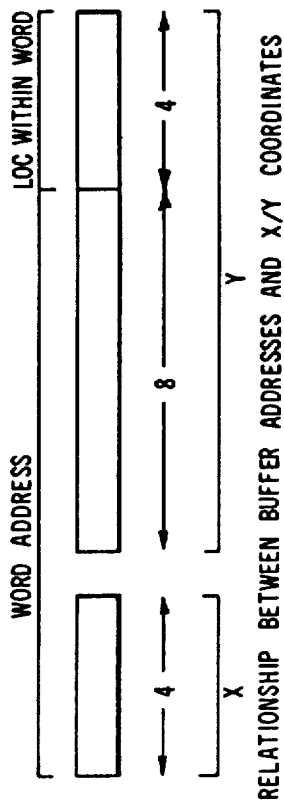

Each word location in each band buffer memory is addressed by a 12-bit address that is comprised of two parts, as shown in FIG. 10, i.e. the high order four bits are given by the scan line number (x coordinate) and the low order eight bits are given by the high order eight bits of the 12-bit vertical position value (y coordinate) in that scan line. The low order four bits of the 12-bit y coordinate form no part of the 12-bit address to the band buffer memories, but serve to indicate a bit position within the selected band buffer memory word.

Each 12-bit address is forwarded to the appropriate band buffer memory A or B from a multiplexer circuit 100, 6-bits at a time, since that is how the chips are designed to accept addresses. The first 6-bits define the "column address" and the last 6-bits the "row address."

Figure 11:
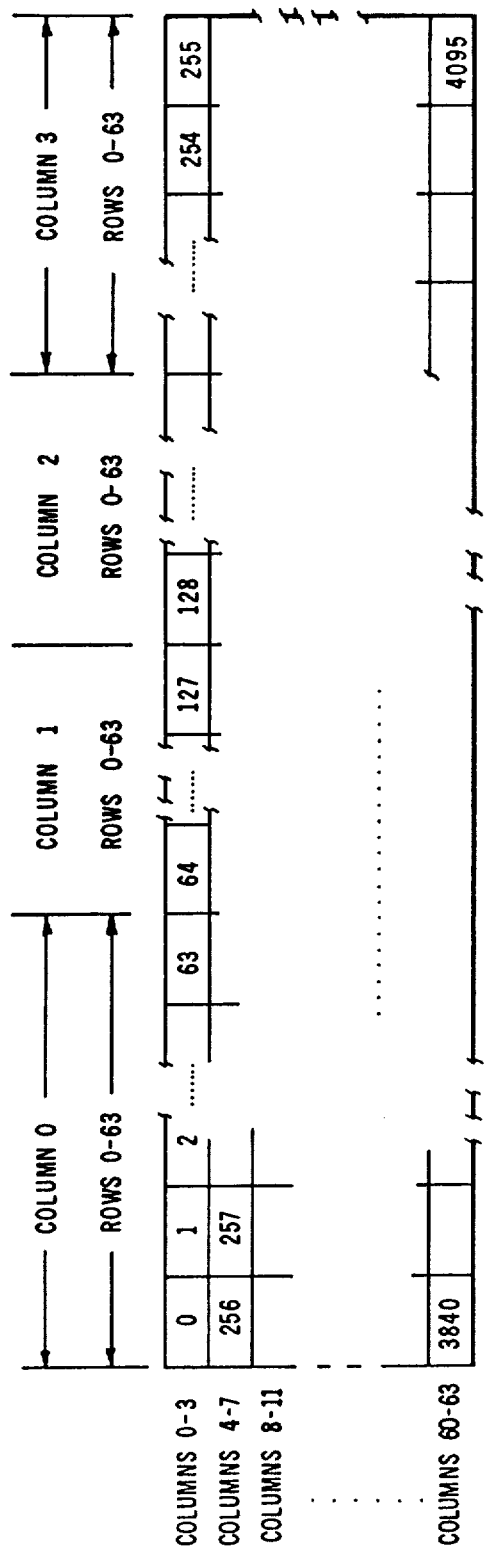

FIG. 11 shows how the 12-bit address of each band buffer memory A and B are split in terms of the memory's 6-bit row and column addresses. The 12-bit memory address supplied to the band buffer memory being filled and the 12-bit memory address supplied to the band buffer memory being dumped are initially applied to the multiplexer circuits 100 circuits from counting circuits 102. Both the multiplexer circuits 100 and the counting circuits 102 will be described in detail below.

Still referring to FIGS. 4A and 4B, the 16 lines of ENABLE DATA are delivered to the band buffer memory that is currently being loaded. The ENABLE DATA is supplied through the muliplexer circuits 100 from the output of an AND-gate 104 to be described below. The ENABLE DATA is derived from the character font data supplied to the ROS printer controller 18A from the font table in the main memory 16 in a manner also to be described below. The 16 ENABLE DATA lines are directed to the addressed location in the band buffer memory being loaded. Those of the 16 ENABLE DATA lines that are binary 1's will cause writing into the corresponding bit positions of the addressed band buffer memory word location.

It will be appreciated from the description to follow that the character font data from which the ENABLE DATA is derived acts as a mask or template of the character to be printed. The actual toning, shading or coloring of the character is done by "inking" the template. More specifically, 16-bits of INK DATA are supplied from an ink memory 106 through the multiplexer circuits 100 to the data lines of the addressed bit positions in the band buffer memory word being filled. The so-called "ink" is "painted" into the memory through the character template defined by the ENABLE DATA lines that have binary value 1. Thus, the band buffer memory is written with the ink only where the template "overlies" it and nowhere else. This gives rise to the need for pre-clearing. For this reason, the band buffer memories, when read, are operated in the so-called "read-modify-write" mode that automatically clears the memory as it is dumped. The band buffer memories A and B are dynamic and must be continuously refreshed. Refreshing occurs automatically upon dumping the memory. Otherwise, refreshing is initiated by the microcode, as will be described in more detail below.

The ink memory is a 16 word by 16 bit memory. The memory is programmed by the microcode upon issuance of a LOAD INK command by control circuits 108. The 16 words are loaded one by one into the ink memory 106 from the main data transfer bus 22. Each 16-bit INK DATA word is associated with a particular one of the 16 scan lines defining a band. The words are set up to define a predetermined pattern of data defining desired half-tones or grey scale tones for the characters. For example, if the characters are all to be black, then each INK DATA word would contain all binary 1's. If a medium gray is to be used, then each INK DATA word would contain alternating binary 1's and 0's, i.e. 1010101010101010. If the characters are to "painted" white, then each INK DATA word would contain all binary 0's. The address to the ink memory 106 is supplied from the counting circuits 102. Actually, such address is simply the 4-bit, x coordinate address (i.e. scan line) within the band buffer memory being filled. This will be described in more detail, where such x coordinate address is referred to as SLC (scan line count). A plurality of addresses is the ink memory is provided to allow half-tone dots longer in dimension than one bit.

The last inputs to the band buffer memories A and B are various timing control signals that are supplied thereto from the control circuits 108. As will be described in more detail below with reference to FIGS. 34A and 34B, these timing signals (ARAS, ACAS, BRAS, and BCAS) control the load timing of the band buffer memories A and B.

The multiplexer circuits 100 and the counting circuits 102 also receive control signals from the control circuits 108 and the counting circuits 102 transmit various status signals to the control circuits 108. These status signals are extremely important in the image generation, or character scan conversion, task to be carried out by the electronic image processing system of the invention and will be described in great detail later.

We have thus far talked about the ENABLE DATA being "derived" from the character font data transferred from the font table in main memory 16 to the ROS printer controller 18A. What does that mean? Referring to FIG. 4A, the ROS printer controller 18A includes a "first-in-first-out" (FIFO) memory 110 that is adapted to receive the character font data words forwarded by the microcode along the bus 22. The FIFO memory 110 is preferably comprised of a stack of 16, 16-bit word registers. The FIFO memory 110 can be addressed by two, 4-bit address pointers, i.e. INADR and OUTADR. The pointer INADR identifies the location in FIFO 110 where the microcode will load the next 16-bit word of character font data in, and the pointer OUTADR identifies the location in FIFO 110 where a 16-bit word of character font data already loaded in is to be accessed out.

Both the INADR and OUTADR pointers are developed by the control circuits 108 and are applied on suitable lines to the FIFO memory 110. At the beginning of each new character segment, the pointer INADR is reset to zero and then each time a character font data word is loaded into the FIFO 110, the pointer INADR is stepped by one. The pointer OUTADR is also set to zero at the start of a character segment and steps forward each time a word is removed from the FIFO memory 110. However, it also must sometimes step backward in order to resurface a previously used word, for reasons to be made clear below.

The values of INADR and OUTADR are continuously monitored and compared by the control circuits 108. Whenever the OUTADR pointer advances to less than two memory locations from the INADR pointer, a signal NEED becomes true which is interpreted by the control circuits 108 in a manner causing such circuits to prevent the removal of any more words from the FIFO memory 110. Whenever the OUTADR pointer advances to less than six memory locations from the INADR pointer, a signal WANT becomes true. This term is interpreted by the control circuits 108 in a manner causing such circuits to generate a WAKEUP-TASK 1 signal to the microcode in order to cause it to load in more character font data.

Since the ROS printer controller 18A has only one task, i.e. task 1, and since that task is next to lowest in priority, as discussed above, it is important that the FIFO memory 110 contain a plurality of locations, sixteen being a presently preferred number. The signals NEED and WANT are helpful in controlling loading and unloading of the FIFO memory 110 in relation to the frequency of service being given the ROS printer controller 18A by the microcode.

As the OUTADR pointer advances, the successive character font data words appear at the top of the FIFO memory 110. Such top memory location is hereinafter referred to as "DFIFO". Each time OUTADR advances, the next word appears at the DFIFO and the previous word is loaded into a register 112 labeled "DREG". Such a step is known as "LOAD". A undirectional barrel shifter 114 is connected to the output lines of both the DREG register 112 and the DFIFO output of the memory 110. The purpose of the shifter is to align character template data with bit positions in the band memory. DREG lies logically to the left of DFIFO. The shifter 114, under control of a shift amount (SHAMT) control signal from the control circuit 108, is capable of selecting some contiguous 16-bit section out of the 32-bit word pair. The left most bit of the section must lie within the DREG register 112. The shifter thus can shift from 0 to 15 bit positions to the left.

In general, the bottom and/or top boundaries of a character segment do not coincide with the word boundaries of the band buffer memories A and B. This is evident in FIG. 12B which shows a character having a height of 29 bits and an x position and width such that the character lies in at least two adjcent bands. Thus, the character has at least two character segments, one for each band. The x-y coordinates of the first and second character segments are shown.

Figure 12A:
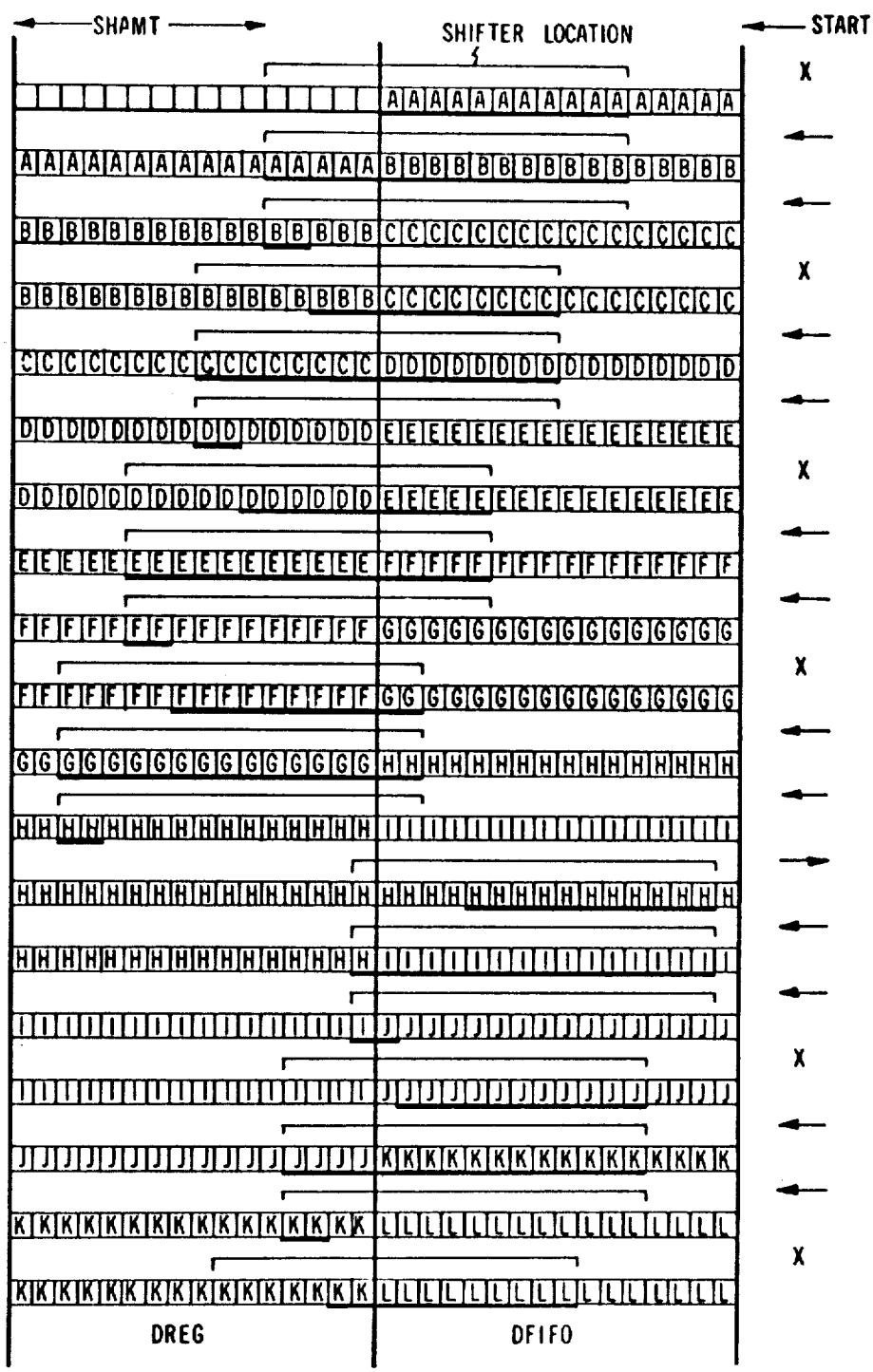
Figure 12B:
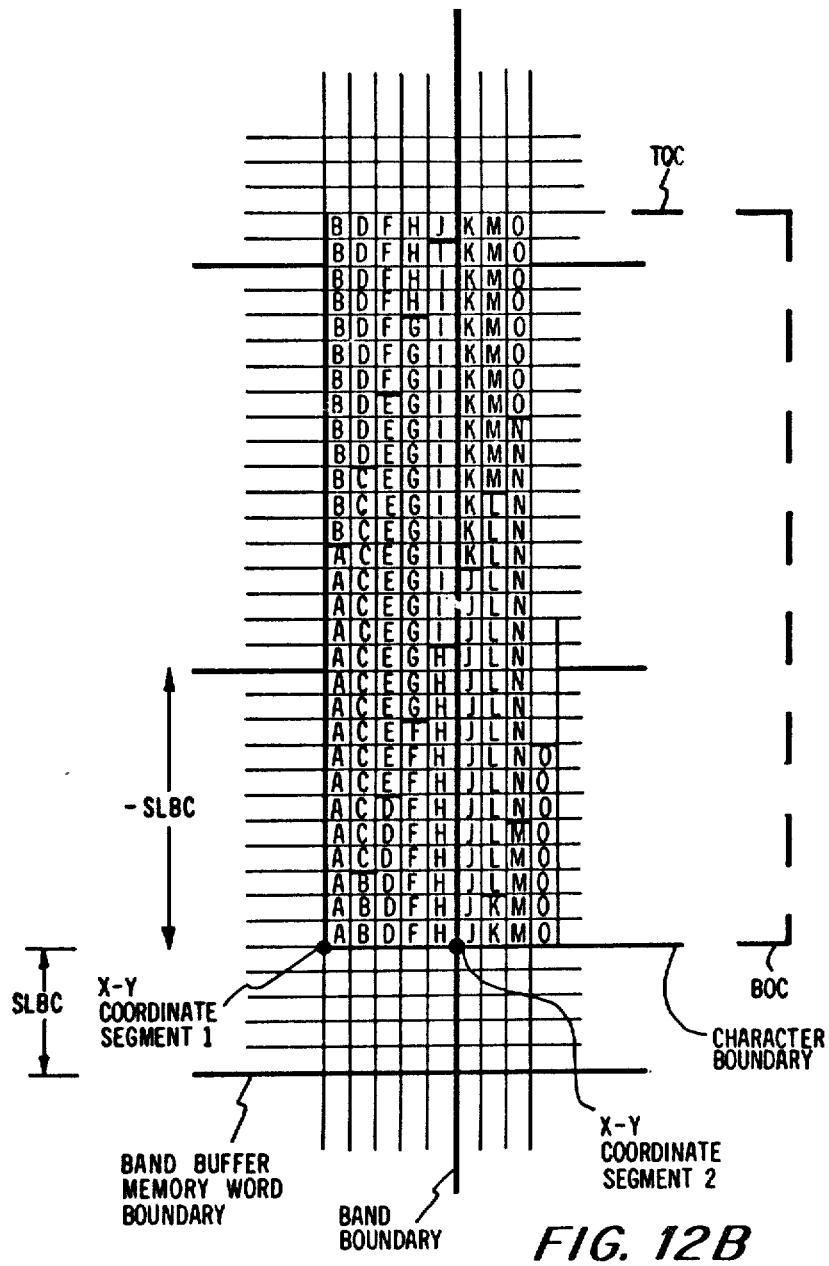
Figure 14A:
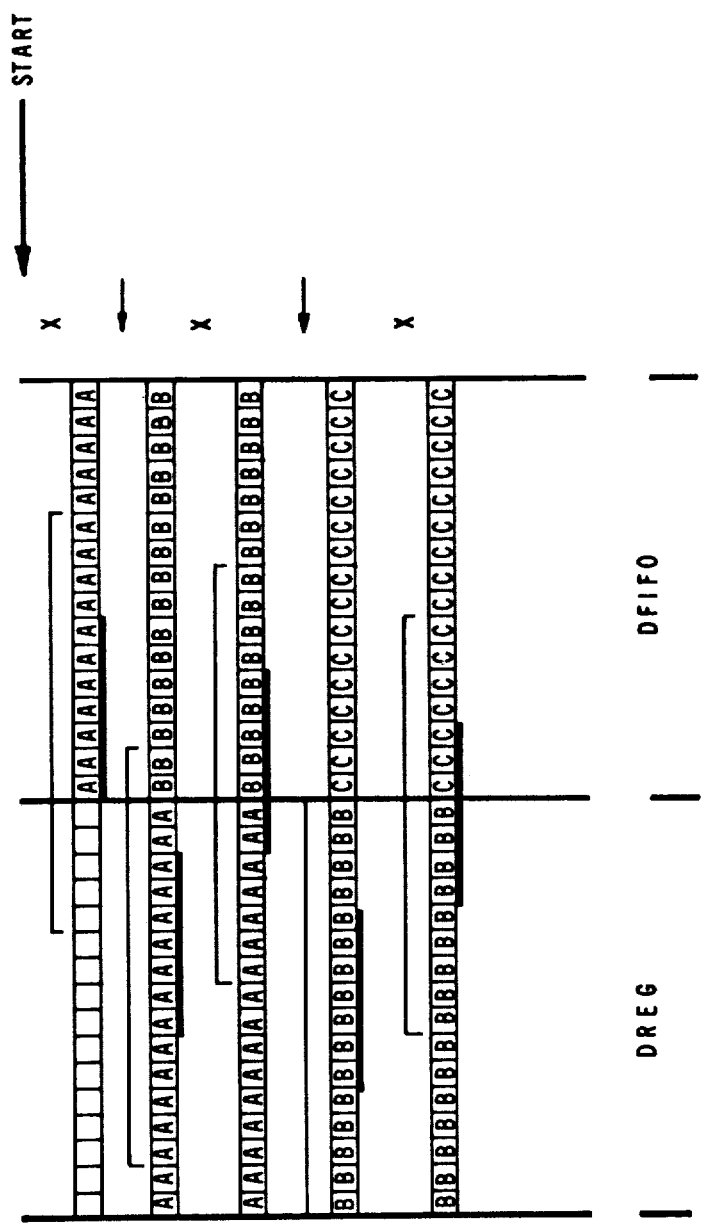
Figure 15A:
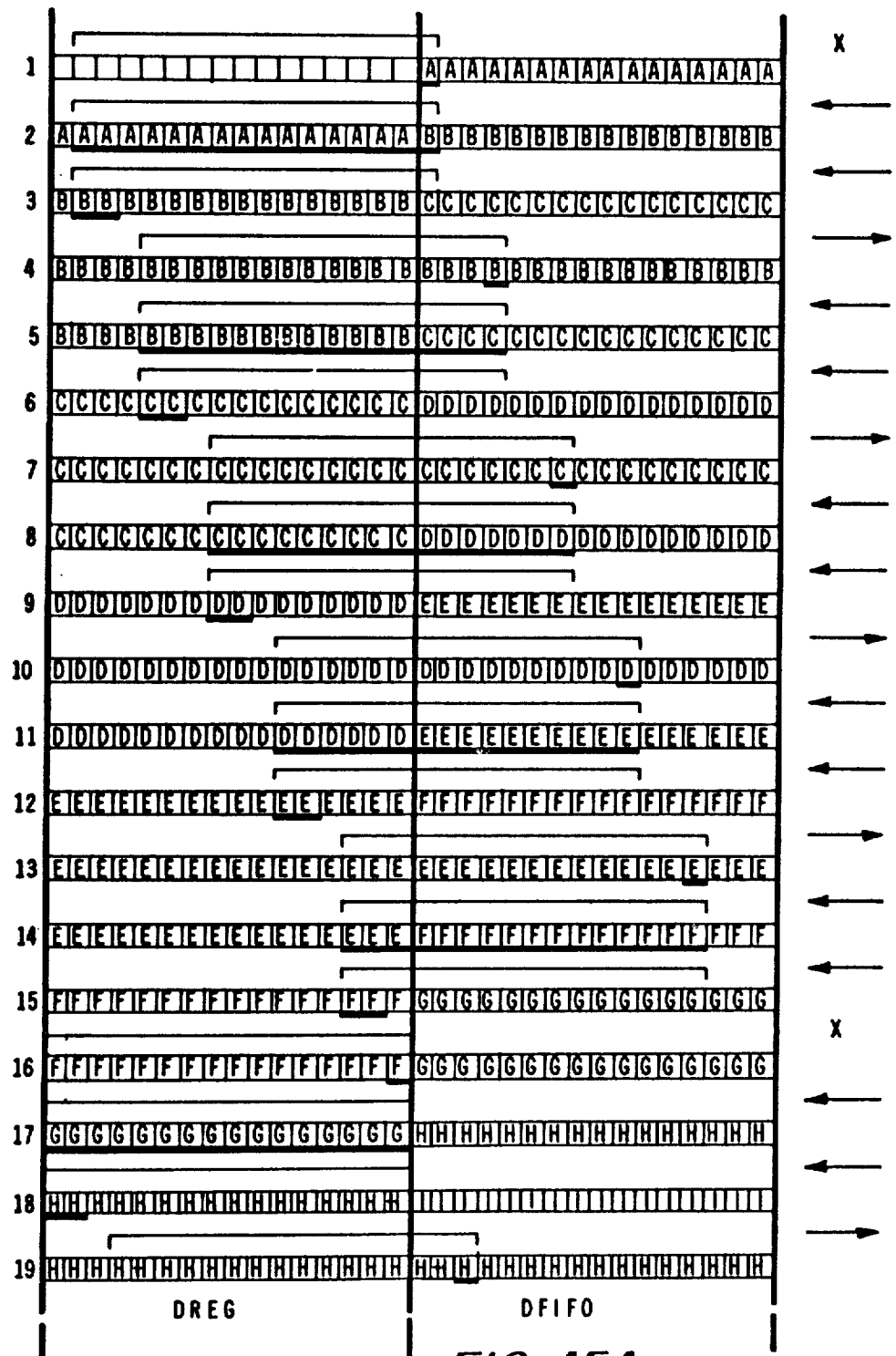
Figure 16A:
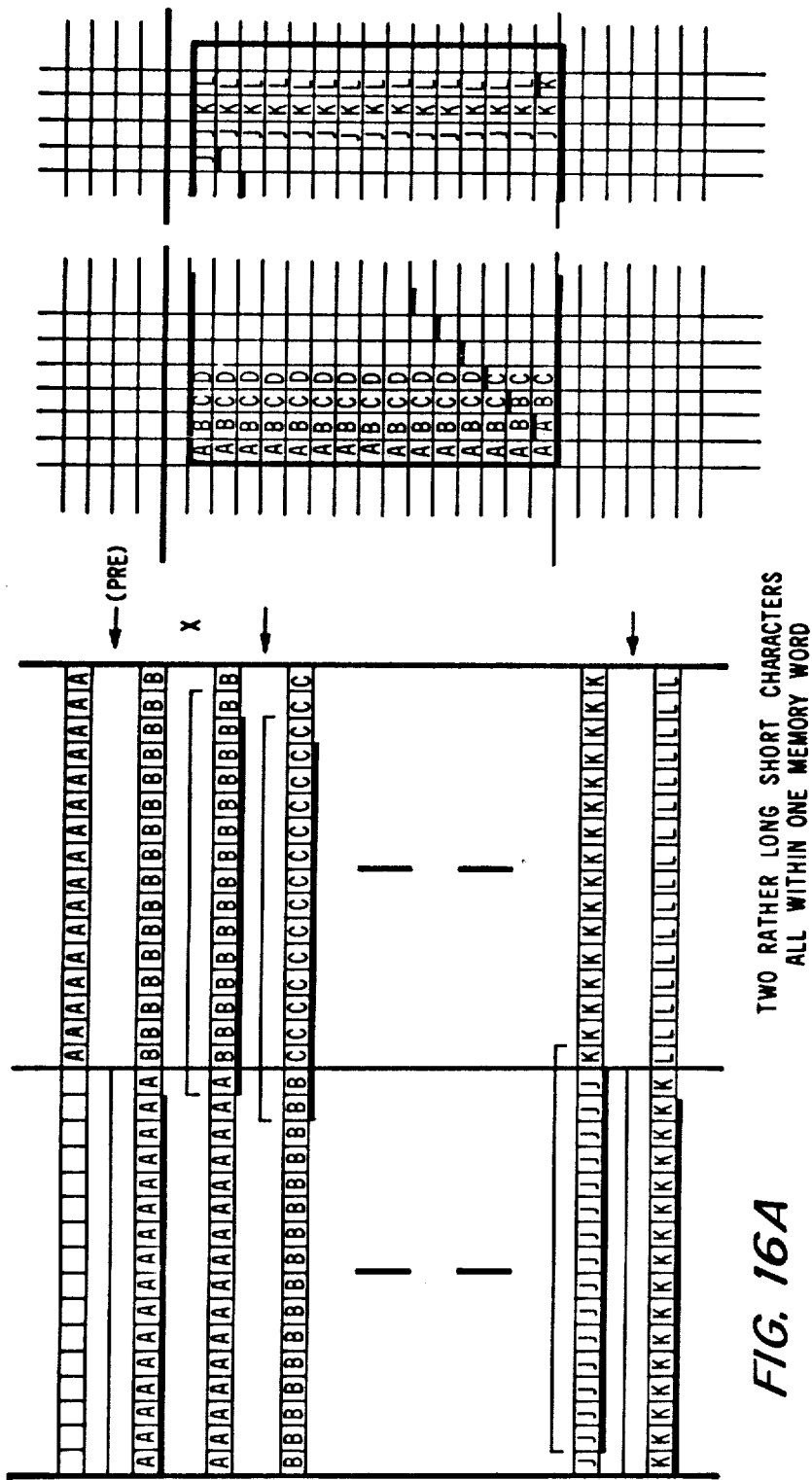
Figure 16B:
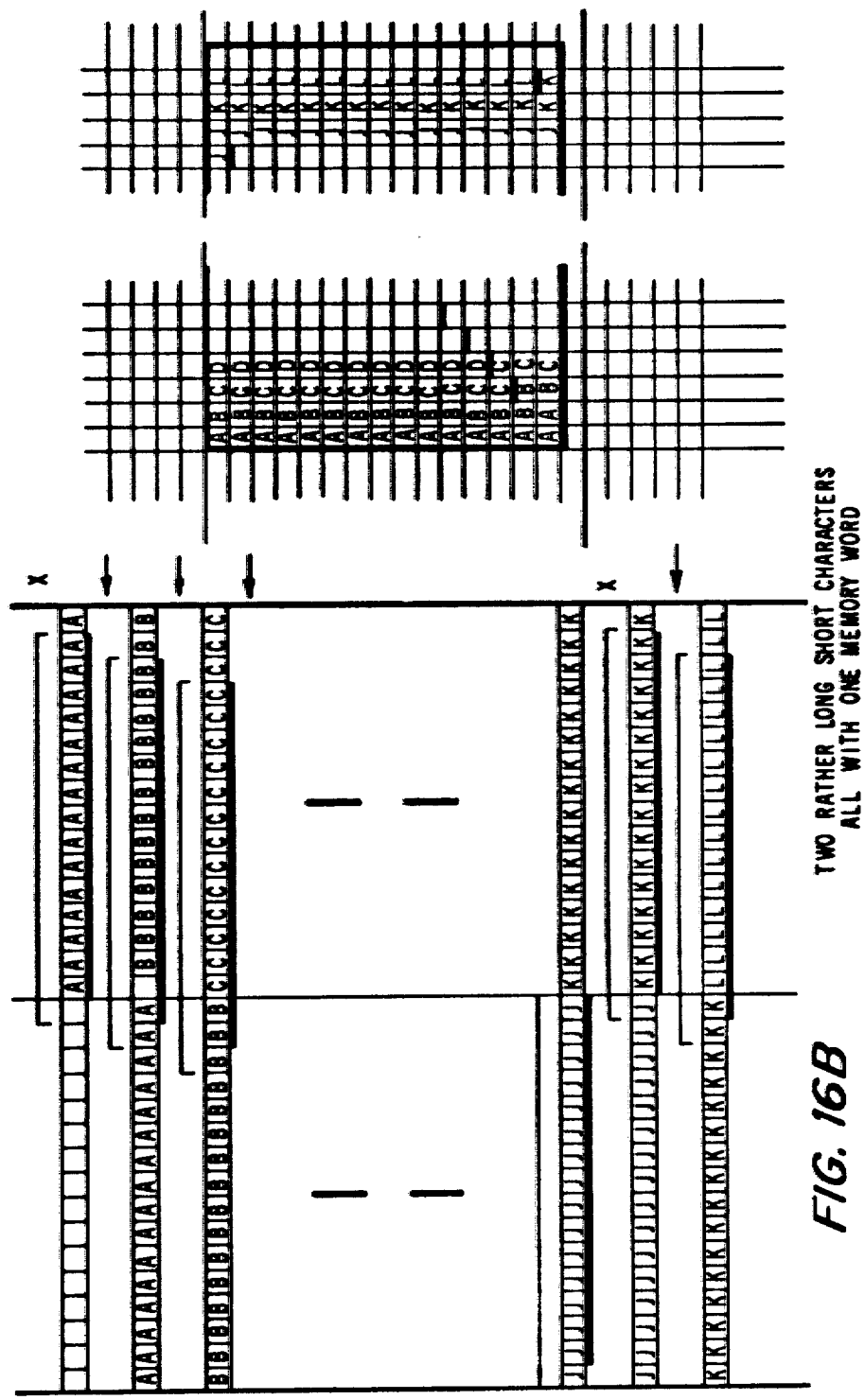
Figure 17B:
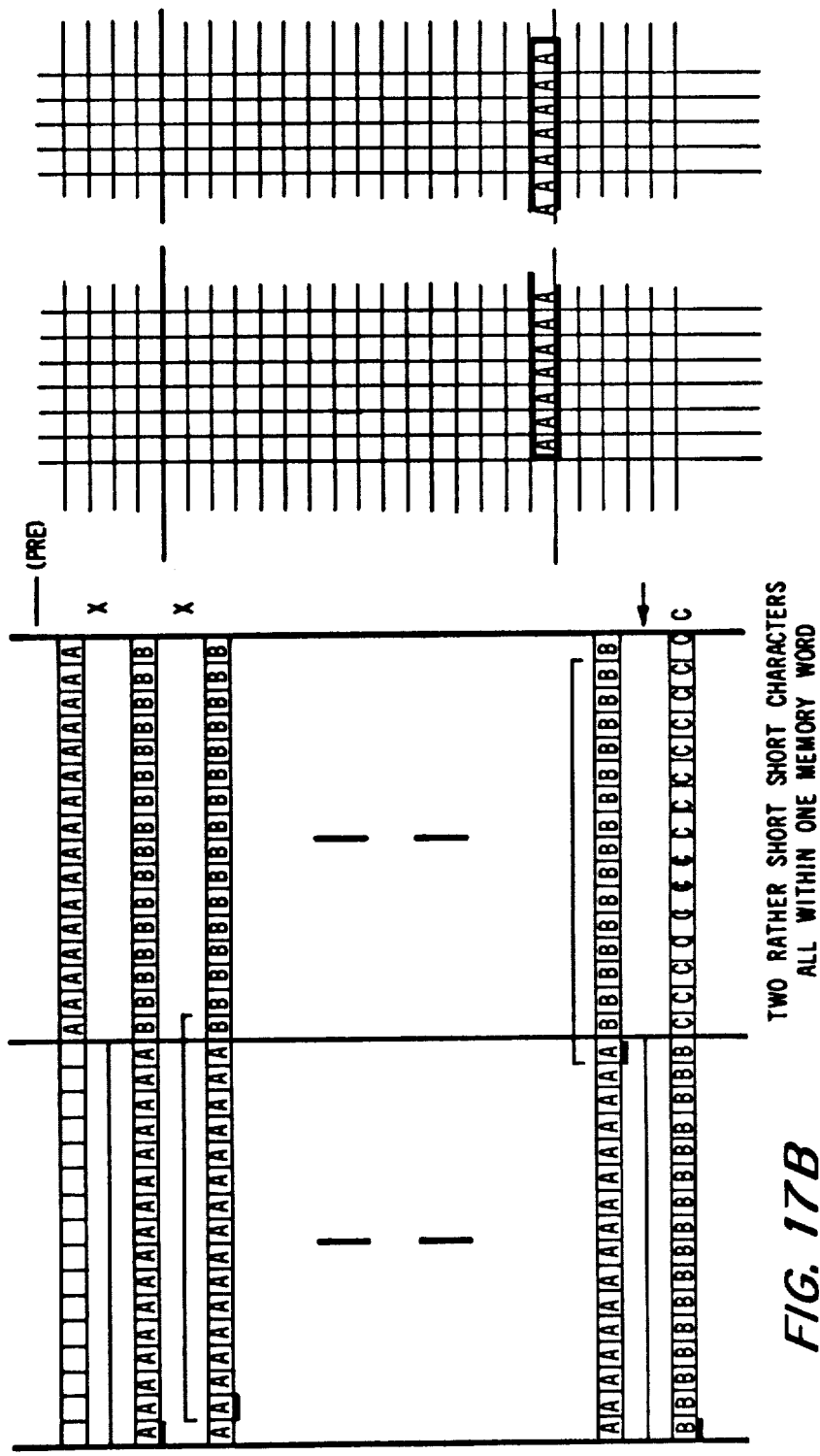
Figure 18A:
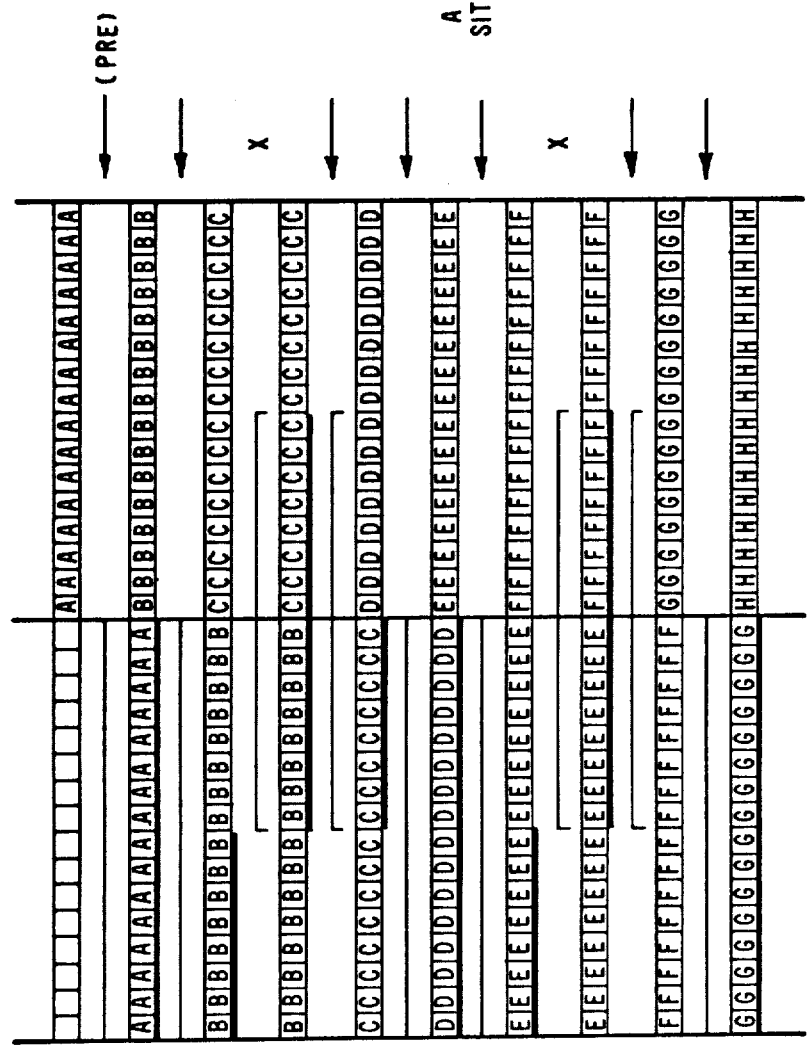
Figure 18B:
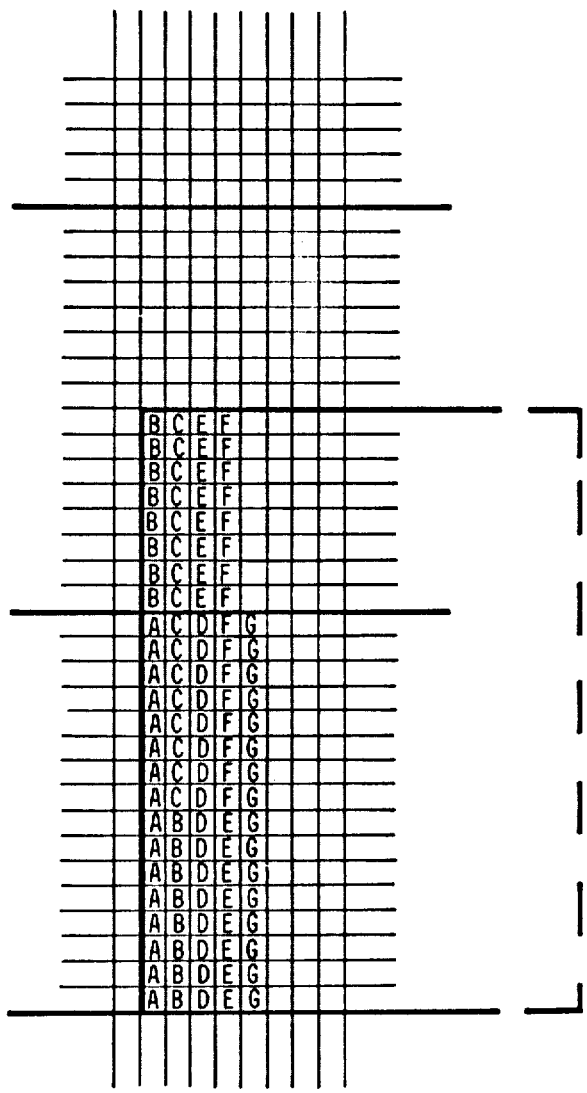

As shown in FIG. 12B, the character lies 11 bits below the lower band buffer word boundary it crosses, and 2 bits above the upper band buffer word boundary it crosses. Since the font data for each character on a page of text is merged into the page raster by writing into all of the band buffer words overlapped by the character segment, it is important to mask the 5 bits below the character and the 14 bits above the character when writing, respectively, the bottom-most and top-most band buffer words overlapped by the character segment. This is accomplished through the use of left and right mask memories 116 and 118, where "left" and "right" are equated with "bottom" and "top", respectively.

Each mask memory 116 and 118 is preferably constituted of a PROM capable of generating any one of 16, 16-bit output signals. The values of the 16 output signals from the left mask memory 116 (LMSK) range from 0000000000000001 for the first possible 16-bit output signal, where all but the top bit in a band buffer word would be masked, to 1111111111111111 for the last possible 16-bit output signal, where none of the bits in a band buffer word would be masked. A similar relationship is true with respect to the values of the 16 output signals from the right mask memory 118 (RMSK). The control circuits 108 determine when and how much masking is required by supplying appropriate address signals to the memories 116 and 118. Precisely how the control circuits 108 determine when and how much masking will be described below.

The output of mask memories 116 and 118 are coupled to the AND-gate 104, which is desirably a "wired-AND". By reason of this arrangement, some of the 16 bits of character font data selected by the shifter 114 may be selectively masked as a result of mask output signals (LMSK and/or RMSK) applied to the gate 104 from the respective mask memories. The output of the gate 104 is then the 16-bits of ENABLE DATA which are presented through the multiplexer circuits 100 to the band buffer memory being filled. As will be recalled, each group of 16-bits of ENABLE DATA are supplied to the enable inputs of the band buffer memory word defined by the 12-bit address applied to that memory.

Referring again to FIGS. 12A and 12B, we can now begin to see how "image generation", or character scan conversion, operates. Thus, we start off in the first band and the software determines that the character depicted in FIGS. 12A and 12B is among those starting in the first band. The x-y coordinate data for that character is then forwarded to the counting circuits 102 where the band buffer memory addresses are processed and forwarded 6-bits at a time to the band buffer memory currently being loaded. The type, size etc. of that character from the software summary table are used to address the character font data out of the font table in main memory 16 (FIG. 1). The character font data is then passed one word at a time by the microcode into the FIFO memory 118.

The first word of character font data is represented by the letters "A" in FIGS. 12A and 12B. (Obviously, the 16-bit positions defining the font data word A may comprise any combinations of binary "1's" and "0's" consistent with the particular font data representation of the character (see FIG. 8). The control circuits 108 determine whether a preliminary LOAD (PRELOAD) is required through means to be described below. In the example of FIGS. 12A and 12B, no PRELOAD is necessary. Consequently, the control circuits compute the initial shift amount (SHAMT) and apply that signal to the shifter 114. It will be noted that the initial SHAMT amount is equal to 11. The 16-bits applied to the AND-gate 104 are the right-most, 5-bits in the DREG 112, and the left-most 11-bits in the DFIFO register of memory 118.

Since the bottom of the character segment does not coincide with the bottom of a band buffer memory word boundary, the left mask memory 115 is addressed to call out the LMSK signal 0000011111111111, thereby insuring that the first 5-bits of the ENABLE DATA sent to the band buffer memory are binary 0's. The second 11-bits of the enable data will not be masked, but rather will be the values as selected by the shifter 114, i.e. the left-most 11 bits of the first character font word, "A". The properly selected and masked word is then written into the proper band buffer memory word.

The control circuits 108 next determine whether a LOAD is necessary. This is accomplished in a manner to be described below. In the example of FIGS. 12A and 12B, a LOAD would be necessary, and so the control circuits 108 advance the OUTADR pointer by one to cause the next word in the FIFO memory 118 (word "B") to appear in DFIFO and the previous word "A" to be loaded into the DREG 112. (See line 2 of the left side of FIG. 12). The arrow pointing to the left between the first and second lines indicates that a LOAD has been effected.

The control circuits next recompute the value of SHAMT in a manner to be described below. It turns out that in the example of FIGS. 12A and 12B, the value of SHAMT remains the same for the second band buffer word. It is the case that SHAMT remains constant in value for each scan line once computed for that scan line. It is subject to change when the top of the character is "rounded" and a new scan line is to begin.

After the twelfth string of font data bits are forwarded as ENABLE DATA to the band buffer memory, i.e. the string "HH0000000000000" at the top of the fourth scan line, not only does a LOAD not occur, but the OUTADR pointer is moved back (GOBACK) one step, thereby resurfacing the font data word "H" in the DFIFO. This is necessary since 11-bits of the word "H" had to be positioned on the right side of the shifter 114, and they lay too far to the left in the double word as previously consituted (since the shifter 114 can only shift left and not right). The manner in which the control circuits 108 compute when to GOBACK will also be described in more detail below.

FIGS. 13A-18B show various other exemplary characters, including "short" characters that have a height less than 16-bits. From a detailed review of these figures and FIGS. 12A and 12B, it will become readily apparent how the image generation, or character scan conversion, process works. It must be recalled that the ENABLE DATA transferred to the band buffer memories A and B as a result of the character scan conversion process merely are applied to enable inputs of the memories and thus define only a mask or template through which INK DATA from the ink memory 106 is "painted" in the manner described above.

So far, we have discussed only the processing of character font data and transmission of ENABLE DATA derived therefrom to the band buffer memories i.e. the loading of such memories. Let us now discuss how the band buffer memories A and B are unloaded or "dumped" and how the resultant 16-bits of IMAGE DATA is applied to the ROS adapter (not shown) of the ROS printer 20A.

Appropriate timing signals for controlling the dumping of the band buffer memories A and B are applied from the control circuits 108 to the multiplexer circuits 100 (and then to the appropriate buffer memory) and from the control circuits 108 directly to the band buffer memories A and B. As indicated previously, the latter timing signals are ARAS, ACAS, BRAS and BCAS. The timing control signals applied to the multiplexer 100 are ASWAD and BSWAD. The entire area of timing control will be described below with reference to the description of the control circuits 108 and the timing diagrams of FIGS. 19 and 20.

When one of the band buffer memories A and B is dumped, the 16-bits of IMAGE DATA output are applied to a gating circuit 120. The circuit 120 is capable of gating IMAGE DATA received from either band buffer memory A and B to a multiplexer 122 for transmittal either back to main memory 16 (FIG. 1) along the main data transfer bus 22 or to a "packetizer" circuit 124 for selective transmittal 4-bits at a time to the ROS adapter in the ROS printer 20A.

The primary function of the packetizer 124 is to transmit the 16-bits of IMAGE DATA received from a band buffer memory through the gating circuitry 120 in 4, 4-bit "nibbles". The packetizer 124 is also charged with the responsibility of supplying a packet synchronization signal (DATASYNC) that gets raised when the first 4-bit nibble of each 16-bits of IMAGE DATA is supplied to the ROS adapter. The packetizer 124 also forwards the main clock signal (ROSCLK) to the ROS adapter. It does this on one of 9 signal wires constituting the interface 21A, (FIG. 1). The DATASYNC signal is applied on another one of these wires, and the 4-bit nibbles of IMAGE DATA are applied on four more of the nine wires. The main system clock signal is applied to the packetizer 124 from the control circuits 108, and the packetizer 124 includes circuitry to be described below for developing the ROSCLK signal. A seventh line of the interface 21A transmits a DATA REQUEST signal from the ROS adapter to the packetizer 124 informing the latter that the ROS printer 20A is ready to receive more IMAGE DATA from the ROS printer controller 18A.

The packetizer 124 receives other signals as well. For one, it receives a LAST PACKET signal from the counting circuits 102 which indicates that the IMAGE DATA now being forwarded to the packetizer 124 is from the top of the present scan line of the band. The packetizer 124 also receives an EOBUF signal from the counting circuits 102 which indicates that the last 16-bit word of IMAGE DATA in the band buffer memory being dumped has been sent. The packetizer 124 also includes various timing circuits to be described below. One of the timing signals generated by such circuits, i.e. OT3, is forwarded to the counting circuits 102 to control the generation of a dump address for the band buffer memory to be dumped.

Having described seven of the nine wires constituting the interface 21A, what signals are applied on the other two lines? Referring still to FIGS. 4A and 4B, these two lines respectively transmit ROS printer status (ROS STATUS) signals from the ROS adapter to the ROS printer controller 18A and CPU command (ROSCD) signals from the ROS printer controller 18A to the ROS adapter.

Referring first to the ROS STATUS signals from the ROS printer 20A via the ROS adapter included therein, these are forwarded in series in a constant succession of 257-bit packets. Each 257-bit packet consists of a leading flag bit followed by 256 bits of status information. A dead time of at least 272 bit times intervenes between bursts. The bit rate for ROS STATUS data is preferably one fourth that of the CLOCK rate. Following receipt of the first bit of the 257-bit packet, the remaining 256 bits are loaded into a 256=bit status memory 126 under control of suitable control signals supplied to the memory 126 from the control circuits 108. The control circuits 108 receive memory status signals from the memory 126 identifying when the first bit has been received. The ROS status memory is preferably comprised of 64, 4-bit address locations.

Once the ROS status memory 126 has been filled with 256 ROS status bits, it is unloaded 4-bits at a time using a 6-bit ROS status address signal supplied to memory 126 from the main data transfer bus 22. In response to this address, the corresponding 4-bit ROS STATUS nibble will be read and held in an output register 128. Then, in response to a control signal from the control circuits 108, the ROS STATUS nibble is read out of the register 128 onto the bus 22 through the multiplexer 122. The ROS status address is represented by the rightmost 6bits in the high-order 8-bit field of a 16-bit word transmitted on the main data transfer bus 22 by the CPU 10. These same high order 8-bits are alternately used to designate a starting address (FA) in terms of y-coordinate for the band buffer memory being dumped, as will be described below.

Commands for the ROS from the CPU 10 which are transmitted on the bus 22 are 16-bits long and are loaded into a command transmit circuit 130 upon receipt by such circuit of a LOAD CONTROL signal from the control circuits 108. The commands are transmitted serially along the command data line of the interface bus 21A to the ROS adapter.

It should be noted that the control signals issued from the control circuits 108 in order to control the transfer of data to and from the main data transfer bus 22 are actually derived from microcode instructions delivered to the control circuits 108 from the instruction register 46 along control lines 47 (see FIG. 3). More specifically, they are derived from the two, 4-bit F1 and F2 function fields. As will be described below with reference to FIG. 25, the control circuits 108 include F1 and F2 decoders for decoding these function fields. The decoded signals F1=14 through F1=17, and F2=10 through F2=16 are utilized as control signals by the control circuits 108.

Reference is now had to FIG. 5 where the counting circuits 102 (FIG. 4) will be described.

The counting circuits 102 include a width counter 162. When a new character segment is to have its font data bits merged into the requisite number of bands, the CPU 10, under microcode program control, causes a 12-bit character width value defining the width of the character to be loaded into the counter 162. Loading is accomplished by a microinstruction which has its F2 field equal to binary 1000, which gets decoded by the control circuits to an F2=10 signal that is applied as a load command to the counter 162. Thereafter, as the character segment is processed (scan line by scan line), the counter 162 is decremented once for each scan line as described in more detail below. If the counter reaches zero before the right edge of the band is reached, the character has been completed and the microcode is notified via a next address signal to the CPU control section.

Also included in the counting circuits 102 is a height counter 150 for initially receiving a value representative of the inverse of the character height and for counting that value up each time bits are merged into a word of the appropriate band buffer memory. When the counter is counted up to zero, a "top-of-character" (TOC) signal is generated and applied to the control circuits 108 so that they will know that the top of the character has been reached.

The (inverse) value of the height of each character segment whose font data bits are to be merged onto the band raster in a band buffer memory is applied as part of the character semgnet set up of the hardward by the CPU 10 onto the main data transfer bus 22. Upon issuance of an F2 instruction field of 1010, which is decoded by the control circuits 108 to produce a control signal F2=12, the 12-bit (inverse) height value is loaded from the bus into a height register 152. Thus, the control signal F2=12 is applied as a load control input to the register 152. Upon issuance of a PRETOC control signal by the control circits 108, the height counter 150 is loaded with the value stored in the height register (i.e. the inverse of the height). The signal PRETOC is derived internally by the control circuits 108 and basically represents either an initialization clock period timing signal (PRE) or rounding the top of the character being reached (TOC) during merging of its font data bits into a band buffer memory.

A height adder 154 is also employed for receiving as inputs (1) the current value of the height counter 150 and (2) the "number of bits to use" (NBTU). The value NBTU really represents the number of bits out of the 16-bits selected by the shifter 114 (FIG. 4A) that will be left unmasked to control the repsective enable inputs of the band buffer memory being loaded. The height adder 154 adds the value of NBTU to the current value of the height counter 150 and loads the result into the height counter 150, which thereby becomes the new current height counter value. The height counter 150, height adder 154 and height register 152 are also reset by a MASTER RESET signal supplied to a reset input thereof from the control circuits 108, and further all receive the system CLOCK signal from the circuit 108.

The operation of the height circuitry can best be understood by reference to FIGS. 5A and 12A and 12B. The character shown in FIGS. 12A and 12B has a height of 29 bits. Thus, in response to an F2=12 control signal from the control circuits 108, the 12-bit inverse height signal (reading negative "29" in two's complement form) is loaded into the height register 152. Whenever PRETOC is high, this value is transferred into the height counter, i.e. −29. The first group of enable data bits for the first character segment contain 11 bits that are unmasked i.e. 11 bits of the font word A that are located on the right side of the shifter 114. Accordingly, NBTU would equal 11 and would be added to −29 in the adder 154, thereby resulting in a value of −18 which will be loaded into the counter 150 as the new count. Eventually, the counter will be counted up to zero, thereby applying a TOC signal to the control circuit 108. The control circuits 108 utilize the TOC signal for a number of purposes to be described below.

Still referring to FIG. 5A, the counting circuits 102 include a delta bit counter (DELTABC) 156, a "next-bit-count" (NXTDBC) adder 158 and a delta word counter (DELTAWC) 160. The outputs of the delta bit counter and the delta word counter may be read via the main data transfer bus 22 by the CPU 10 for use by the program in creating the table of "left-overs" discussed earlier.

At the start of the first segment of a character, the delta bit counter 156 is loaded with a 4-bit signal having the value of zero. This is accomplished by the CPU 10 transmitting on the bus 22 a 16-bit signal whose 4 most significant bits represent the delta bit count, which 4-bit count is loaded into the counter 156 pursuant to an F1=15 control signal issued by the microcode and decoded by the control circuits 108. The 4-bit count is presented to the NXTDBC adder 158 along with the value of NBTU for the first band buffer word of the first character segment. In the example of FIGS. 12A and 12B, NBTU would equal 11 for such first word, as described above. Thus, NXTDBC would equal 11. As these first 11 bits are used up in writing the memory, this value is loaded into the bit counter 156 (and is also appied to the control circuits 108 for a reason to be described below).

For the next band buffer memory word in the example of FIGS. 12A and 12B, NBTU would equal 16, so that following the use of these 16 bits, NXTDBC would equal 11 plus 16=27. This is represented as 11 in NXTDBC plus a carry signal which is applied to the delta word counter 160 to step it by one. In this manner, the delta word counter 160 keeps track of the number of full 16-bit words merged into the band raster while NXTDBC counts bits. Continuing with the example of FIG. 12, the next band buffer memory word for this character segment would use only two bits of the 16 selected by the shifter 114. Accordingly, NBTU would equal 2, so that NXTDBC would equal 13. The delta word counter 160 would still equal only one, however, since there will be no further carry from adding in the last 2 bits.

Now then, the process is repeated for each of the remaining four scan lines of the first band, thereby completing merger of the font data bits for the first character segment into the band raster. To avoid any possible confusion, we are of course talking about forwarding the ENABLE DATA derived from such font data to the respective enable inputs of the band buffer memory being loaded. The INK DATA from the ink memory 106 actually "paints" the appropriate shade of the character, as described above.

Once the first character segment has been completed, which is signaled to the control circuits 108 by the combination of an SLC=15 signal and TOC (top of character), this information is passed onto the CPU 10. The values registered in the width counter 162, the delta word counter 160 and the delta bit counter are forwarded to the CPU 10 along the bus 22 under microcode control. The delta word count (12 bits) is applied onto the bus 22 upon receipt of an F1=14 signal from the control circuits 108. The delta bit count (4-bits) is applied onto the bus 22 upon receipt of an F1=15 signal.

Referring again to FIGS. 12A and 12B in conjunction with FIG. 5A, each time the top of the character is rounded, a TOC signal is generated by the height counter 150. The control circuits 108 translate the TOC signal into a TOCGO signal that is essentially "ANDed" with the next occurring CLOCK pulse to cause the width counter 162 to be counted down by one. In this respect, the CLOCK signal is applied as an input to the width counter 162, along with the MASTER RESET signal. At the end of the first band, i.e. at the end of the first character segment, the width counter 162 would have been decremented by 5 in the example of FIGS. 12A and 12B. The resultant count is then applied onto the bus 22 in response to an F1=15 control signal issued by the microcode via the control circuits 108. The software program in the CPU 10 will then know that the character has not yet been completed in the first band, and thus should be listed in the "left-over" table. When the second segment of this character is processed in the next band, the width counter 162 will be loaded with the value of the width remaining, i.e. the value previously transmitted to the CPU 10.

We will now talk about how the band buffer memory addresses are developed by the counting circuits 102 and forwarded to the multiplexer circuits 100. Referring first to the load address (used when writing the image into the buffer memory), the counting circuits 102 include a scan line counter 164, a scan line word counter 166 and a scan line word register 168. The microcode places the 16 bit, x-y coordinate data onto the bus 22 and causes the control circuits 108 to issue and F2=11 control signal. This signal is simultaneously received by the scan line counter 164 and the scan line word register 168 which load fom the bus 22 the 4-bits of x coordinate data into the scan line counter 164 and the high order 8-bits of y coordinate data into the scan line word register 168. The high order 8 bits of y coordinate data, which define the band buffer word address of the lowest word overlapped by the character segment, are loaded into the scan line word counter 166 in response to an itp timing signal (derived from the system CLOCK signal by the control circuits 108) if and only if the condition PRETOC (PRE or TOC) prevails. Under all other conditions, it causes the counter 166 to count up at each occurrence. The scan line counter 164 is incremented by one at the concurrence of a TOCGO signal and a system CLOCK pulse, both signals being applied thereto from the control circuits 108. The scan line counter 164, scan line word register 168 and scan line word counter 166 are reset by a MASTER RESET signal applied to each from the control circuits 108.

The scan line count (SLC) is supplied from the output of the counter 164 to the multiplexer circuits 100 as the 4-bit, x coordinate address of the band buffer memory to be loaded. The scan line word count (SLWC) is supplied from the output of the counter 166 as the high order 8-bit, y coordinate address of the band buffer memory to be loaded. The 4-bit, SLC signal is also applied from the counter 164 to the ink memory 106 (FIG. 4B) to select that one of the 16 ink words therein which corresponds in number to the scan line number represented by the value of the SLC signal. Additionally, the signal SLC=15 is applied to the control circuits 108 for reasons to be described below.

The manner in which the counting circuits 102 derive a 12-bit dump address for application through the multiplexer circuits 100 to the band buffer memory being dumped will now be described with reference to FIG. 5B. As shown, the counting circuits 102 include a first address (FA) register 170 that is loaded with 8 bits representing a starting word in the band buffer memory in terms of the high order 8-bit, y coordinate. The load occurs upon receipt by the register 170 of an F2=15 load control signal from the control circuits 108.

A scan line word number counter 172 is provided for receiving the FA signal from the register 170 as a starting value and for then counting up. The FA signal is loaded from the register 170 into the counter 172 each time a signal TOSL (top of scan line) applied to a load input is true at clock time. That will occur when the counter 172 reaches a bit count of 4096, indicating the top of scan line. As shown in FIG. 5B, the TOSL signal is developed by the counter 172 and fed back to its load input. It is also applied as a carry to a scan line number counter 174 to be described below. The scan line word number counter 172 will increment by one at the concurrence of an OT3 timing signal and a system CLOCK pulse. As will be recalled, the OT3 signal is applied to the counter 172 from the packetizer 124 (FIG. 4B) and is derived by timing control circuits included therein and to be described below. Both the register 170 and the counter 172 are reset by the MASTER RESET signal from the control circuits 108. The 8-bit output of the counter 172 (SLWN) is applied as the high order 8 bits of y coordinate address data to the multiplexer circuits 100.

The scan line number counter 172 is initially reset by the MASTER RESET signal from the control circuits 108 and then counts up by one on every occurrence of a clock in which the TOSL signal, which is applied as a carry to the counter 174, is true. The 4-bit output of the counter 174 (SLN) is applied as the x coordinate dump address data to the multiplexer circuits 100. Thus, the 12-bit address signal constituted by the signals SLN and SLWN represents the address for the band buffer memory being dumped. When the scan line count in the counter 174 reaches 15, indicating the end of the buffer memory, an EOBUF signal is forwarded to the packetizer 124 and the control circuits 108 for reasons to be described below.

The counting circuits 102 also include a last packet circuit 176 that generates a LAST PACKET signal when the high order 7-bits of the signal SLWN are binary "1's". This condition means that one of the last two band buffer memory words in a particular scan line is about to be addressed. Thus, the high order 7-bits of SLWN are applied to the last packet circuit 176. The LAST PACKET signal developed at the output of the circuit 176 is applied to the packetizer 124 (FIG. 4B).

The counting circuits 102 further include a "last scan line" circuit 178. The 4-bits of SLN are applied from the output of the SLN counter to the circuit 178 which produces a true LASTSLN signal output when all 4-bits of SLN are true, i.e. the last (sixteenth) scan line of the band buffer memory is being dumped. The LASTSLN signal is applied to the control circuits 108.

Lastly, the counting circuits 102 include a scan line bit counter register 180 (which has nothing to do with addressing the memory, but whose use will be described below). This is loaded with the low order 4-bits of the y coordinate data applied on the bus 22 by the CPU 10. Actually, of course, the entire 16-bit x-y coordinate data is applied on the bus, but only the low 4-bits of the y coordinate data are loaded into the counter 180. A load is accomplished when the F2=11 load control signal applied to the counter 180 by the control circuits 108 is ture. The output signal from this register, i.e. SLBC (4-bits), is applied to the control circuits 108 for a purpose to be described below.

Further details of the counting circuits 102 may be had by reference to the schematic circuit diagrams of a presently preferred ROS printer controller, as depicted in Appendix C attached hereto (see pages 4–7 and 16).

Figure 6:
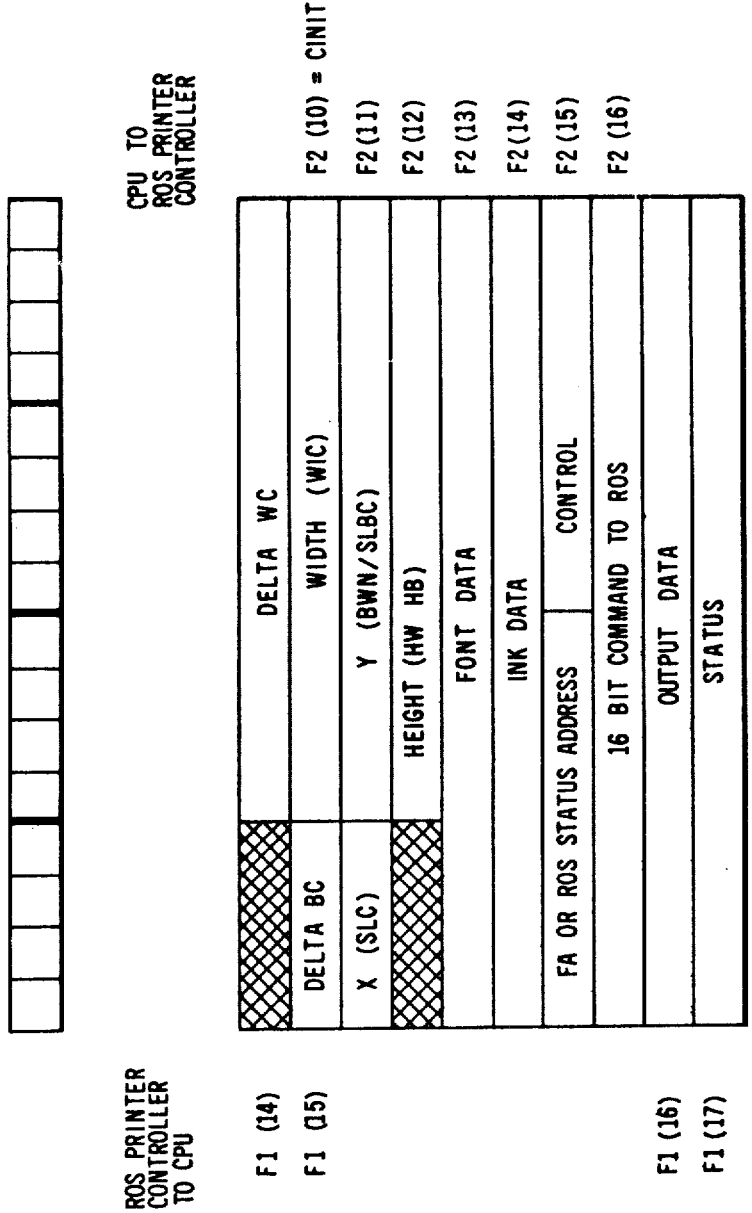
FIG. 6 shows the relationship of various microinstruction F1 and F2 function field control signals relative to corresponding data on the main data transfer bus.

Referring to FIG. 6, it can now be seen how the CPU 10, through the F1 and F2 microinstruction fields, controls the loading of the various types of data discussed thus far onto and off of the main data transfer bus 22. FIG. 6 is relatively self-explanatory in this regard and will serve to summarize a good deal of the discussion thus far.

Figure 7:
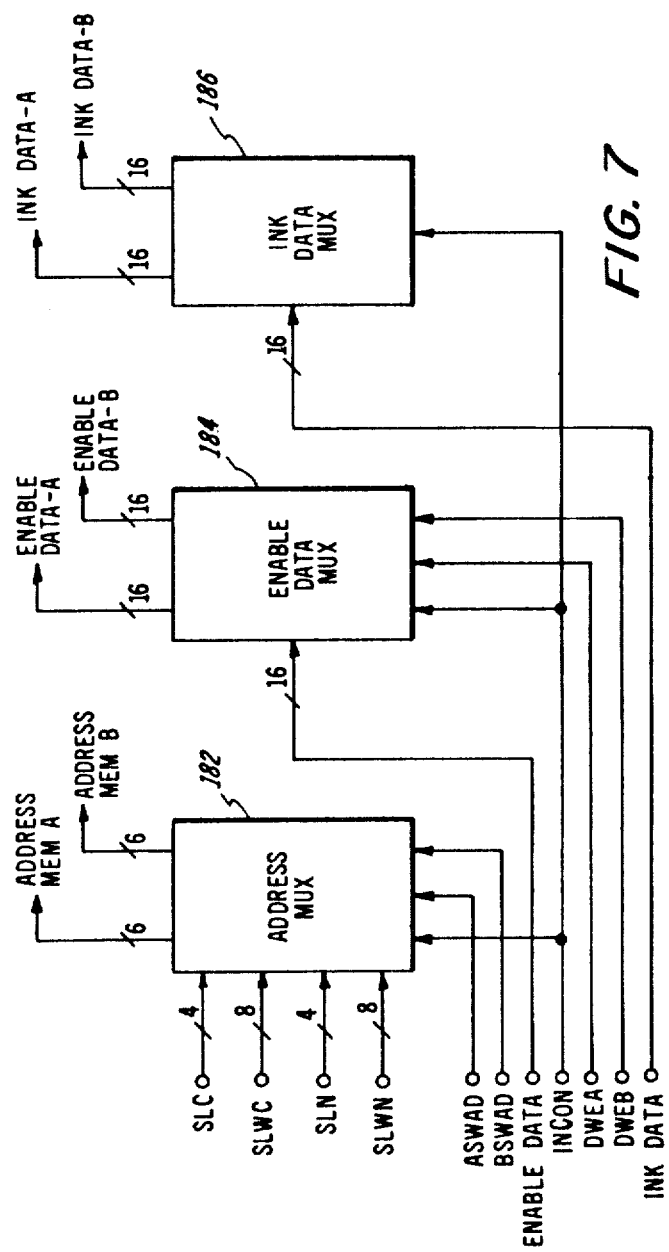
FIG. 7 is a block diagram representation of the multiplexer circuits depicted in FIGS. 4A and 4B.

Reference is now had to FIG. 7 where the multiplexer circuits 100 will be described. As shown, these circuits include an address multiplexer 182 which is responsible for selectively applying the band buffer memory load address (SLC and SLWC) and the band buffer memory dump address (SLN and SLWN) to the appropriate band buffer memory A and B. Remember that the function of these memories A and B alternate, i.e. when one is being filled, the other is being dumped, and then they switch when dumping is complete.

Thus, the address multiplexer 182 receives both the 12-bit load address (SLC and SLWC) and the 12-bit dump address (SLN and SLWN) from the counting circuits 102. An INCON control signal applied to the address multiplexer 182 determines which address is to be forwarded to which band buffer memory, i.e. when INCON is true, memory A is being loaded and memory B dumped, and when INCON is false, the reverse is true.

Timing control signals ASWAD (A, switch address) and BSWAD (B, switch address) respectively control the transmittal of the selected address signals to the band buffer memories A and B. Transmittal of each 12-bit address is accomplished in two steps, forwarding the 6-bit row address first and then the 6-bit column address. When ASWAD is false, the row address wil be sent to band buffer memory A. Then ASWAD will go true and the column address will be sent to that memory. Similarly, BSWAD controls which half of its address is given to the B memory. In correspondence to this, it will be recalled that the timing control signals ACAS and ARAS must be applied to the band buffer memory A from the control circuits 108, and similarly signals BCAS and BRAS applied to the band buffer memory B from the control circuits 108. The control circuits select either input or output timing signals for ACAS, ARAS, BCAS and BRAS depending upon the value of INCON.

For writing image data into the band memories, the multiplexer circuits 100 further include an enable data multiplexer 184 which receives the 16-bits of ENABLE DATA from the AND-gate 104 (FIG. 4A) and selectively applies it to either the band buffer memory A or the band buffer memory B. The state of the INCON control signal from the control circuits 108 determines which band buffer memory the multiplexer 184 applies the ENABLE DATA to. Write enable timing signals for clearing the memories on output (read-modify-write zeros), i.e. DWEA and DWEB, are forwarded to the proper band buffer (the one being emptied).

Lastly, the multiplexer circuits 100 include an ink data multiplexer 186 whose purpose is to apply the 16-bits of INK DATA from the ink memory 106 to either the band buffer memory A or the band buffer memory B. This selection is controlled again by the state of the INCON signal applied to the multiplexer 186 from the control circuits 108. Whichever band buffer memory does not have INK DATA selected as write data has zeros selected as write data so that the memory will be cleared as it is read out.

Further details of the multiplexer circuits 100 of the preferred embodiment may be had from a review of Appendix C hereto (see particularly pages 18–23).

Before describing the control circuits 108 (FIG. 44) with reference to FIGS. 21–41, it would be helpful if the nature of the 8-bit control field loaded into the control circuits 108 from the bus 22 upon decoding of an F2=15 load control signal from the CPU 10 were understood. It would further be helpful if the nature of the 16-bit status field loaded onto the bus 22 in response to the control circuits decoding an F1=17 load control signal from the CPU 10 were understood.

Referring first to the 8-bit control field, the various bits thereof have the following meaning when an F2=15 signal is received from the CPU 10, where the various meanings will be described in more detail below.

| BIT | FUNCTION | MEANING |
|-----|----------|---------|
| 8 | ESS | Enables the clocking of a SLOTTAKE flip-flop. |
| 9 | SLOTTAKE | Provides the data input of the SLOTTAKE flip-flop. When this flip-flop is 0, all ROS data requests will be ignored. |
| 10 | Unused | |
| 11 | CLR BEHIND | Clear a BEHIND flip-flop, where BEHIND signifies that the microcode has not been able to fill the band buffer memory being loaded before the other band buffer memory finished emptying to the ROS. |
| 12 | GO AWAY | Inhibits additional WAKEUP requests until a band buffer memory switch occurs (except when refreshing of a memory is required). |
| 13 | WHICH | This defines the meaning of the left half of the 16-bit word whose right half includes the subject control bits, i.e. binary 1 means that the leftmost 8-bits contain the value of "FA" and binary 0 means that those bits specify a ROS STATUS address. |
| 14 | CLRFRESH | Indicates that a refresh has occurred and it clears a REFRESH |

| BIT | FUNCTION | MEANING |
|---|---|---|
| 15 | RESET | flip-flop. Controls resetting of all resettable circuits in the ROS printer controller. |

The 16-bit status field which appears on the bus 22 whenever an F1=17 signal arrives from the CPU 10 is used to report status information from the ROS printer controller 18A to the CPU 10. The bits of this field have the following meanings:

| BIT | FUNCTION | MEANING |
|---|---|---|
| 0–7 | unused | |
| 8 | Bad ROS Status | There may be a error in the incoming ROS status bits and thus this particular burst should be ignored. |
| 9 | INCON | Identifies which band buffer memory is being dumped and which one filled. |
| 10 | Stable ROS | No burst of ROS status bits is being received, i.e. the system is in a quiescent period so that the ROS status memory contains a consistent set of data. |
| 11 | BEHIND | A band buffer switch occurred while the CPU microcode was still filling a band buffer memory. |
| 12–15 | ROS Status bits | The selected four bits from the ROS status memory. |

In the description of the control circuits 108 to follow, only that portion of the status control circuits relating to the generation of the INCON and BEHIND signals are described in detail. The reader is referred to Appendix C hereto for a disclosure of all other status control circuits (see pages 30 and 33 of Appendix C). Additionally the reader is referred to Appendix C (pages 31 and 32) for a disclosure of the control circuits for the command transmit circuit 130, which also will not be described in detail herein as being unrelated to the present invention.

Figure 24:
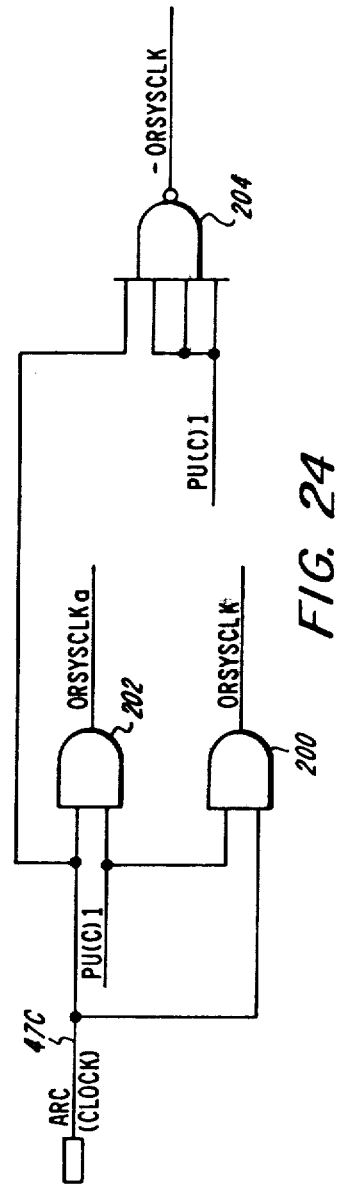

Referring first to FIG. 24, the clock circuitry included in the control circuit 108 is shown. Thus, the main CLOCK signal from the CPU 10, which is always running and is labeled ARC (always running clock) is applied to inputs of two AND-gates 200 and 202 and a NAND-gate 204 for respectively developing three system clock signals used in the control circuitry 108 i.e. ORSYSCLK, ORSYSCLKA, and -ORSYSCLK. A voltage level "pu (c) 1" enables all other inputs of the gates 200, 202 and 204. In the future, and purely for purposes of simplicity, only the clock signals ORSYSCLK and -ORSYSCLK will be referred to.

Figure 25A:
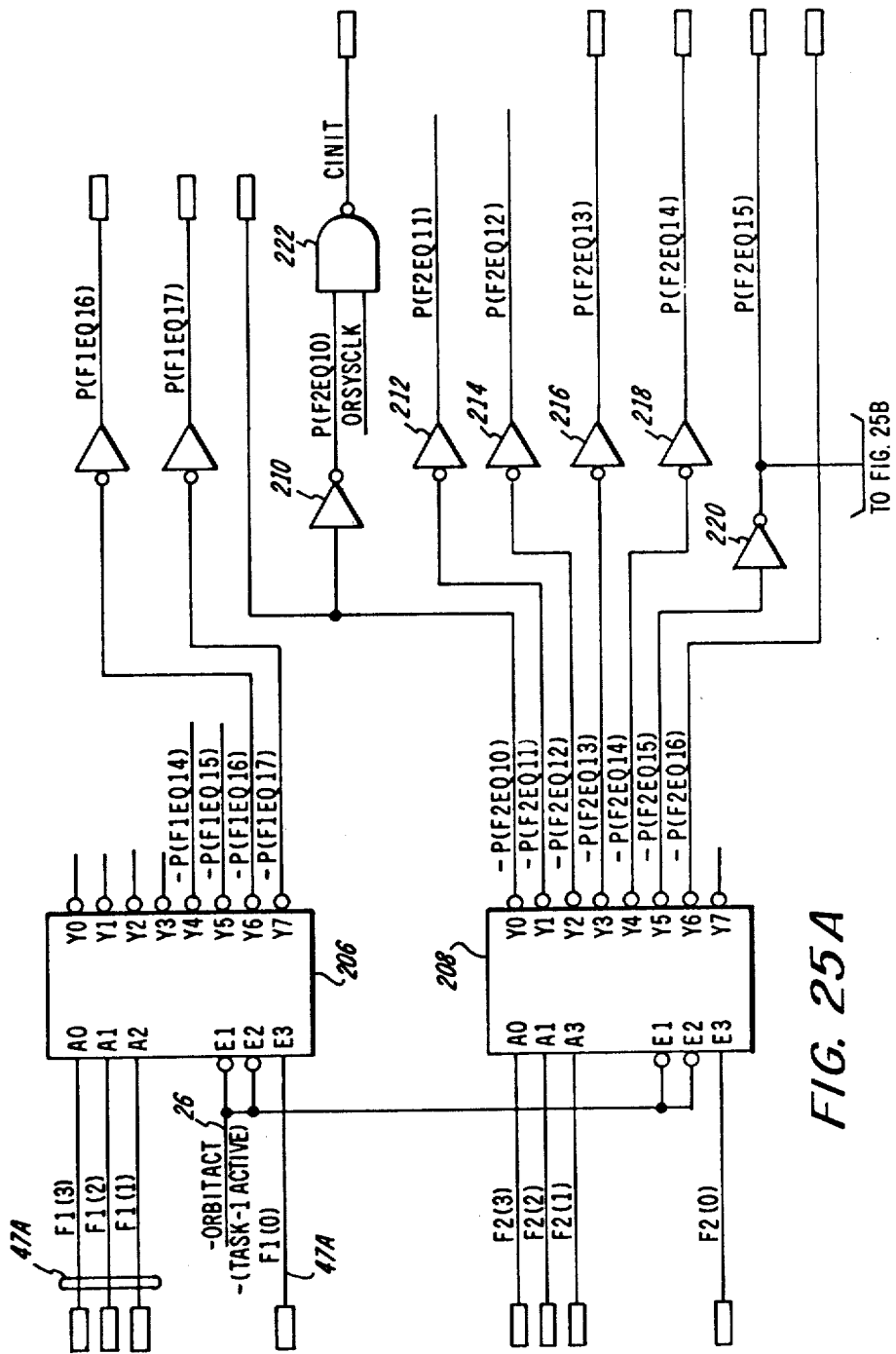
Figure 25B:
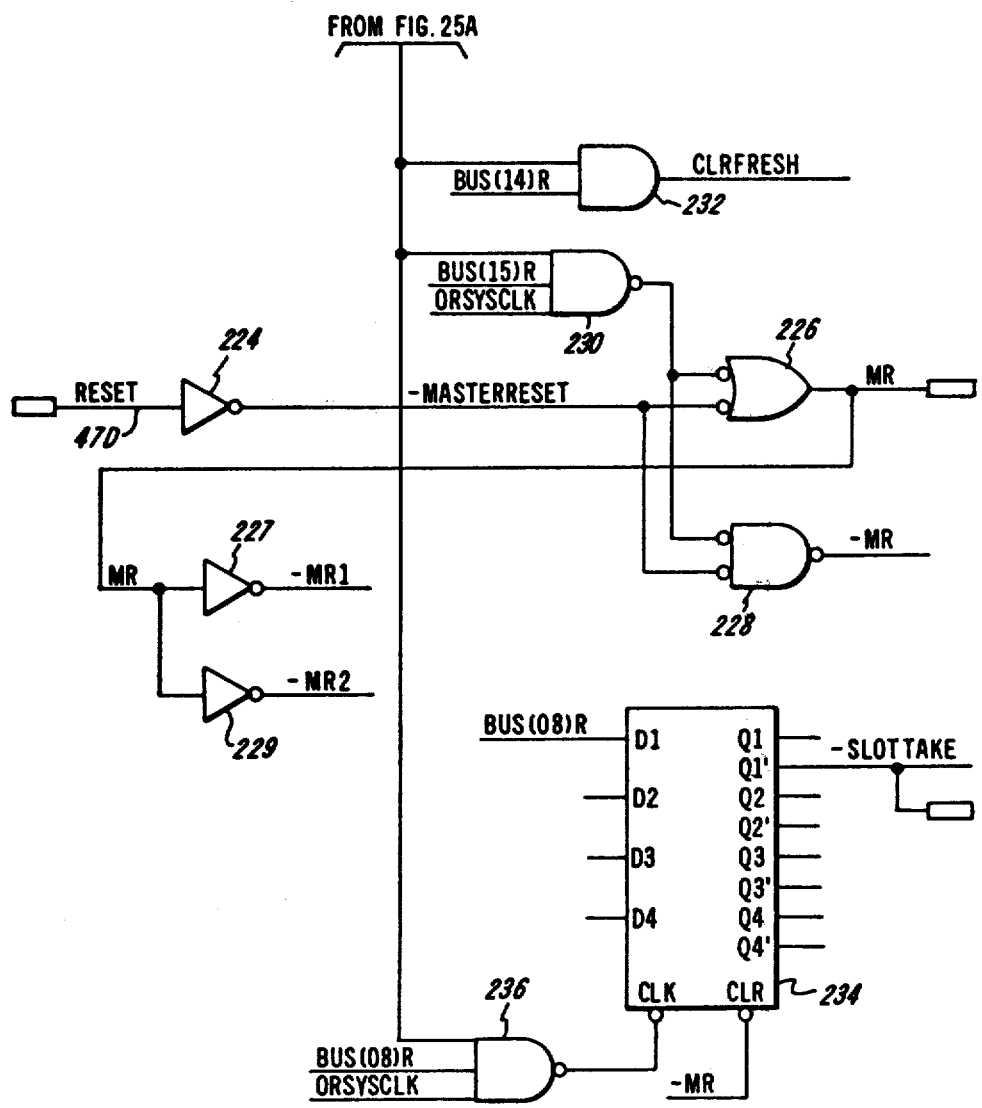

FIGS. 25A and 25B shows the function decode circuitry included in the control circuits 108. For instance, an F1 decoder 206 is shown for decoding the 4-bit, F1 microinstruction sub-field applied thereto on lines 47A from the instruction register 46 of the CPU 10 (see FIGS. 2 and 3). The decoder 206 is enabled by a low true -(TASK-1 ACTIVE) signal applied on a line 26 from the CPU 10 to inverted enable inputs of the decoder 206. Thus, the 4-bit, F1 field applied to the decoder 206 will be decoded when the ROS printer controller task, i.e., task 1, is being serviced by the CPU 10, as evidenced by a true (low) -(TASK-1 ACTIVE) signal. As shown in FIG. 25A, only four decoded F1 control lines are utilized, i.e. F1=14 through F1=17. The actual decoded F1 outputs are the complements of F1=14 through F1=17. However, the -(F1=16) and -(F1=17) signals are inverted by inverters 208 and 210 to provide the signals F1=≠and F1=17 for use in the system.

A similar F2 decoder 208 is shown in FIG. 25A for decoding the 4-bit, F2 function sub-field in an accessed microinstruction. As with decoder 206, the -(TASK-1 ACTIVE) signal is applied to inverted enable inputs of the decoder 206 to enable decoding only when the ROS printer controller 18A is being serviced. Seven output lines of the decoder 208 are utilized, i.e., -(F2=10) through -(F2=16). The control signals -(F2=10) through -(F2=15) are applied through respective inverters 210–220 to develop the control signals F2=10 through F2=15.

A control signal called "CINIT", which stands for "character initialization", is developed at the output of an AND gate 222. The gate receives as inputs the F2=10 control signal from the inverter 210 and the ORSYSCLK signal. When these two signals are true, CINIT will be true in order to control certain initialization functions, as will be described below.

The manner in which the MR (MASTER RESET) signals are developed will now be described with continued reference to FIGS. 25A and 25B. As shown, a microcode intitated RESET signal is applied from CPU 10 along a control line 47 D through an inverter 224 as -MASTERRESET to one input of an inverted input OR-GATE 226 and to one input of an inverted input NAND-gate 228. A second input of each of these gates 226 and 228 receives the output of a NAND-gate 230. The NAND-gate 230 has three inputs. One is the F2=15 control signal from the output of inverter 200, a second is the software initiated RESET signal from bit 15 of the 8-bit control field, and the third is the ORSYSCLK signal.

In view of the above relationship, a true MR signal will be presented at the output of the OR-gate 226 when either MASTERRESET is true or the F2=15, software RESET and ORSYSCLK signals are true. The same is true for -MR developed at the output of NAND-gate 228. The MR signal is also applied from the output of gate 226 through a pair of inverters 227 and 229 for respectively developing further master reset signals -MR1 and -MR2 for use in the system. In the future, and for purposes of simplicity, only the master reset signals MR and -MR will be referred to.

A CLRFRESH control signal used to reset a REFRESH flip-flop to be described below is developed at the output of an AND-gate 232 upon the concurrence the two input signals applied thereto. These are the F2=15 control signal from the output of inverter 220 and bit 14 of the 8-bit control field from the software in CPU 10.

Referring to FIG. 25B, the control state -SLOTTAKE is developed at the Q output of a D flip-flop circuit 234. The D input receives bit 9 of the 8-bit control field from the CPU 10, and an inverted clock input is connected to the output of a NAND-gate 236. The gate 236 has three inputs, i.e. ORSYSCLK, bit 8 of the 8-bit control field from the CPU 10 software, and the F2=15 signal from the output of the inverter 220. When all three are true, the control bit 9 at the D input to the flip-flop 234 will be clocked in, thereby raising the -SLOTTAKE signal at the Q' output of the flip-flop 234.

Referring now to FIG. 21A, whenever the CPU 10 wants to start up the ROS printer controller 18A, it turns on a RUN flip-flop 240, which is preferably of the "J-K" variety, by issuing a "start I/O" (SIO) instruction on a control line 470. The signal transmitted is actually -SIO, which is forwarded through an inverter 242 as SIO to one input of an AND-gate 244. The other input of gate 244 receives bit 13 in the 8-bit control field from the CPU. Bit 13 indicates that the SIO instruction is directed to the ROS printer controller 18A. Thus, if both SIO and bit 13 are true, the SIO value will be gated through as STRTIO to the J input of flip-flop 240. The clock input receives the ORSYSCLK signal. Consequently, the STRTIO signal will be latched into the flip-flop 240 at the next clock pulse. This will raise a RUN signal at the Q output of the flip-flop 240. The RUN signal can be turned off either by an MR signal applied to a reset input of the flip-flop 240, or by the output of an inverted input AND-gate 246 that is connected to the K input of the flip-flop 240. The gate 246 receives as inputs the -BLOCK signal -(F1=3) from the CPU decoder 52b (FIG. 3) and the -(TASK-1 ACTIVE) signal from the CPU decoder 60 (FIG. 2) on line 26. Thus, when both the BLOCK and TASK 1-ACTIVE signals are true, the flip-flop 240 will be reset turning off the RUN state.

Referring to FIG. 21B, a flip-flop 248 is shown for generating a GOAWAY signal. As will be seen below in connection with FIG. 22, the GOAWAY signal is raised when it is desired to inhibit further WAKEUP requests from the ROS printer controller 18A, i.e. inhibit WAKEUP - TASK 1 request signals, until the next band buffer memory switch (except for causing the microcode to refresh the memories).

As shown in FIG. 21B, the flip-flop 248 is preferably a "J-K" flip-flop and has its J input connected to the output of an AND-gate 250. The gate 250 is enabled by the F2=15 control signal to pass bit 12 of the 8-bit control field. It will be recalled that bit 12, when true, represents a GOAWAY condition requested by the CPU software. Thus, when bit 12 is high at the occurrence of F2=15, the flip-flop 248 will be triggered at the next pulse of ORSYSCLK, thereby raising the GOAWAY signal at its Q output.

The flip-flop 248 is reset by either an MR signal applied to its reset input, or a true output of an OR-gate 252 applied to the K input of the flip-flop 248. The OR-gate 252 receives as inputs the STRTIO signal from the output of gate 244 (FIG. 21A) and the EOBUF signal from the scan line counter 174 (FIG. 5B). When either of these signals is true, i.e. either when requesting the controller 18A to start running, or when the band buffer being dumped has been emptied, the flip-flop 248 is reset, thereby turning off the GOAWAY signal.

Figure 22:
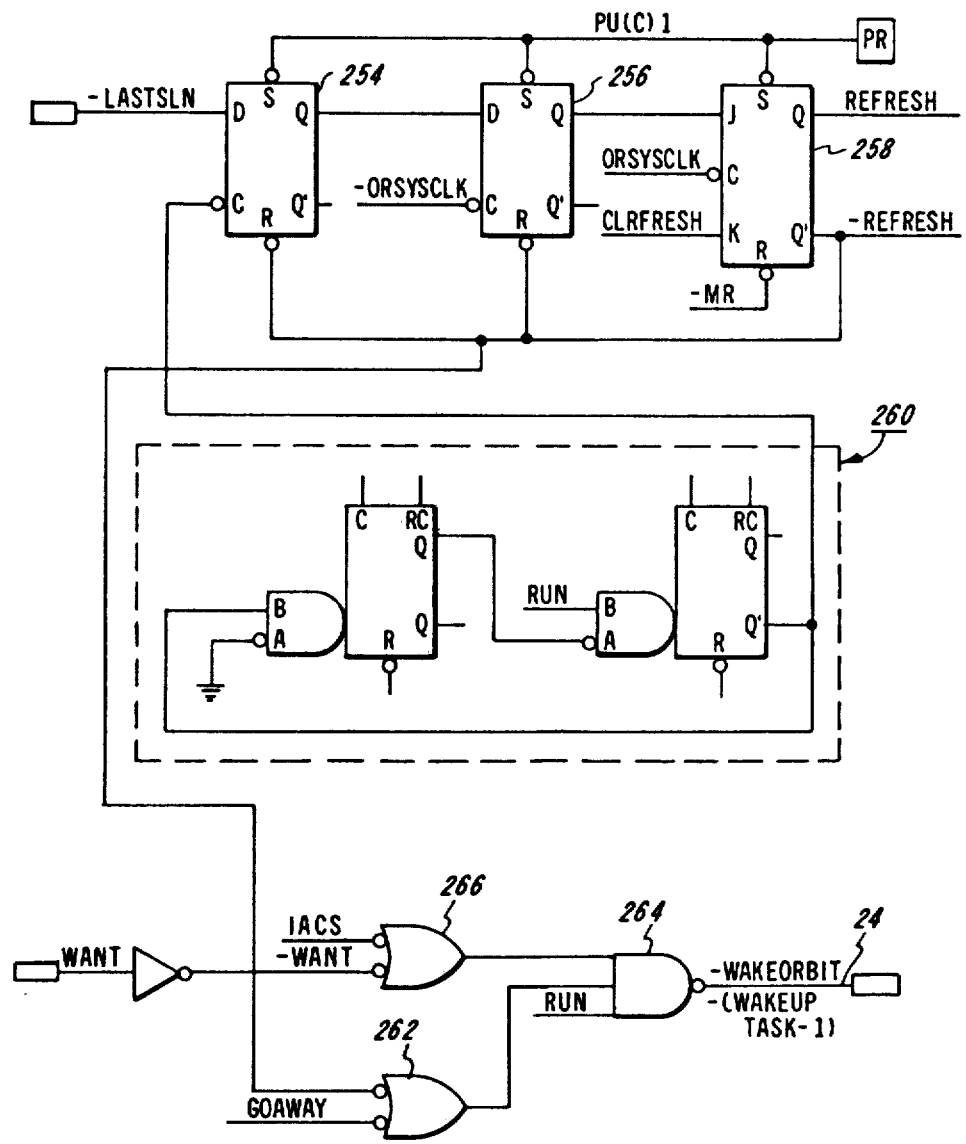

FIG. 22 shows that portion of the control circuit 108 used to generate WAKEUP TASK-1 request signals and REFRESH signals for refreshing the band buffer memories A and B. Referring first to the refresh circuitry, it includes a pair of "D" type flip-flops 254 and 256, and a J-K flip-flop 258. The flip-flop 254 has its D input connected to the last scan line circuit 178 (FIG. 5) for receiving the signal -LASTSLN therefrom. An inverted clock input of the flip-flop 254 is connected to the output of a pair of delay circuits 260 connected in series. Each delay circuit 260 has a time out slightly less than 1 ms in duration. Suitable RC circuits (not shown) are employed to enable the delay circuits 260 to achieve the desired time-out. As shown in FIG. 22, running of the delay circuits is initiated and gated by the RUN signal of flip-flop 240 (FIG. 21A). Each time the right hand delay circuit 260 completes its time-out, the flip-flop 254 is set if -LASTSLN is false (LASTSLN thus inhibits requests for refresh when nearing a buffer switch. This avoids undesirable conflicts between microcode refreshing and buffer switching.).

Now then, the Q output of the flip-flop 254 is connected to the D input of the flip-flop 256. An inverted clock input of the flip-flop 256 is adapted to receive the -ORSYSCLK signal. Thus, if the refresh timers have run out, flip-flop 256 will turn on at the occcurrence of the next ORSYSCLK pulse. Flip-flops 256 and 258 form a synchronizer for REFRESH requests which synchronize these requests to the main ORSYSCLK time. Thus at the next ORSYSCLK pulse after the Q output of flip-flop 256 goes high, the Q output of the flip-flop 258 will go true, such output being the signal REFRESH. A signal -REFRESH is simultaneously developed at the Q' output of the flip-flop 258 and is fed back to the reset inputs of the flip-flops 254 and 256 for resetting same. The flip-flop 258 is reset by issuance of an F2=15 (with bus bit 14=1) from the CPU 10. This is the method whereby the microcode acknowledges the REFRESH request. The manner in which the REFRESH signal causes the memories to be refreshed will be described below.

Still referring to FIG. 22, a -REFRESH signal developed at the Q' output of flip-flop 258 is connected to one input of an inverted input OR-gate 262, the other input of which is connected to flip-flop 248 (FIG. 21B) for receiving the GOAWAY signal therefrom and the output of which is connected to one input of a NAND-gate 264. The NAND-gate 264 has another input connected to the flip-flop 240 for receiving a RUN signal therefrom. Lastly, the NAND-gate 264 has a third input connected to the output of an inverted input OR-gate 266. The OR-gate has two inputs for respectively receiving the signals IACS (In A Character Segment) and -WANT. It will be recalled that the WANT signal will be true when the INADR and OUTADR pointers to the FIFO memory 110 are within 6 storage locations of one another. The manner in which the -IACS signal is generated will be described below with reference to FIG. 28 and the WANT signal with reference to FIG. 33A.

Now then, if the IACS signal is low, i.e. not in a character segment, or a -WANT is low, i.e. need more font words into the FIFO memory 110, the output of the gate 266 will be true. When all three inputs to the NAND-gate 264 are true, the output, i.e. -(WAKEUP TASK-1) will be low thereby causing a WAKEUP TASK 1 request to the CPU 10 on line 24. The output of gate 262 will go true when either the REFRESH signal is true or the GOAWAY signal is false. The full expression for initiating WAKEUP TASK-1 signals may be expressed as follows:

"WAKEUP=(RUN) and (WANT or -IACS) and (REFRESH or -GOAWAY)"

As may thus be seen, TASK 1 may be awakened for any of a number of reasons. How then does the microcode determine that refreshing is or is not needed? This is demonstrated in FIG. 23. As shown, a NAND-gate 268 is provided having a first input connected to the flip-flop 258 (FIG. 22) for receiving a REFRESH signal, and a second input connected to the inverter 214 (FIG. 25) for receiving an F2=12 signal. The output of the NAND-gate 268 is connected to an inverted input of an OR-gate 270, whose output is inverted by an inverter 272 to form -NEXT (07). Thus, when a REFRESH signal occurs and an F2=12 control signal is raised by the microcode, NEXT (07) will be true. This signal is applied on line 25 to the address modifier circuit 56 (FIG. 2) to gate a binary 1 into the eighth bit position (bit-07) of the NEXT ADDRESS field, thereby causing the microcode to "skip". This basic mechanism can then cause a character template consisting entirely of binary zeros to be issued by the microcode program (refreshing but no writing will occur), which is one scan line in width and 64 words (1024 bits) in height. This refreshes all of the chips in the band memory awaiting dumping.

Figure 23:
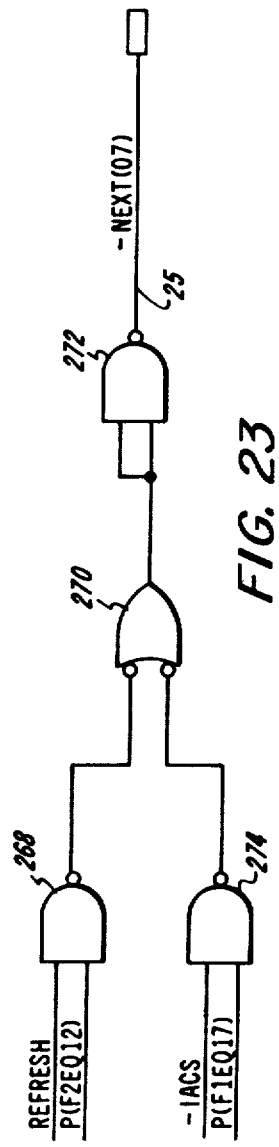

The control circuit of FIG. 23 includes another NAND-gate 274 whose output is connected to a second inverted input of the OR-gate 270. This gate has nothing to do with memory refreshing, but rather provides a means whereby the microcode, as it passes the successive font words of a character segment to the hardware, can determine, via a skip condition, when the character segment is done. The NAND-gate has two inputs for respectively receiving a -IACS signal from the circuitry of FIG. 28 and an F1=17 control signal from the microcode (as decoded by the decoder 206). Thus, NEXT (07) will be asserted when tested by an F1=17 if -IACS is true during the occurrence of the F1=17 control signal.

Figure 26A:
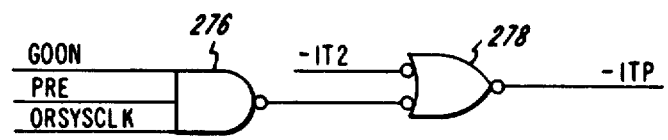

FIG. 26A shows the control circuitry for generating the internal timing signal, itp referred to earlier. As shown a NAND-gate 276 is provided having a first input for receiving a GOON ("go-on") signal from the circuitry of FIG. 28, a second input for receiving a PRE signal from the circuitry of FIG. 28, and a third input for receiving an ORSYSCLK signal. The GOON signal means that a character segment is in the process of being merged into the band raster (IACS) and furthermore that the FIFO has not run (temporarily) dry (-NEED). (See gate 295 on FIG. 28). The PRE signal, as indicated previously, is an initialization signal used to perform a number of initialization functions for each new character segment, i.e., it causes the BOC (bottom of character) signal to be raised and allows a preliminary LOAD if required. It also causes the scan line word counter 166 (FIG. 54) to be loaded, as discussed above.

The output of the NAND-gate 276 is connected to one input of an inverted input NOR-gate 278, the output of which develops the timing signal, -itp. The other input of the NOR-gate 278 receives another timing signal, it2, developed by the circuitry of FIG. 27.

Figure 26B:
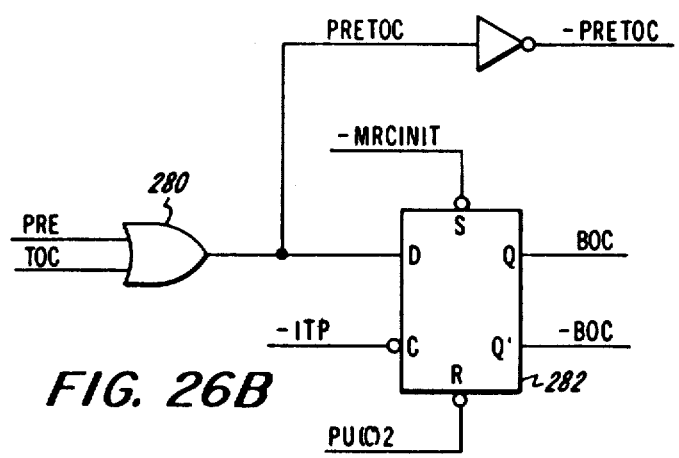

FIG. 26B shows the control circuitry for turning on the BOC signal, signifying that the character segment data being merged onto the band is at the bottom of the character. This circuitry includes an OR-gate 280 having two inputs for respectively receiving the PRE signal and the TOC (top of character) signal. If either of these signals is true, a true PRETOC signal will be developed at the output of the gate 280 which is connected to the D input of a D flip-flop 282, among other things. A number of presets occur both at the beginning of a character segment (PRE) and each time we round the top of the character. An inverted clock input of the flip-flop 282 receives the -itp timing signal from gate 278 (FIG. 26A). Accordingly, when a low -itp timing pulse occurs when PRETOC is true, the flip-flop 282 will be set, raising the signal BOC at its Q output and lowering the signal -BOC at its Q' output. The flip-flop 282 is also set upon receipt at its inverted set input of a -MRCINIT signal from the circuitry of FIG. 28. The PRETOC signal is also applied through an inverter 284 for use as -PRETOC elsewhere in the controller 18A.

Figure 27:
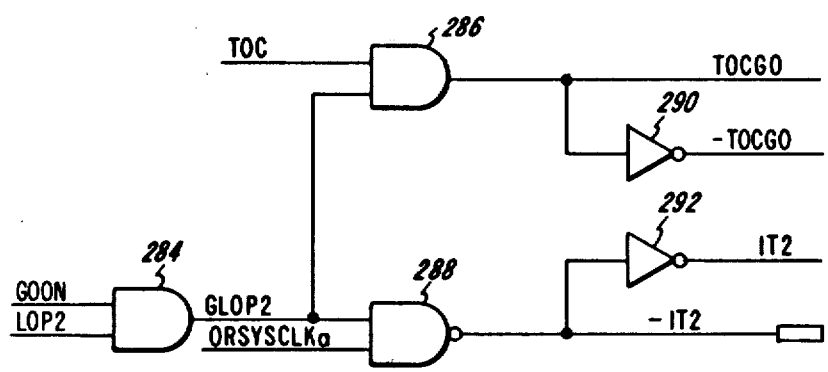

FIG. 27 shows the control circuitry for developing the signal TOCGO that is applied to the scan line counter 164 (FIG. 5) and to the width counter 162, and for developing the timing signal it2. TOCGO means that the logic is at the top of the character and ready to move back to the bottom for the ensuing scan line. As shown, an AND-gate 284 has a first input for receiving the GOON signal from the circuit of FIG. 28, and a second input for receiving an LOP2 clock period timing signal also from the circuit of FIG. 28. The signal LOP2 is the third and final clock period in a band buffer memory write cycle consisting of three clock periods, LOPO, LOP1 and LOP2 (see FIG. 19). Signals representative of the second and third clock periods (LOP1 and LOP2) are developed by the circuits of FIG. 28, as is a signal representative of the fourth clock period, i.e. PRE (discussed above).

The output of the AND-gate 284, i.e. signal GLOP2, will be true when both GOON and LOP2 are true, and such output is connected to one input of an AND-gate 286 and to one input of a NAND-gate 288. The other input of AND-gate 286 receives the TOC signal from the height counter 150 (FIG. 5A). Thus, its output, i.e. TOCGO, will be true when both TOC and GLOP2 are true. The TOCGO signal is also applied through an inverter 290 for use as -TOCGO elsewhere in the controller 18A. The other input of NAND-gate 288 is adapted to receive the ORSYCLK signal. Thus, when both GLOP2 and ORSYSCLK are false, the output of gate 288, i.e. -it2, will be true. This signal is also applied through an inverter 292 for use as it2 elsewhere in the controller 18A.

Figure 28:
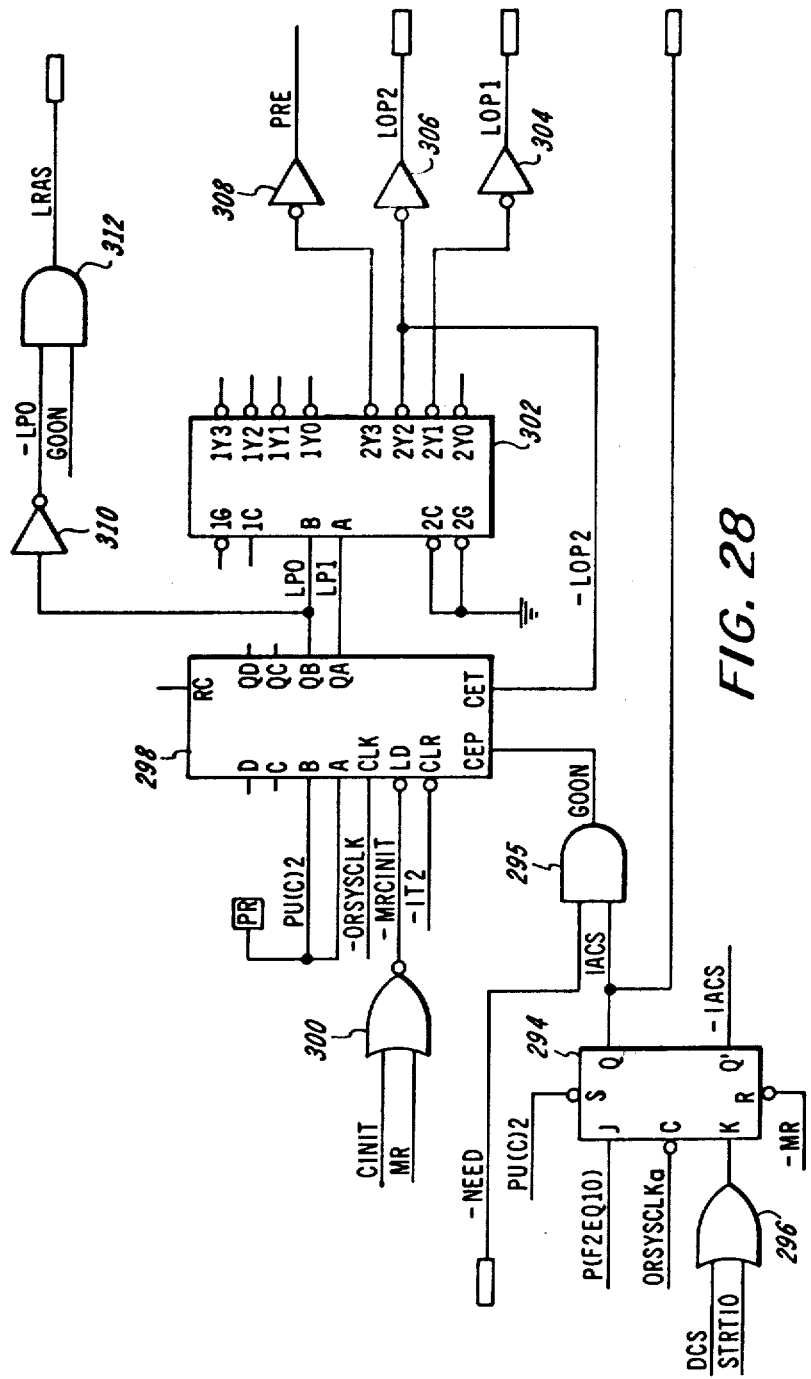

Referring to FIG. 28, J-K flip-flop 294 is provided for developing the IACS and -IACS signals at its Q and Q' outputs, respectively. The purpose of this flip is to record when a character segment is being processed. The flop is turned on by the microcode via an F2=10 function. It is turned off when the character segment is finished (DCS=Done Character Segment). The J input of the flip-flop 294 is connected to the output of inverter 210 (FIG. 25) for receiving a decoded F2=10 control signal from the microcode. An inverted clock input receives the ORSYSCLK signal. Thus, when ORSYSCLK is false and the F2=10 line goes true, the flip-flop 294 will be set, raising the IACS signal at its Q output and lowerig -IACS at its Q' output. The flip-flop 294 is reset upon the occurrence of either a DCS signal or a STRTIO signal applied to respective inputs of an OR-gate 296 whose output is connected to the K input of the flip-flop 294. The DCS signal is developed by the circuitry of FIG. 30 to be described below, and the STRTIO signal comes from the output of AND-gate 244 (FIG. 21A). The flip-flop 294 is also reset by a -MR signal.

The IACS signal from the Q output of the flip-flop 294 is applied to one input of an and-gate 295, the other input of which is connected to the circuits of FIG. 33 for receiving a -NEED signal therefrom. If both -NEED and IACS are true, the output of the gate 296 will be high, supplying a true GOON signal to an enable input of a timing counter 298.

The counter 298 is so controlled by the -ORSYSCLK, -MRCINIT and GOON inputs such that, upon initialization (-MRCINIT), the counter output lines LOP and LP1 are initially both binary 1, so that only the -PRE output of the decoder 302 will be true. Then, as the band buffer memory is filled, the counter 296 will count 00,01, 10, 00, 01, 10 and so on i.e. the PRE state will not be counted following initialization. The counter 298 has an inverted load input connected to the output of a NOR-gate 300 for receiving a true (low) -MRCINIT signal therefrom when either or both the two inputs to the gate 300, i.e. MR and CINIT, are true. The clock input of the counter 298 receives the -ORSYSCLK signal. The A and B data lines of the counter 298 are tied high so that timing signals LPO and LP1 are developed at the QB and QA outputs of the counter 298. The LPO and LP1 signals are applied to a 2-bit-to-4-bit decoder 302 for developing four load clock period timing signals, -LOP0, -LOP1, -LOP2 and -LOP3 (-PRE). As shown in FIG. 28, only the latter three timing signals are utilized, as being coupled through respective inverters 304, 306 and 308 as LOP1, LOP2 and PRE. As indicated previously, the clock period timing signals LOPO, LOP1 and LOP2 represent the three clock periods of a band buffer memory write cycle, and the fourth clock period (PRE) is used for initialization operations.

The LPO output of counter 298 is also applied through an inverter 310 as -LPO to one input of an AND-gate 312, the other input of which is adapted to receive the GOON signal. The output of the gate 312 will develop a true LRAS (load row address) memory timing signal when both -LOP and GOON are true. The timing signals LOPO, LOP1, LOP2 and LRAS are shown in FIG. 19.

Figure 29:
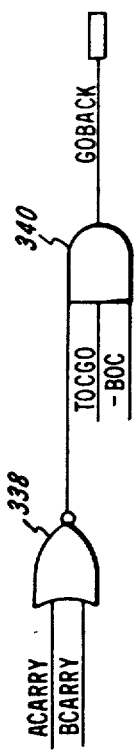
Figure 30:
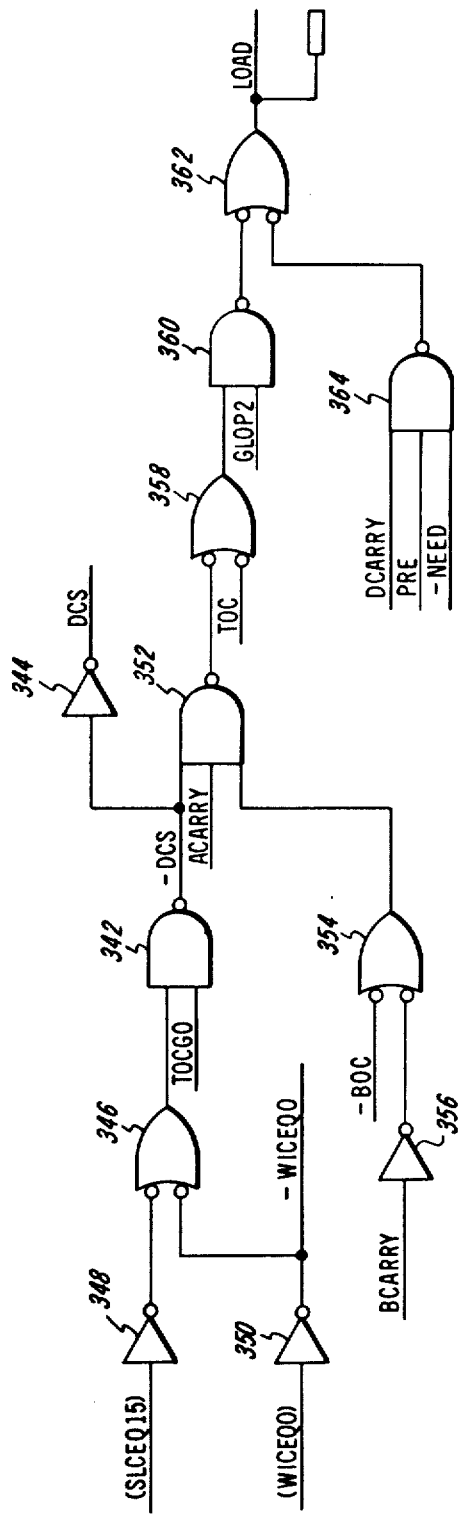
Figure 31:
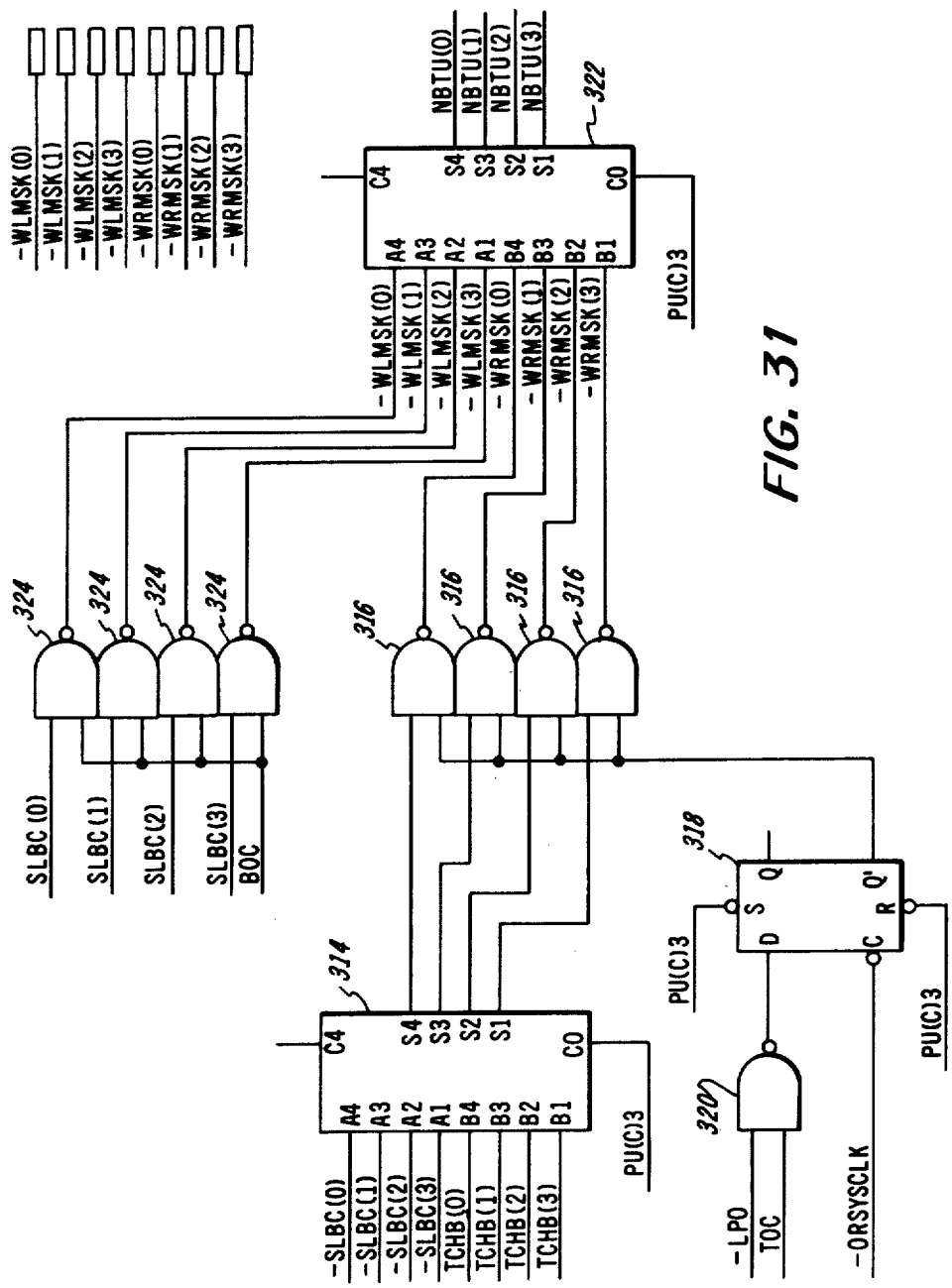
Figure 32:
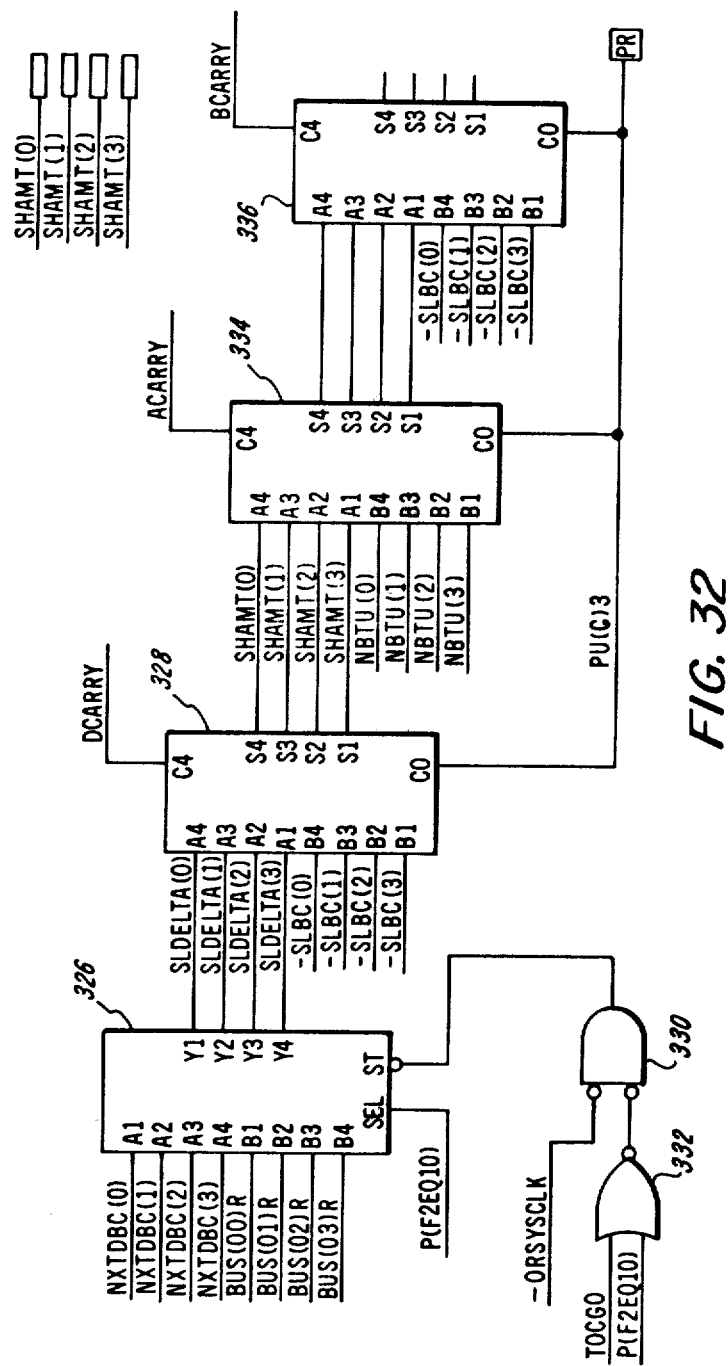

Before describing the circuitry of FIGS. 29 and 30 for respectively determining whether to LOAD the contents of the DFIFO into the DREG 112 (FIG. 4) and increment the OUTADR pointer, or to GOBACK i.e. decrement the OUTADR pointer to the FIFO memory 110, it will be necessary to review the circuit of FIG. 31 which shows how the address signals for the left and right mask memories 116 and 118 are developed and how NBTU (number of bits to use) is developed, as well as FIG. 32 which shows how SHAMT (shift amount) and various carry signals, i.e. ACARRY, BCARRY, and DCARRY, are developed.

The logic shown in FIG. 31 computes the addresses for the mask memories 116 and 118. WLMSK (Which Left Mask) is the address for the left mask memory 116. WRMSK (Which Right Mask) is for the right mask memory 118. The set of gates 324 produce -WLMSK at the bottom of the character segment (BOC) from SLBC (see FIG. 12). At other times, i.e. (-BOC), the address produced provides a mask containing all "ones" so that no masking occurs. The set of gates 316 provides an equivalent function at the top of character (TOC). The enabling term is a delayed version of TOC for detailed timing reasons. Furthermore, the value used for forming the address if TOC is true is the sum of TCHB and -SLBC which amounts to the number of unoccupied bits in the uppermost band memory word spanned by the character segment. In the case of the example of FIGS. 12A and 12B, WRMSK will be 14 which will access a mask that allows only two bits of font enabling data to pass.

Referring now specifically to FIG. 31, an adder 314 has four A inputs connected to the scan line bit counter 180 (FIG. 5B) for receiving the four count signal lines SLBC therefrom in inverted format, i.e. -SLBC. The four B inputs of the adder 314 are connected to the height register 152 (FIG. 5A) for receiving the two's complement of the bits part of the height (THCB). The 4-bit output of the adder 314, i.e. WRMSK=TCHB+(-SLBC) are connected to respective first inputs of four NAND-gates 316. The other "enable" input of each of gates 316 is connected to the Q' of a D flip-flop 318.

The D input of the flip-flop 318 is connected to the output of a NAND-gate 320 which has two inputs for respectively receiving the signals -LOP from the output of inverter 310 (FIG. 28) and TOC from the height counter 150. Consequently, when both -LPO and TOC are true, the output of gate 320 will be false thereby maintaining the Q' high to enable the gates 316 to develop the 4-bit signal -WRMSK at the outputs of gates 316. The 4bits, -WRMSK signal is applied as an address to the right mask memory 118 (FIG. 4A), as well as to the four B inputs of another adder 322 to be described below.

Figure 5B:
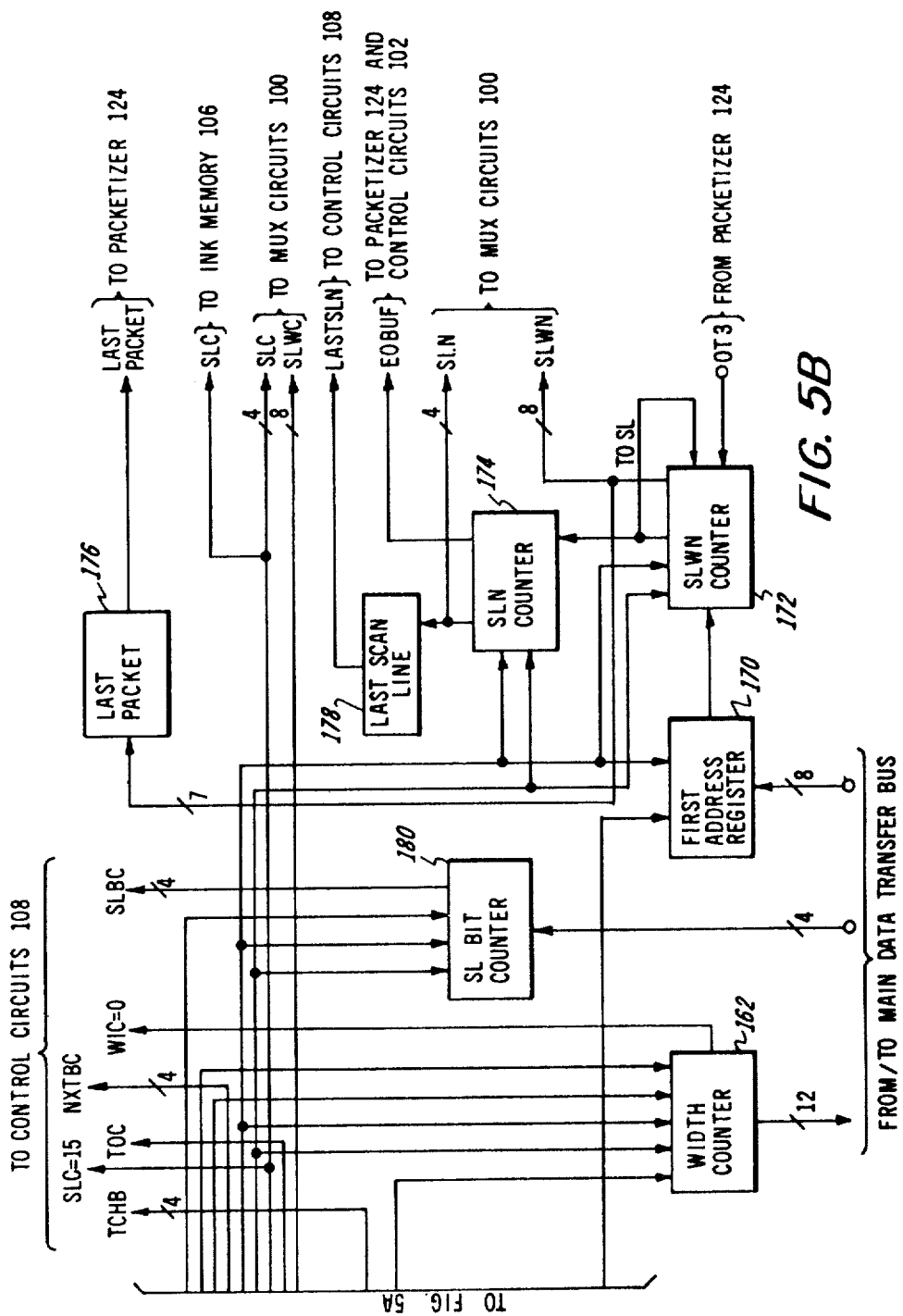

Still referring to FIG. 31, another band of four NAND-gates 324 is provided for receiving at respective first inputs the 4-bit SLBC signal from the scan line bit counter 180 (FIG. 5B). The other "enable" inputs of the gates 324 are connected to the flip-flop 282 (FIG. 26B) for receiving the BOC signal therefrom. Consequently, when BOC is true, i.e. the character segment being loaded into a band buffer memory is now at the bottom of the character, all of the gates 324 will be enabled thereby becoming inverters for the 4-bit SLBC signal which becomes the -WLMSK signal. The latter signal is applied as an address to the left mask memory 116 (FIG. 4A) and is also applied to the four A inputs of the adder 322. The adder 322 adds together the values of -WLMSK and -WRMSK to arrive at the 4-bit-value for NBTU.

It will be appreciated that if the BOC signal is false, all of the left mask address lines (WLMSK) will be true, so that the 16-bit output of the left mask memory 116 will be all binary "1's" thereby effectively not masking any of the 16-bits applied to the AND-gate 104 (FIG. 4A) from the shifter 114. Similarly, if TOC is false, the Q' output of the flip-flop 318 will be low, thereby making all of the outputs of gates 316 high, i.e. -WRMSK will be all binary "1's". In this manner, the output of the right mask memory 118 will be all binary ones, thereby insuring that they will not mask out any of the 16-bits from the shifter 114.

Referring now to FIG. 32, a latching multiplexer 326 is provided having two sets of 4-inputs each. One set of inputs receives the 4-bit delta bit count from the CPU microcode. The other set of inputs receives the 4-bit NXTDBC (next delta bit count) signal from the NXTDBC adder 158 (FIG. 5A). At the beginning of each character segment, the delta bit count value from the bus 22 is loaded onto the 4 output lines of the multiplexer 326 as a SLDELTA signal. Such loading is effected by an F2=10 control signal from the microcode applied through the gates 332 and 330 to the strobe input of the latching multiplexer. This same signal is applied to the select input of the multiplexer 326 to select the lower (Bus) inputs for reading in the delta bit count when it is true. Each time the top of the character is rounded for each scan line, the latching multiplexer 326 is loaded with the value of NNXTDBC. Remember, the value of NXTDBC is computed by adding the current delta bit count in counter 156 to the NBTU value. This occurs through the use of the signal TOCGO applied to the strobe input via gates 332 and 330.

The SLDELTA output lines of the multiplexer 326 are connected to the four A inputs of an adder 328 that is used to derive the SHAMT (shaft amount) signal applied to the shifter 114 (see FIG. 4A). The four B inputs of the adder 328 are connected to the output of the scan line bit counter 180 (FIG. 5B) for receiving the 4-bit SLBC signal in inverted format. Thus, the value of SHAMT at the output of the adder 328 will be the resultant of adding SLDELTA and -SLBC, taken "Modulo 16". Referring back to the example of FIGS. 12A and 12B, it will be noted that, initially, the delta bit count from the microcode has a value of 0 (binary), so that SLDELTA=0. The value of -SLBC is 11, so that the value of SHAMT would be 11, as shown in FIGS. 12A and 12B. The value of SHAMT remains at 11 for each new band buffer memory word of the first scan line, as shown.

For the next scan line, the height of the character (29 in FIG. 12B) modulo 16 is added to the previous value of SHAMT to come up with the new value of SHAMT modulo 16. Thus, the value of SHAMT for the second scan line is 11 (old SHAMT) +13 (character height molulo 16) =8 (modulo 16). This computation is actually accomplished by the adder 328 in adding the updated value of NXTDBC, appearing on the SLDELTA lines, with the value of -SLBC. The modulo 16 carry from the new SHAMT value is represented by the signal DCARRY and will be described in more detail below in connection with FIG. 30.

The other carry signals, ACARRY and BCARRY, are generated by the circuitry of FIG. 32 and are important in determining whether to LOAD or GOBACK. The ACARRY signal is generated at the carry output of another adder 334 which adds together the new value of SHAMT (applied to the four A inputs of the adder 334 from the output of the adder 328) to the value of NBTU (applied to the four B inputs of the adder 334 from the adder 332 - FIG. 31). If the result of the addition is 16 or more, the ACARRY signal will go true. A true ACARRY signal means that the beginning (left-end) of the next section of font data to be selected by the shifter 114 lies to the right of DREG 112.

The sum of SHAMT and NBTU, taken modulo 16, is applied to the four A inputs of yet another adder 336. The four B inputs of adder 336 receive the -SLBC signal. Thus, if (SHAMT+NBTU) -SLBC, taken modulo 16, is greater than or equal to 16, a BCARRY signal will be produced at the carry output of the adder 336. A true BCARRY signal means that the right end of the next section of font data is out of reach of the shifter 114 and a LOAD must be effected, i.e. load the contents of DFIFO into DREG 112.

Referring now to FIG. 29, the control circuitry for generating a GOBACK signal to cause the OUTADR pointer to the FIFO memory 110 to step back one is shown. This circuitry includes a NOR-gate 338 having two inputs for respectively receiving the ACARRY and BCARRY signals. If both of these signals are false, the right end of the section of font data required for the bottom of band buffer word lies to the left of DREG 15, where the shifter's right end "grabber" can't reach, then the output of NOR-gate 338 will be true. If either ACARRY or BCARRY is true, the output of gate 338 will be false. Such output is connected to one input of an AND-gate 340 which has two other inputs for respectively receiving the TOCGO signal from gate 286 (FIG. 27) and the -BOC signal from the flip-flop 282 (FIG. 26B). When all three inputs to gate 340 are true, i.e. ACARRY and BCARRY are both false, and TOCGO is true, and -BOC is true, then GOBACK WILL be true.

Reference is now had to FIG. 30 where the control circuits for generating the signals DCS (done character segment) and LOAD will be described. Referring first to the DCS signal, the circuits include a NAND-gate 342 at the output of which the signal -DCS is derived such signal also being applied through an inverter 344 as DCS. The NAND-gate 342 has two inputs for respectively receiving the TOCGO signal from the gate 286 (FIG. 27) and the output of an inverted input OR-gate 346. One input of the OR-gate 346 is adapted to receive the SLC=15 signal from the scan line counter 164 (FIG. 5A) as applied through an inverter 348. The other input of the OR-gate 346 is adapted to receive the WIC=0 (width count=0) signal from the width counter 162 (FIG. 5) as applied through an inverter 360.

Thus, when either the SLC=15 signal or the WIC=0 signal is true, the output of gate 346 will be true. If then the signal TOCGO is true, the -DCS signal at the output of the NAND-gate 342 will be true (low), signifying that the character segment has been completed. What this means is that if, at the top of the character segment, either the far edge of the band buffer memory has been reached (SLC=15) or the width of the character segment reduced to zero (WIC=0), the segment is done.

The -DCS signal at the output of the NAND-gate 342 is connected to one input of a NAND-gate 352. A second input of the NAND-gate 352 is connected to the adder 334 for receiving the ACARRY signal therefrom. Lastly, a third input of the NAND-gate 352 is connected to the output of an inverted input OR-gate 354. The OR-gate 354 has two inputs, one connected to the flip-flop 282 (FIG. 26B) for receiving the -BOC signal therefrom, and another connected to the adder 336 (FIG. 32) through an inverter 356 for receiving a -BCARRY signal. Accordingly, the output of the gate 354 will be true when either or both BOC and BCARRY are true. If also the ACARRY and -DCS signals are true, then the output of NAND-gate 352 will be low.

The output of gate 352 is applied to one input of an inverted input OR-gate 358, the other input of which is connected to the height counter 150 (FIG. 5A) for receiving the TOC signal therefrom. The output of gate 358 will be true when either TOC is false or all three inputs to gate 352 are true. The output of the gate 358 is applied to one input of a NAND-gate 360, the other input of which is connected to the output of gate 284 (FIG. 27) for receiving the GLOP2 timing signal. Thus, when both the output of gate 358 and the GLOP2 signal are true, the output of gate 360 will be low.

The output of gate 360 is applied to one input of an inverted input OR-gate 362, the output of which develops the LOAD signal. Thus, LOAD will be true when the output of gate 360 is low. A second input of the OR-gate 362 is connected to the output of a NAND-gate 362. The gate 364 has three inputs for respectively receiving DCARRY signal from the adder 328 (FIG. 32), the PRE signal from the inverter 308 (FIG. 28) and the -NEED signal from the circuitry of FIG. 33A. Thus, when all three of the DCARRY, PRE and -NEED signals are true, the output of gate 364 will be low, causing a true LOAD signal at the output of gate 362. Thus, a LOAD always occurs when processing a font word not at the top of the character segment (-TOC).

Figure 33A:
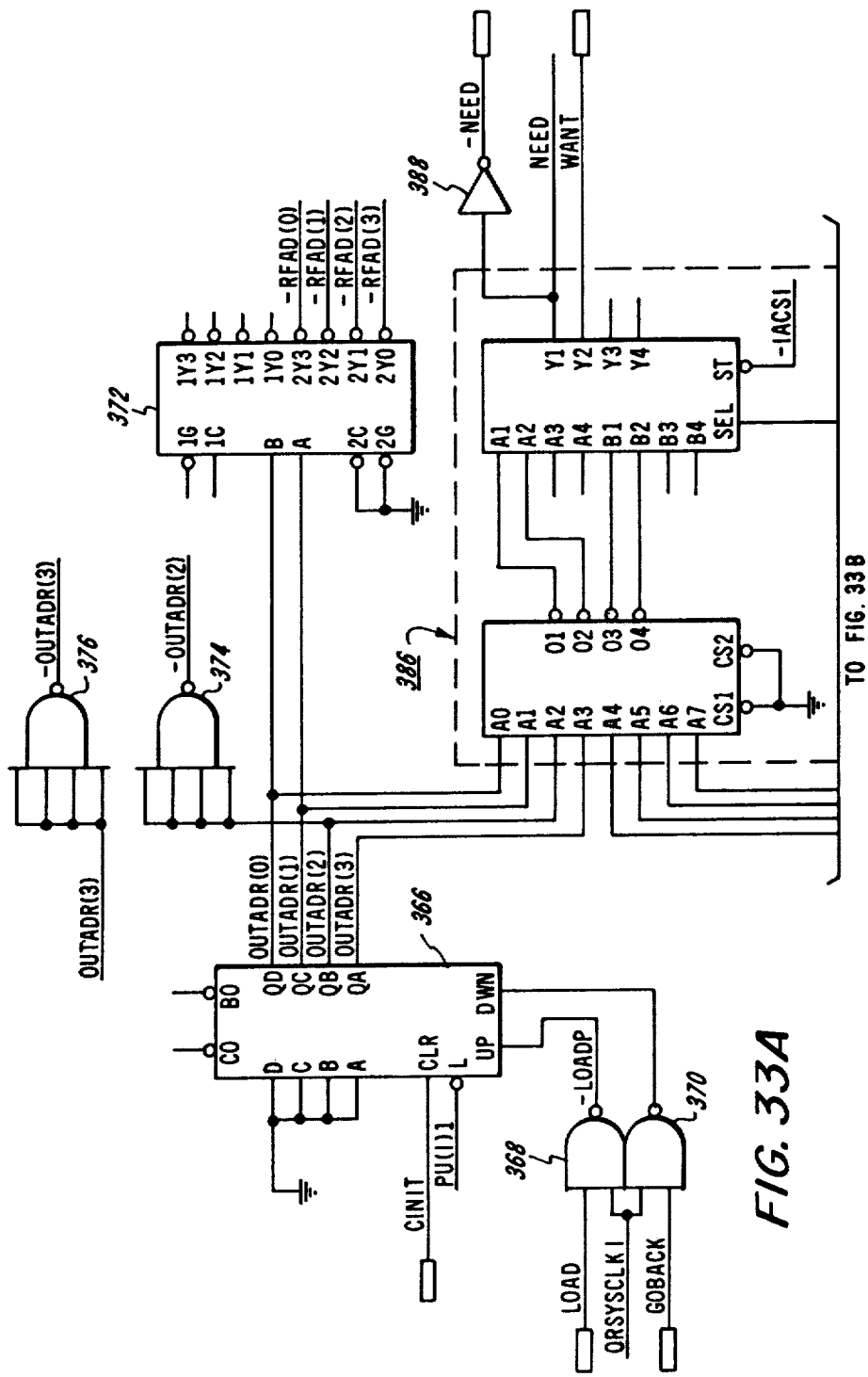
Figure 33B:
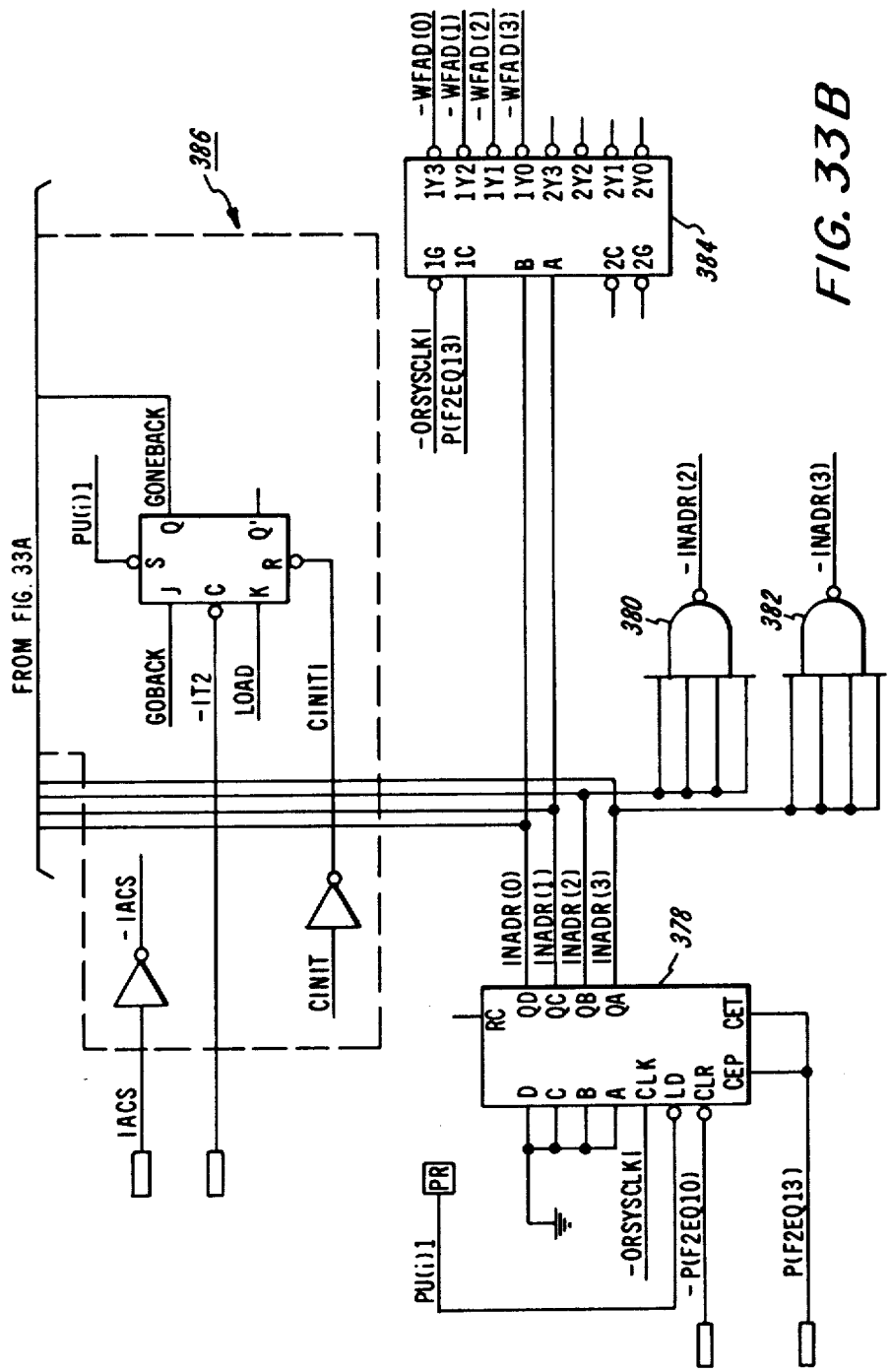

Reference is now had to FIGS. 33A and 33B where the control circuits responsible for addressing the FIFO memory 110 (FIG. 4A) will be described. As shown, a counter 366 has its countup line connected to the output of a NAND-gate 368 which has two inputs for respectively receiving the LOAD signal from the gate 362 (FIG. 30) and the ORSYSCLK signal. Accordingly, when LOAD is true, the next clock signal pulse will increment the counter 366. The counter has four output lines on which the OUTADR signal is developed. The counter is initially cleared by a CINIT signal applied at its reset input. Then, at each concurrence of a true LOAD signal and true ORSYSCLK signal, the OUTADR lines will be incremented by one.

The OUTADR count can also be decremented by one under the GOBACK condition referenced earlier. This is accomplished by applying the GOBACK signal from the gate 340 (FIG. 29) to one input of an AND-gate 370, the other input of which receives the ORSYSCLK signal. Thus, at the concurrence of a true GOBACK signal and a true ORSYSCLK signal, the counter 366 will be decremented by one.

The preferred FIFO memory 110 is constructed using 4×4 bit read/write register chips. To obtain 16 addresses, four sets of four chips have been wire-ored together. In addressing the memory then, for either input or output, two address bits are used to select one of the four sets of chips and the other two address bits select one of the four addresses within the chip. Thus, the two least significant bits of the OUTADR signal, i.e. OUTADR (2) and OUTADR (3), are applied through inverters 374 and 376 to the address lines of the FIFO memory 110. The two most significant bits, i.e. OUTADR (0) and OUTADR (1), are applied to a decoder 372 for generating four chip select lines, i.e. RFAD (0)-RFAD (3) for application to the FIFO memory. Preferred FIFO memory circuits are disclosed in Appendix C hereto (see pages 11 and 12).

The INADR signal is developed at the outputs of another counter 378. The counter 378 counts when an F2=13 control signal (which loads a font word into the FIFO) is applied to its enable inputs at the occurrence of an ORSYSCLK pulse applied to its clock input. The counter 378 is reset by a (F2=10) signal applied to a reset input upon occurrence of a ORSYSLK pulse. The two least significant bits of the INADR signal, i.e. INADR (2) and INADR (3), are applied through invertors 380 and 382 as -INADR (2) and -INADR (3), as write address inputs to the FIFO memory 110. The two most significant bits, i.e. INADR (0) and INADR (1), are applied to a decoder 384 for decoding those signals into 4-bits of chip write select WFAD(00)-WFAD(03) that are applied to the FIFO memory 110.

As shown in FIG. 33, both the INADR signal (all 4-bits) and the OUTADR signal (all 4-bits) are applied to respective inputs of a comparison circuit 386 that compares the two and raises a WANT signal at one output when the two signals are within 6 values of one another, and a NEED signal at another output when the two signals are within 2 values of one another. The NEED signal is further applied through an invertor 388 to derive the signal -NEED.

Figure 34A:
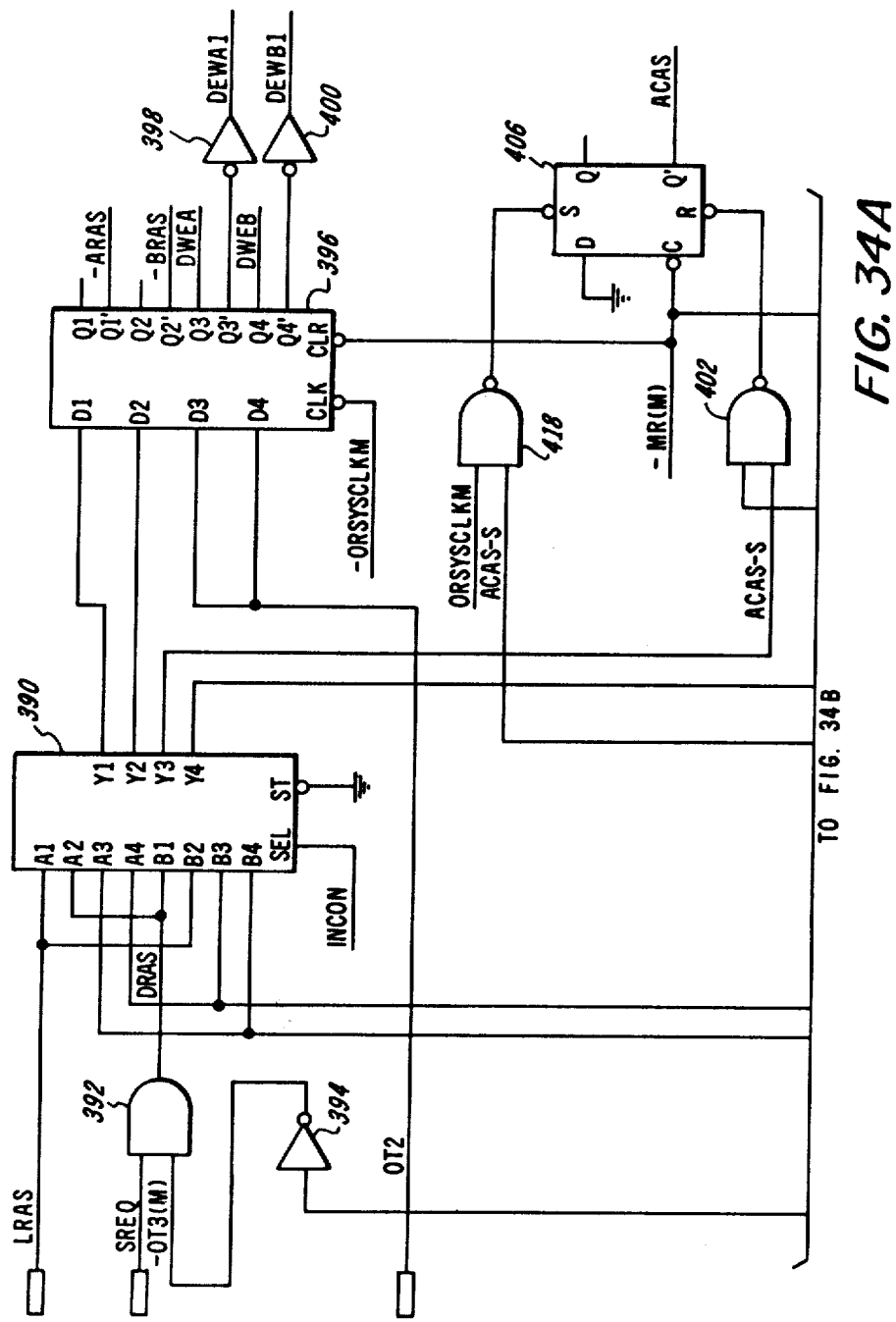
Figure 34B:
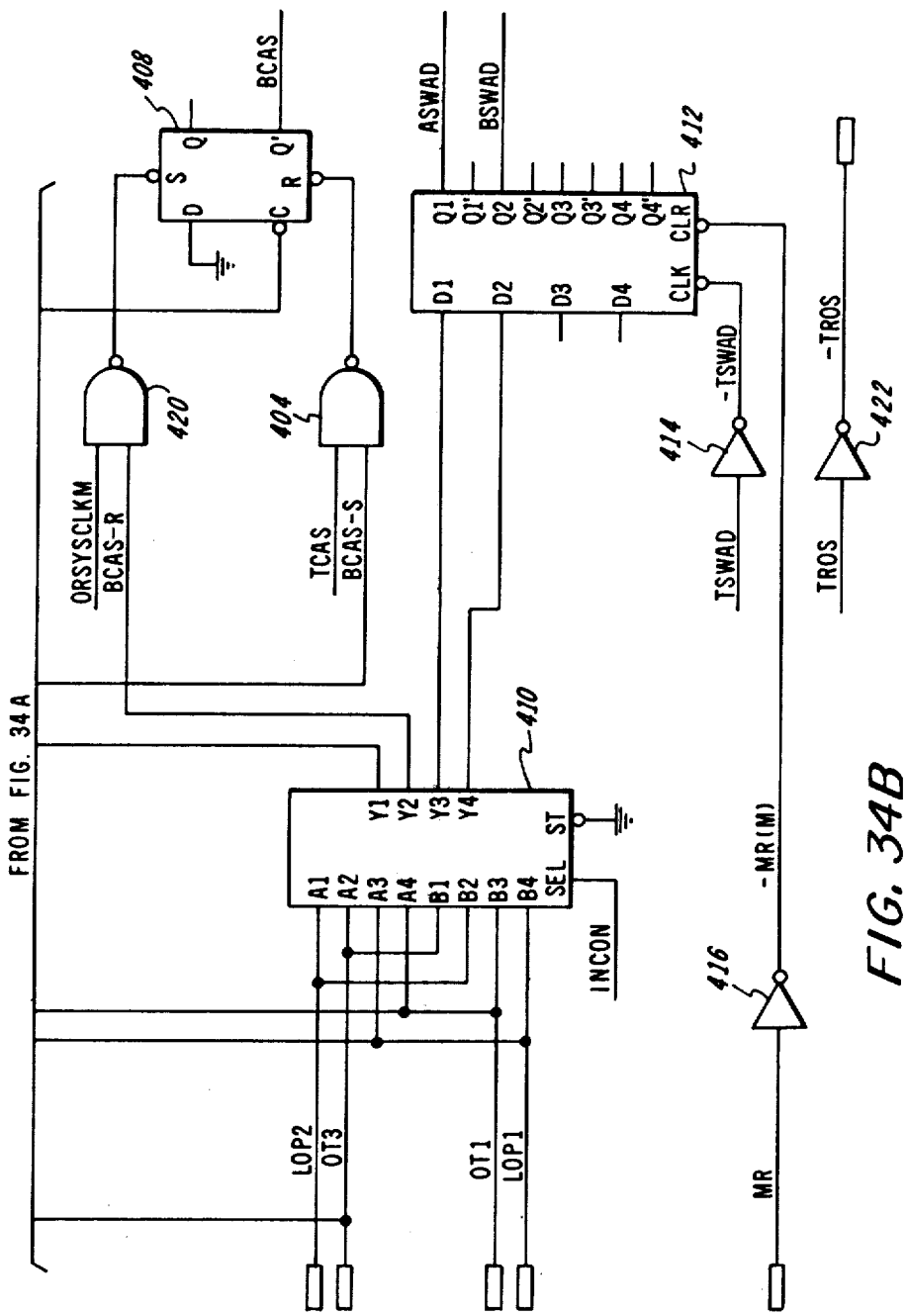
Figure 39:
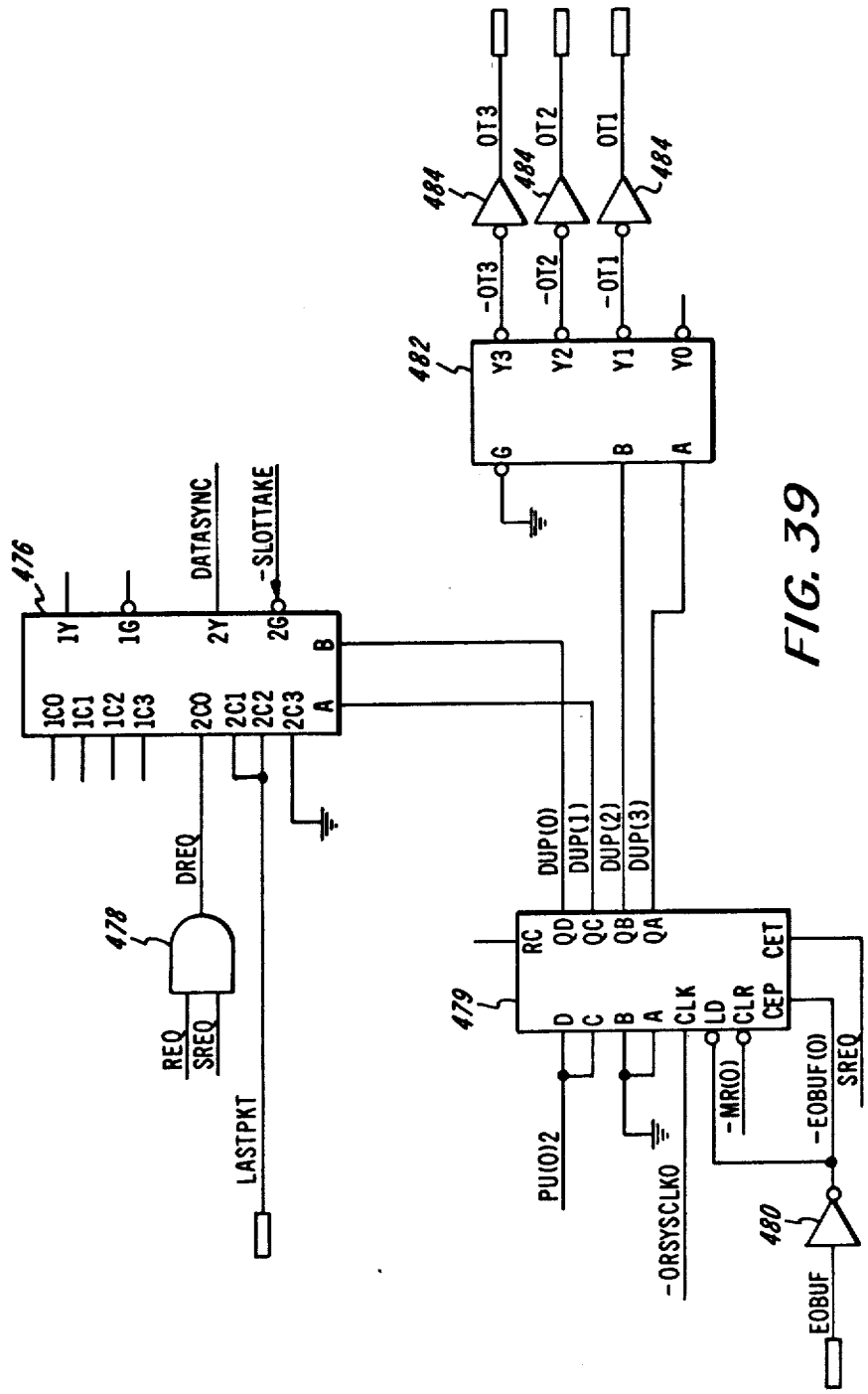

FIGS. 34A and 34B shows the timing and control signals for both band buffer memories A and B. The basic timing signals for loading the memories come from the LOP counter discussed above (FIG. 28). Those for dumping come from the OT counter to be described below (FIG. 39). These basic signals go into multiplexing circuits which, based on the value of INCON, direct the appropriate timing signals to write A and read B or vice-versa. The required signals are as follows:

| | Signals | Function |
|---|---|---|
| (1) | ACAS, BCAS | Column address timing signals for memories A and B respectively |
| (2) | -ARAS, -BRAS | Row address timing signals for memories A and B, respectively. |
| (3) | ASWAD, BSAWD | Signals used to control the multiplexers which select between row and column 6 bit addresses (see Figure 7). |
| (4) | DEWA DEWB | Write timing pulses for controlling the write enables during dumping (to write zeros via read-modify-write) |

The timing of these signals and their relationships to the LOP and OT counters is shown in FIGS. 19 and 20. Most of the clocking of these signals is based on ORSYSCLK. However, two clock signals, i.e. "tswad" and "tcas" are derived from ORSYSCLK via a delay line (FIG. 35). These signals are used to position the edges of the "CAS" and "SWAD" signals as required by the particular chips used in the buffer memories.

Referring now specifically to FIGS. 34A and 34B, a multiplexer 390 has its A1 and B2 inputs connected to the gate 312 (FIG. 28) for receiving the LRAS signal therefrom. The A2 and B1 inputs of multiplexer 390 are connected to the output of an AND-gate 392 for receiving a DRAS (dump row address) signal therefrom. The AND-gate has two inputs, one being coupled to the packetizer 124 circuits of FIG. 38 for receiving an SREQ (Synchronized data request) signal therefrom. The other input of the AND-gate 392 is connected to the output of an inverter 394 for receiving an −OT3(M) timing signal therefrom, the input of the inverter being connected to timing control circuitry in the packetizer 124 (see FIG. 39) for receiving an OT3 clock period timing signal. Accordingly, when both SREQ and −OT3(M) are true, the DRAS signal connected to the A2 and B1 inputs of the multiplexer 390 will be true.

The A3 and B4 input of the multiplexer 390 are connected to the output of inverter 304 (FIG. 28) for receiving a LOP1 clock period timing signal therefrom. The A4 and B3 inputs of the multiplexer 390 are connected to the packetizer timing control circuits (FIG. 39) for receiving an OT1 clock period timing signal therefrom.

Selection between the A and B inputs to the multiplexer 390 is provided by the INCON signal connected to the select input of the multiplexer. When INCON is low, the Y1-Y4 outputs of the multiplexer reflect the values at the A inputs, whereas if INCON is high, the Y1-Y4 outputs of the multiplexer 390 reflect the values at the B inputs. The Y1 and Y2 output signals from the multiplexer 390 are applied to D1 and D2 inputs of a register 396. The D3 and D4 inputs of the register 396 are connected to the packetizer timing circuits of FIG. 39 for receiving an OT2 clock period timing pulse, an inverted clock input of the latch 396 receive the −ORSYSCLK signal, and an inverted reset input is adapted to receive the −MR signal.

The register 396 has six outputs, i.e. −ARAS (memory A row address select) −BRAS (memory B row address select), DWEA (write enable−memory A) and DWEB (write enable −memory B). The −DWEA and DWEB outputs are inverted by inverters 398 and 400 to derive the signals DEWAI and DEWBI, respectively which are essentially identical copies of DWEA and DWEB used to provide additional drive.

The ACAS-S and BCAS-S timing signal outputs of the multiplexer 390 are forwarded to respective first inputs of a pair of NAND-gates 402 and 402. The second input of each gate 402 and 404 is connected to the delay line circuit of FIG. 35 for receiving a "tcas" time pulse having a time delay of 150 ns relative to the OR-SYSCLK signal. The output of NAND-gates 402 and 404 are applied to respective inverted reset inputs of a pair of D flip-flops 406 and 408 to be described in more detail below. At this point, however, it should be noted that both of these flip-flops are clocked by an MR signal, i.e. −MR applied to inverted clock inputs.

The timing control circuits of FIG. 34 further include another multiplexer 410 having its A1 and B2 inputs connected to the inverter 306 (FIG. 28) for receiving the LOP2 clock period timing signal therefrom. The A2 and B1 inputs are connected to the packetizer's timing circuits (FIG. 39) for receiving the OT3 clock period timing signal therefrom. The A3 and B4 inputs are adapted to receive the LOP1 clock period timing signal, and the A4 and B3 inputs are adapted to receive the OT1 clock period timing signal. Selection between the A inputs and B inputs to the multiplexer 410 is accomplished by the INCON signal applied to the select input. When INCON is low, the A inputs are presented at the Y outputs, whereas if INCON is high, the B inputs are presented at the Y outputs.

The Y3 and Y4 output signals from the multiplexer 410 are respectively applied to the D1 and D2 inputs of a register 412. An inverted clock input of the register is connected through an inverter 414 to the delay line of FIG. 35 for receiving the "-tswad" timing signal therefrom. As shown in FIG. 35, tswad has a time daly of 70ns relative to ORSYSCLK. The register 412 is reset by the MR signal applied through an inverter 416 as −MR to an inverted reset input to therregister 412. The ASWAD (memory A switch address) and BSWAD (memory B switch address) signals are developed at the Q1 and Q2 outputs of the register 412. The signal ASWAD is shown in FIGS. 19 and 20, as are tcas, tswad, LRAS, ACAS-R, ARAS, ACAS-S, ACAS, DRAS and DWE.

The ACAS-R and BCAS-R output signals from the Y1 and Y2 outputs of the multiplexer 410 are applied to respective first inputs of a pair of NAND-gates 418 and 420. The ORSYSCLK signal is applied to the other input of each such gate. The output of gate 418 is connected to an inverted set input of flip-flop 406 for setting same when both ACAS-R and ORSYSCLK are true, thereby lowering the ACAS signal at its Q' output. Similarly, the output of gate 420 is connected to an inverted set input of flip-flop 408 for setting same when both BCAS-R and ORSYSCLK are true, thereby lowering the BCAS signal at its Q' output.

Lastly, with respect to FIG. 35, the timing control circuits include an inverter 422 connected to the delay line of FIG. 35 for inverting the timing signal tros to supply the signal −tros to the packetizer 124 circuits for a purpose to be described below with reference to FIG. 40.

FIG. 35 discloses a delay line circuit 424 for generating the three non-CPU clock timing signals, tswad, tros and tcas. The ORSYSCLK is provided as an input to the circuit 424. The circuit 424 consists of a conventional tapped delay line which produces at least three different taps at, for example 70 ns (TSWAD), 120 ns (tros) and 150 ns (tcas). These types of delay lines are well known in the art. A preferred version is shown on page 25 of Appendix C hereto.

FIG. 36 shows the control circuit for generating the signal INCON referred to previously. As shown, such circuit is comprised of a J-K flip-flop 428 having its J and K inputs connected to the scan line number counter 174 (FIG. 5B) for receiving the EOBUF (end of buffer) signal therefrom. An inverted clock input is adapted to receive the ORSYSCLK signal. Consequently, when the EOBUF signal goes true, signifying that the last scan line has been dumped from the buffer, the INCON signal changes state, causing the other band buffer memory to dump. The flip-flop 428 is reset by −MR applied to an inverted reset input thereof.

Figure 41:
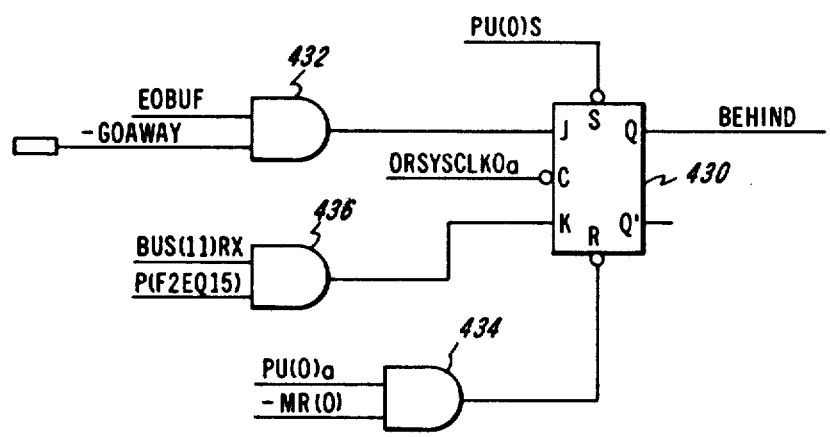

FIG. 41 shows a status circuit included in the control circuits 108 for generating a BEHIND signal that is eventually applied as bit 11 of the status bit field back to the CPU 10 in response to an F1 = 17 control signal (see FIG. 6). As will be recalled, BEHIND means that a band buffer memory switch occured while the CPU 10 microcode was still filling its band buffer memory.

As shown in FIG. 41, a J-K flip-flop 430 is provided having its J input connected to the output of an AND-gate 432. The gate 432 has two inputs for respectively receiving the EOBUF signal from the scan line number counter 174 (FIG. 5B) and the −GOAWAY signal from the flip-flop 248 (FIG. 21B). When these two signals are true, the J input to the flip-flop will be high, thereby causing the flip-flop to set at the occurrence of the next low ORSYSCLK signal applied to an inverted clock input, and thereby raising the BEHIND signal at the Q output of the flip-flop.

The flip-flop 430 can be reset by a low output of an AND-gate 434 applied to an inverted reset input of the flip-flop. The gate 434 will be low whenever -MR applied to an input thereof is low. The flip-flop 430 can also be reset by a low output signal from an AND-gate 436 applied to the K input of the flip-flop. The AND-gate 436 receives at one input thereof the bit-11 of the 8-bit control field from the CPU 10, such bit, when binary 1, signifying a command to clear the behind flip-flop 430. Another input of the AND-gate is adapted to receive the F2=15 control signal from the CPU microcode via the decoder 208 and inverter 220 (FIG. 25). Consequently, when both bit-11 and F2=15 are true, the flip-flop 430 will be reset at the occurrence of the reset ORSYSCLK pulse.

Figure 37:
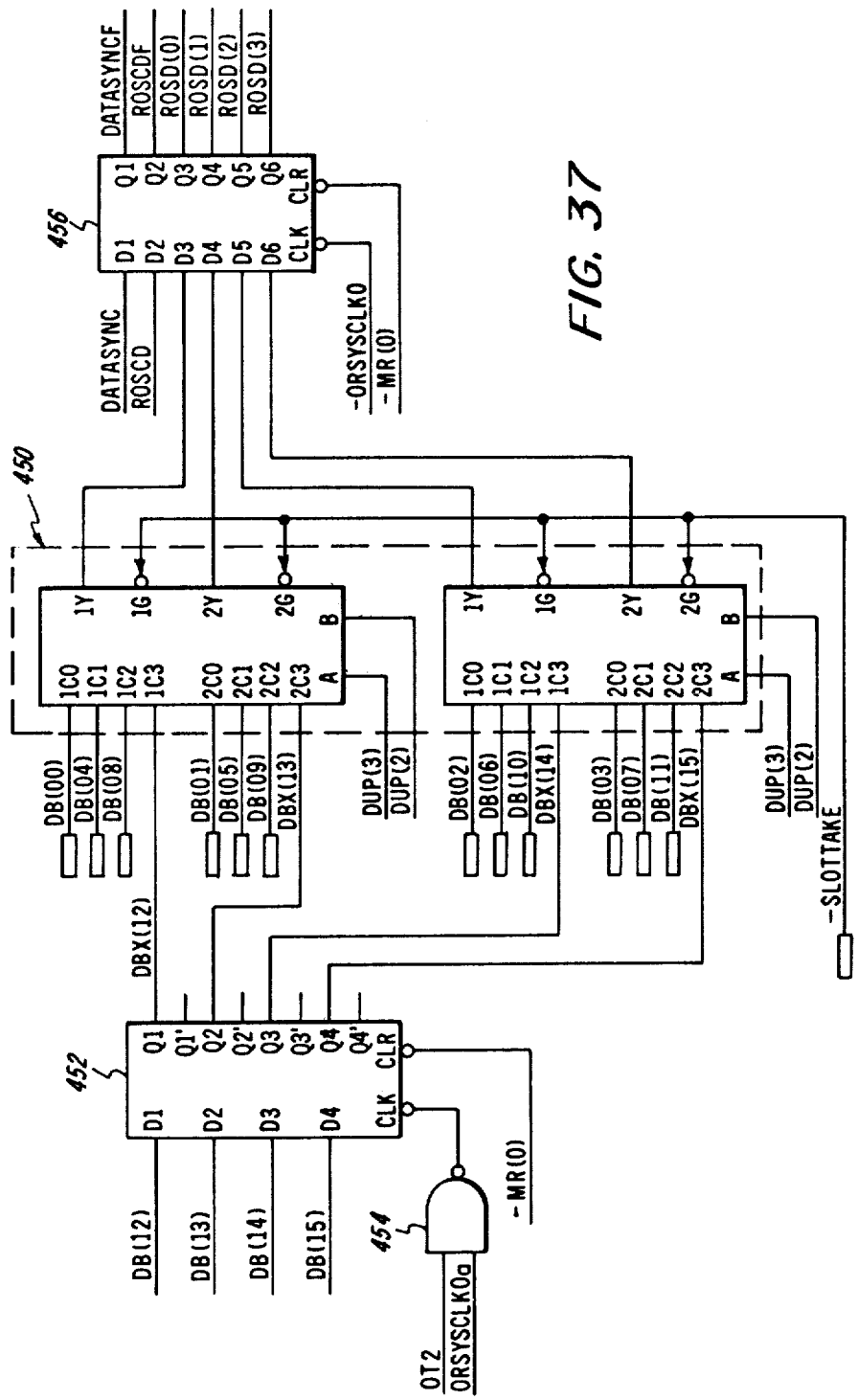

Reference is now had to FIGS. 37–40 where the circuits constituting the packetizer 124 (FIG. 4B) will be described. Referring first to FIG. 37, a multiplexer circuit 450 is shown for receiving IMAGE DATA bits 0–11 (as shown, DB00–DB11) directly from the output of gating circuit 120 (FIG. 4A). The remaining four bits of IMAGE DATA, i.e. DB12–DB15, are applied to the register 452 that acts to delay the presentation of such bits to the respective inputs of the multiplexer circuit 450. More specifically, the IMAGE DATA bits applied to the register 452 are loaded in by a low output of a NAND-gate 454 applied to an inverted clock input. The NAND-gate 454 has two inputs for respectively receiving the ORSYSCLK signal and the OT2 clock period timing signal generated by the packetizer circuitry of FIG. 39 to be described below.

Thus, when both OT2 and ORSYSCLK are true, the output of NAND-gate 454 will be low, thereby clocking the DB12-DB15 IMAGE DATA bits onto respective Q output lines of the register 452 as image data bits DBX12-DBX15. These four bits are then applied to appropriate inputs of the multiplexer circuit 450.

The purpose of delaying the least significant four bits of IMAGE DATA from application to the multiplexer circuit 450 is to allow time for the next 16-bit word of IMAGE DATA from the band buffer memory being dumped to be applied through the gating circuit 120 (FIG. 4A) to the packetizer 124 during the transfer of these least significant 4-bits to an output register 456 for transmittal to the ROS adapter of the ROS printer 20A. It should be noted that the register 452 is cleared by a −MR signal applied to an inverted reset input.

Referring again to the multiplexer 450, it will be noted that is has four output lines for successively applying 4-bit nibbles of IMAGE DATA to the D3–D6 inputs of the output register 456. There are two levels of control in such application. First, the multiplexer 450 must be enabled before it can apply its 4-bit nibbles of IMAGE DATA to the output register 456. Such enabling is accomplished by a −SLOTTAKE control signal from the control circuits 108 that is applied to inverted enable inputs of the multiplexer 450. Thus, when SLOTTAKE is true, indicating that the IMAGE DATA is to be forwarded to the ROS adapter, successive 4-bit nibbles of IMAGE DATA are applied onto the four output lines of the multiplexer 450.

The second level of control of the multiplexer 450 has to do with which 4-bit nibbles of the 16-bit IMAGE DATA word applied to the multiplexer inputs is to be presented on its output lines. Such controlled selection is achieved by selection control signals DUP (2) and DUP (3) that are generated by the circuit of FIG. 39 to be described below. These two bits are capable of four levels of control and are applied to the selection inputs of the multiplexer circuit 450.

As shown in FIG. 37, the output register 456 of the packetizer 124 also includes D1 and D2 inputs that respectively receive a DATASYNC signal and a ROSCD signal for application to the ROS adapter. The DATASYNC signal, as will be recalled, goes true at the first four-bit nibble of the first 16-bit IMAGE DATA word and stays true for all 4-bit nibbles of that word. The DATASYNC signal is generated by the circuitry of FIG. 39. The ROSCD signal represents a command signal from the command transmit circuit 130 (FIG. 4A). All six output lines of the output register 156 will be enabled upon occurrence of a −ORSYSCLK signal applied at is inverted clock input. The register is cleared by a −MR signal applied at its inverted reset input.

FIG. 38 shows that portion of the packetizer circuitry responsible for synchronizing incoming DATA REQUEST signals from the ROS adapter with the main system clock (ORSYSCLK). An incoming DATA REQUEST signal is applied to one input of an AND-gate 458, the other input of which receives a SLOTTAKE signal from the output of an inverter 460. The input of inverter 460 is thus connected to the control circuits 108 for receiving the -SLOTTAKE signal therefrom (see flip-flop 234 in FIG. 25). The output of AND-gate 458 is applied to the J input of a J-K 464. An inverted clock input of the flip-flop 462 receives the ORSYSCLK signal. Accordingly when both DATA REQUEST and SLOTTAKE are true, the flip-flop 452 will be set when the ORSYSCLK signal goes false. This means that Packet Requests are ignored when SLOTTAKE is false. The signal REQ is developed at the Q output of the flip-flop 462.

The other input of the AND-gate 462 is connected to the output of a NAND-gate 466. One input of the NAND-gate 466 is connected to the circuit of FIG. 39 for receiving the OT2 clock period timing signal, whereas the other input of the gate 466 is connected to the output of an AND-gate 468. The two inputs of the AND-gate 468 are adapted to receive the DUP (0) and DUP (1) signals generated by the circuitry of FIG. 39. Accordingly, the flip-flop 462 will be reset when either DATAREQUEST or SLOTTAKE is low, and DUP (0), DUP (1) and OT2 are all high, The flip-flop 462 is also reset by a MR signal applied to its reset input.

Now then, the REQ signal developed at the Q output of flip-flop 462 is applied to one input of an OR-gate 470, the other input of which is connected to the control circuits 108 for receiving the F1=16 control signal. The latter is used to generate a request for data by the microcode when the controller is being operated to scan convert image data for use by the CPU rather than for output to the ROS. The output of the gate 470 is connected to the J input of another J-K flip-flop 472, a clock input of which receives the ORSYSCLK signal. Accordingly, the flip-flop 472 will be set when either F2=16 or REQ is true at a time when ORSYSCLK is true. When set, a true SREQ (synchronized data request) signal is developed at the Q output of the flip-flop 472. The flip-flop 472 is reset by either a true MR signal applied to its reset input, or by a true output of an AND-gate 474 connected to the K input of the flip-flop. A first input of the gate 474 is connected to the Q' output of the flip-flop 462, and a second input of the gate is connected to the circuits of FIG. 39 for receiving the OT3 clock period timing signal. Thus, the output of gate 474 will be true, resetting the flip-flop 472, if both the -REQ signal at the Q' output of flip-flop 462 and OT3 signal are true. Thus, the sysnchronized request is removed at the close of any output reference to the band memory unless another request is pending.

FIG. 39 shows another gated multiplexer 476 which has its 2C0 input connected to the output of an AND-gate 478 for receiving the signal DREQ therefrom. The two inputs of the AND-gate 478 are connected to the circuit of FIG. 38 for respectively receiving the REQ and SREQ signals therefrom. The 2C1 and 2C2 inputs of the multiplexer 476 are connected to the last packet circuit 176 (FIG. 5B) for receiving the LASTPKT signal therefrom. The 2C3 input of the multiplexer 476 is grounded and the DATASYNC signal is developed at the 2Y output of the multiplexer 476. The select inputs A and B of the multiplexer 476 are connected to a counter 479 for receiving select signals DUP (0) and DUP (1) therefrom.

It will be recalled that the DATASYNC signal will be true during the entire time the first four, 4-bit nibbles of IMAGE DATA (i.e. the first 16-bit word) are being forwarded to the ROS adapter. This is accomplished when both DUP (0) and DUP (1) are binary 0 and DREQ is true. For the second and third 16-bit words, the state of DATASYNC is determined by the value of LASTPKT, which is selected by the DUP (0) and DUP (1) respectively having values first of 01 (second word) and then of 10 (third word). The DATASYNC signal will go low during the fourth and final 16-bit word of the 64-bit packet since the values of DUP (0) and DUP (1) will both be binary 1, thereby selecting the grounded 2C3 input value, i.e. binary 0.

Still referring to FIG. 39, the counter 479 has four outputs for respectively developing four DUP signals, i.e. DUP (0) and DUP (1) as discussed above, as well as DUP (2) and DUP (3). The counter 479 is stepped at the occurrence of each -ORSYSCLK signal applied to its clock input, providing a -EOBUF signal applied to its inverted enable input (CEP) is true (low). The -EOBUF signal is developed at the output of an inerter 480 that has its input connected to the scan line counter 174 (FIG. 5B) for receiving the EOBUF signal therefrom. The -EOBUF signal from the inverter 480 is also applied to a load input of the counter 479. Lastly, a -MR signal is applied to an inverted reset input of the counter and the SREQ signal from flip-flop 472 is applied to another enable input of the counter.

The counter has four input lines (A–D) that are loaded into the counter during an initialization step. The A and B inputs are grounded (binary 0) and the C and D inputs are tied high (binary 1). Initialization occurs when EOBUF goes true. This loads the value 1100 into the counter 479 and onto the output lines DUP (0) -DUP (3) in response to a true SREQ. Counting is then also enabled by a true EOBUF signal and the counter 479 is accordingly stepped at each ORSYSCLK pulse.

The DUP (2) and DUP (3) timing signals, in addition to being applied to the select inputs of the multiplexer 450 (FIG. 37), are also applied to a decoder 480 for generating the clock period times -OTO (not used), -OT1, -OT2 and -OT3 at its outputs. The signals -OT1 through -OT3 are applied through respective inverters 484 to supply the clock period timing control signals to various circuits in the controller 18A, as discussed above. The timing signals OTO through OT3 are shown in FIG. 19.

Figure 40:
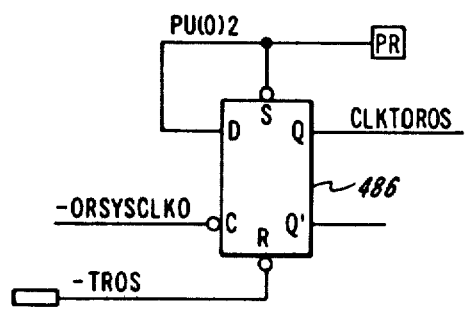

Lastly, and with reference to FIG. 40, a D flip-flop 486 is provided in the packetizer 124 for generating the ROSCLK (labeled CLKTOROS) that is supplied to the ROS adapter in the ROS printer 20A. As shown, the flip-flop 486 has its D input tied high and an inerted clock input adapted to receive the -ORSYSCLK signal. Accordingly, the Q output of the flip-flop 486 will go high at the occurrence of each ORSYSCLK pulse, and will be reset by each "tros" timing signal pulse. This is so since the -tros signal from the delay line 424 (FIG. 35) is applied to an inverted reset input of the flip-flop 486.

The reader is referred for a more detailed description of the circuitry comprising the preferred ROS printer controller 18A to the Appendix C hereto. Additionally, details of the microcode and software program routines of the CPU 10 that are responsible for controlling the operation of the controller 18A are disclosed in Appendices A and B hereto, respectively.

Having described the preferred embodiment of the electronic image procesing system in some detail, a number of diverse ways to use the invention are now discussed. This discussion relates the particular aspects of the invention to visual effects that can be generated by the electronic image processing system on the raster output device.

Because the invention places very few restrictions on the size, location, or font data for "characters", many sorts of images may be generated by varying these parameters. Already discussed are the normal kinds of characters (e.g., the A in FIG. 8), with the understanding that provision of different character sizes, orientations or styles is achieved by suitable alterations to character font data retained in main memory. Also discussed are horizontal and vertical lines, which require no font data to be stored in memory, and which can be of arbitrary height, width and position in the image. Not previously discussed is the use of large characters that adjoin and thereby cover large portions of the image to generate images that include halftoned pictures of high-quality artwork. Character font data that represents this imagery is prepared in advance, and placed in main memory so that it may be forwarded by the microcode to the controller 18A. The fact that character positions are independent of each other allows characters to be combined to produce the desired image: overstriking and underlining are examples.

Because the ink memory is provided, and because its contents can be altered under control of the microcode, the different kinds of "characters" described in the previous paragraph can be "halftoned", i.e., can appear to be black, white, or various shades in between. These effects are achieved without requiring separate character font data for the various shades of characters.

Because the technique for filling a band buffer with image data replaces any image data previously held by the buffer for the corresponding spot in the image, "characters" of different shades can appear to lie on top of one another. For example, to generate an image with white characters lying inside a black rectangle, the controller 18A is operated as follows: first, the ink memory is filled with all 1's, corresponding to black; then a rectangle of appropriate size and shape is written into the band buffer as described above for character; then the ink memory is filled with all 0's, corresponding to white; finally, character font data corresponding to the white characters is forwarded to the controller 18A. This last step will replace portions of the black rectangle with white characters, as prescribed by the character font data. This sequence may need to be repeated for additional bands if the rectangle or characters extend beyond a single band (i.e., are left-over). Another example of "overwriting" in the band buffer is providing the appearance of a partial character, by first writing the entire character in black, then writing a white rectangle to "erase" a portion of the character. Again, these effects are achieved without modifying the character font data stored in main memory.

Although the present invention has been described with respect to a presently preferred embodiment, it will be appreciated by those skilled in the art that various modifications, substitutions, etc. may be made thereto without departing from the spirit and scope of the invention as defined in and by the following claims. For example, the invention can be used to control many different raster output devices, such as, but not limited to, CRT displays, ink jet printers, electrostatic printers and printer/plotters.

What is claimed is:

1. An electronic image processing system for converting character font data into image data utilizable by a raster output scanning device capable of formatting said image data in a plurality of scan lines onto an imaging medium, comprising:
   a main memory having character font data stored therein;
   an input memory for receiving character font data from said main memory;
   a data pattern memory responsive to a predetermined address signal for providing a predetermined pattern of data defining a desired grey-scale tone for said image data;

a band buffer memory capable of storing image data representing a predetermined number of scan lines constituting an image band, said band buffer memory having enable input lines and associated data input lines;

means coupled to said input memory for addressing said input memory to access character font data therefrom;

means coupled to said band buffer memory for applying character font data accessed from said input memory to respective enable input lines of said band buffer memory;

means coupled to said data pattern memory for applying said predetermined address signal to said data pattern memory;

means coupled to said band buffer memory for applying said predetermined pattern of data accessed from said data pattern memory to respective data input lines of said band buffer memory; and means for addressing said band buffer memory to load into an addressed memory location said predetermined pattern of data only with respect to those data input lines whose associated enable input lines are enabled by said character font data.

2. The electronic image processing system of claim 1, further comprising means for addressing said band buffer memory to unload the addressed memory location one scan line at a time.

3. The electronic image processing system of claim 1, further comprising a plurality of band memories, and means for successively selecting each one of said band buffer memories for receipt of said character font data and said predetermined pattern of data.

4. The electronic image processing system of claim 3, wherein said selecting means includes means for changing the selection of band buffer memories to receive character font data and said predetermined pattern of data upon loading of another band buffer memory.

5. The electronic image processing system of claim 1, wherein said character font data is stored in said main memory as a plurality of multi-bit words for each character which together define a bit map for that character, wherein the characters may be of variable sizes and shapes.

6. The electronic image processing system of claim 1, further comprising:
a central processing unit capable of generating various control signals; and
a main data transfer bus connected to said central processing unit, said main memory, said input memory and said data pattern memory for enabling the transfer of data to and from said central processing unit, main memory, input memory and data pattern memory along said bus.

7. The electronic image processing system of claim 6, further comprising:
means for addressing said band buffer memory to unload the addressed memory location one scan line at a time; and
means coupled to said unloading means for applying the contents accessed from said band buffer memory onto said main data transfer bus for storage in said main memory.

8. The electronic image processing system of claim 1, wherein said input memory includes an output stage into which successive character font data words appear in response to said input memory being addressed for output, and said means for applying character font data comprises:
a data register coupled to said output stage of said input memory for receiving the previous character font data word from said output stage when the succeeding addressed character font data word appears in said output stage; and
a shift register connected to said output stage of said input memory and to output of said data register for receiving in parallel the two character font data words present in said data register and the output stage of said input memory, said shift register being responsive to a control signal for selecting a predetermined contiguous multi-bit section of the plurality of character font data bits loaded into said shift register.

9. The electronic image processing system of claim 8, wherein said means for applying character font data further comprises:
a first mask memory containing a plurality of mask data words each capable of being addressed and accessed for use in insuring that no character font data bits are written into a band buffer word location outside a first boundary of the character segment being written into said band buffer memory;
a second mask memory containing a plurality a mask data words each capable of being addressed and accessed for use in insuring that no character font data bits are written into a band buffer word location outside a second boundary of the character segment being written int said band buffer memory;
means connected to the outputs of said first and second mask memories and said shift register for masking the contiguous multi-bit section of character font data stored therein in accordance with the value of the mask data word outputs from said first and second mask memories; and
means connected to the output of said masking means for applying said masked character font data to the enable input lines of said band buffer memory.

* * * * *